United States Patent
Lu et al.

(10) Patent No.: US 11,312,642 B2
(45) Date of Patent: Apr. 26, 2022

(54) FLUID STERILIZING DEVICE

(71) Applicant: INDUSTRIAL TECHNOLOGY RESEARCH INSTITUTE, Hsinchu (TW)

(72) Inventors: Chien-Chun Lu, New Taipei (TW); Chen-Peng Hsu, Hsinchu (TW); Karthickraj Muthuramalingam, Hsinchu (TW)

(73) Assignee: INDUSTRIAL TECHNOLOGY RESEARCH INSTITUTE, Chutung (TW)

( * ) Notice: Subject to any disclaimer, the term of this patent is extended or adjusted under 35 U.S.C. 154(b) by 15 days.

(21) Appl. No.: 16/381,816

(22) Filed: Apr. 11, 2019

(65) Prior Publication Data
US 2019/0233309 A1 Aug. 1, 2019

Related U.S. Application Data

(63) Continuation-in-part of application No. 15/940,552, filed on Mar. 29, 2018, now abandoned.
(Continued)

(30) Foreign Application Priority Data

Dec. 28, 2017 (TW) .............................. 106146181 A
Mar. 8, 2019 (TW) .............................. 108107868 A

(51) Int. Cl.
*C02F 1/32* (2006.01)
*C02F 1/00* (2006.01)

(52) U.S. Cl.
CPC .............. *C02F 1/325* (2013.01); *C02F 1/008* (2013.01); *C02F 2201/322* (2013.01);
(Continued)

(58) Field of Classification Search
CPC .... C02F 1/008; C02F 1/325; C02F 2301/024; C02F 2201/322; C02F 2209/40; C02F 2201/326; C02F 2301/028; C02F 1/32
See application file for complete search history.

(56) References Cited

U.S. PATENT DOCUMENTS

| 5,230,792 A | 7/1993 | Sauska et al. |
| 5,709,799 A * | 1/1998 | Engelhard ............... C02F 1/325 |
| | | 210/748.1 |

(Continued)

FOREIGN PATENT DOCUMENTS

| CN | 1890185 A | 1/2007 |
| CN | 202284156 U | 6/2012 |

(Continued)

OTHER PUBLICATIONS

Joh C.H. Chang et al., "UV Inactivation of Pathogenic and Indicator Microorganisms," Applied and Environmental Microbiology, vol. 49, No. 6, Jun. 1985, pp. 1361-1365, 5 pages.
(Continued)

*Primary Examiner* — Walter D. Griffin
*Assistant Examiner* — Cameron J Allen
(74) *Attorney, Agent, or Firm* — Muncy, Geissler, Olds & Lowe, P.C.

(57) ABSTRACT

A fluid sterilizing device includes a first reaction chamber, a second reaction chamber, a communication chamber and a light source. The first reaction chamber is connected to a fluid inlet. The second reaction chamber is connected to a fluid outlet. The communication chamber is connected the first reaction chamber with the second reaction chamber. The light source is configured to emit sterilization light to enter the first reaction chamber and the second reaction chamber. The fluid inlet allows a fluid to enter the first reaction chamber, the communication chamber allows the fluid to pass through and enter the second reaction chamber, and a
(Continued)

flow velocity distribution of the fluid in the second reaction chamber is different from that of the fluid in the first reaction chamber.

27 Claims, 37 Drawing Sheets

Related U.S. Application Data

(60) Provisional application No. 62/479,341, filed on Mar. 31, 2017, provisional application No. 62/549,448, filed on Aug. 24, 2017.

(52) U.S. Cl.
CPC .... *C02F 2201/326* (2013.01); *C02F 2209/40* (2013.01); *C02F 2301/024* (2013.01); *C02F 2301/028* (2013.01)

(56) References Cited

U.S. PATENT DOCUMENTS

| | | | |
|---|---|---|---|
| 5,779,912 | A | 7/1998 | Gonzalez-Martin et al. |
| 6,475,433 | B2 | 11/2002 | McGeorge et al. |
| 6,885,114 | B2 | 4/2005 | Baarman et al. |
| 7,090,779 | B2 | 8/2006 | Bernstein et al. |
| 7,361,904 | B2 | 4/2008 | Cassassuce et al. |
| 7,416,588 | B2 | 8/2008 | Burrows et al. |
| 7,695,675 | B2 | 4/2010 | Kaiser et al. |
| 7,695,676 | B2 | 4/2010 | Kloepfer et al. |
| 8,454,669 | B2 | 6/2013 | Irwin |
| 9,566,358 | B1 | 2/2017 | Koh et al. |
| D801,181 | S | 10/2017 | Koh et al. |
| 10,040,699 | B2 * | 8/2018 | Smetona ............... C02F 1/008 |
| 2004/0061069 | A1 | 4/2004 | Schalble et al. |
| 2007/0102280 | A1 * | 5/2007 | Hunter ..................... A61L 9/16 204/157.15 |
| 2009/0084734 | A1 * | 4/2009 | Yencho .................. C02F 1/325 210/741 |
| 2012/0318749 | A1 | 12/2012 | Stokes et al. |
| 2014/0161664 | A1 | 6/2014 | Harris et al. |
| 2015/0114912 | A1 * | 4/2015 | Taghipour .............. C02F 1/325 210/748.11 |
| 2016/0332127 | A1 | 11/2016 | Smith |
| 2018/0194645 | A1 | 7/2018 | Hsu et al. |
| 2019/0030510 | A1 | 1/2019 | Taghipour |
| 2019/0062180 | A1 | 2/2019 | Taghipour |

FOREIGN PATENT DOCUMENTS

| | | | |
|---|---|---|---|
| CN | 103720194 | A | 4/2014 |
| CN | 106720192 | A | 4/2014 |
| CN | 104016443 | A | 9/2014 |
| CN | 204490560 | U | 7/2015 |
| CN | 104965481 | A | 10/2015 |
| CN | 204939019 | U * | 1/2016 |
| CN | 106379958 | A | 2/2017 |
| CN | 106587253 | A | 4/2017 |
| DE | 102015115713 | A1 | 3/2017 |
| TW | M322251 | U | 11/2007 |
| TW | 200824789 | A | 6/2008 |
| TW | M368377 | U | 1/2009 |
| TW | 200944254 | A | 11/2009 |
| TW | M368376 | U | 11/2009 |
| TW | M483275 | U | 8/2014 |
| TW | M516043 | U | 1/2016 |
| TW | 201612111 | A | 9/2016 |
| TW | 201701938 | A | 1/2017 |
| TW | I565487 | B | 1/2017 |
| TW | 200920416 | A | 5/2019 |
| WO | WO-2017038764 | A1 | 3/2017 |
| WO | WO-2017043355 | A1 | 3/2017 |
| WO | WO-2017043356 | A1 | 3/2017 |
| WO | WO-2017043357 | A1 | 3/2017 |
| WO | WO-2017051774 | A1 | 3/2017 |
| WO | WO-2017056902 | A1 | 4/2017 |
| WO | WO-2017064950 | A1 | 4/2017 |
| WO | WO-2017077767 | A1 | 5/2017 |
| WO | WO-2017099033 | A1 | 6/2017 |
| WO | WO-2017119174 | A1 | 7/2017 |

OTHER PUBLICATIONS

Michael Kneissl et al., "Development of UV-LED Disinfection," Techneau, Germany, Feb. 2010, pp. 1-36, 36 pages.
Stephen A. Craik et al., "Inactivation of Giardia muris cysts using medium-pressure ultraviolet radiation in filtered drinking water," Water Research, vol. 34, Issue 18, Dec. 15, 2000, pp. 4325-4332, 8 pages.
C. Bowker et al., "Microbial UV fluence-response assessment using a novel UV-LED collimated beam system," Water Research, vol. 45, Issue 5, Feb. 2011, Abstract Only, pp. 1-2, 2 pages.
I. Gaska et al., "Efficiency of Point-of-Use Water Disinfection Using Deep UV Light Emitting Diode Technology," Clean Technology, Jun. 2011, pp. 263-266, 4 pages.
Michael S. Shur et al., "Deep-Ultraviolet Light-Emitting Diodes," IEEE Transactions on Electronic Devices, vol. 57, No. 1, Jan. 2010, pp. 12-25, 14 pages.

\* cited by examiner

FLUID STERILIZING DEVICE

This is a continuation-in-part of U.S. application Ser. No. 15/940,552, filed Mar. 29, 2018. This continuation-in-part application claims the benefit of U.S. patent application Ser. No. 15/940,552, filed Mar. 29, 2018, which claims benefit of provisional applications 62/479,341, filed Mar. 31, 2017, and 62/549,448, filed Aug. 24, 2017, the contents of all of which are incorporated herein by reference, and claims priority of Taiwan application Serial No. 108107868, filed Mar. 8, 2019, and application number 106146181, filed in Taiwan on Dec. 28, 2017, the subject matters of which are incorporated herein by references.

TECHNICAL FIELD

The disclosure relates in general to a fluid sterilizing device, and more particularly to a fluid sterilizing device having a number of reaction chambers.

BACKGROUND

Conventional sterilization devices generally use one-shot sterilization method. However, sterilization rate of one-shot sterilization is usually limited. To increase the sterilization rate, high-power sterilization light source or complex flow path design may be used, but this will lead to increased cost and process complexity.

SUMMARY

According to one embodiment, a fluid sterilizing device includes a first reaction chamber, a second reaction chamber, a communication chamber and a light source. The first reaction chamber is connected to a fluid inlet. The second reaction chamber is connected to a fluid outlet. The communication chamber is connected the first reaction chamber with the second reaction chamber. The light source is configured to emit sterilization light to enter the first reaction chamber and the second reaction chamber. The fluid inlet allows a fluid to enter the first reaction chamber, the communication chamber allows the fluid to pass through and enter the second reaction chamber, and a flow velocity distribution of the fluid in the second reaction chamber is different from that of the fluid in the first reaction chamber.

According to another embodiment, a fluid sterilizing device includes a light source, a reaction chamber, a fluid sensor, a light sensor and a controller. The light source is configured to emit sterilization light. The reaction chamber is configured to allow fluid to pass through, wherein the sterilization light is emitted to the reaction chamber. The fluid sensor is configured to sense passage of the fluid and a flow velocity of the fluid. The light sensor is configured to receive and sense a reflection light of the sterilization light that is emitted to enter the reaction chamber. The controller is configured to control light intensity of the sterilizing light according to intensity of the reflection light.

The above and other aspects of the disclosure will become better understood with regard to the following detailed description of the preferred but non-limiting embodiment (s). The following description is made with reference to the accompanying drawings.

Figure 1A:
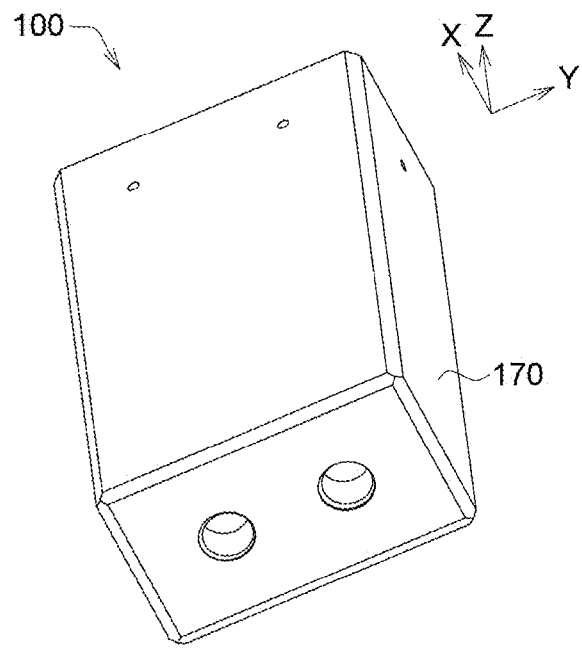
FIGS. 1A and 1B are diagrams showing the appearance of a fluid sterilizing device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
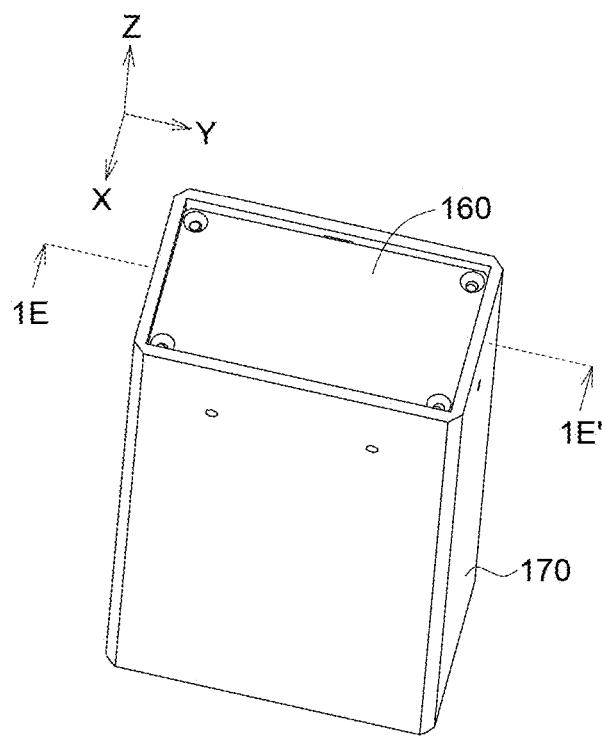
Figure 1C:
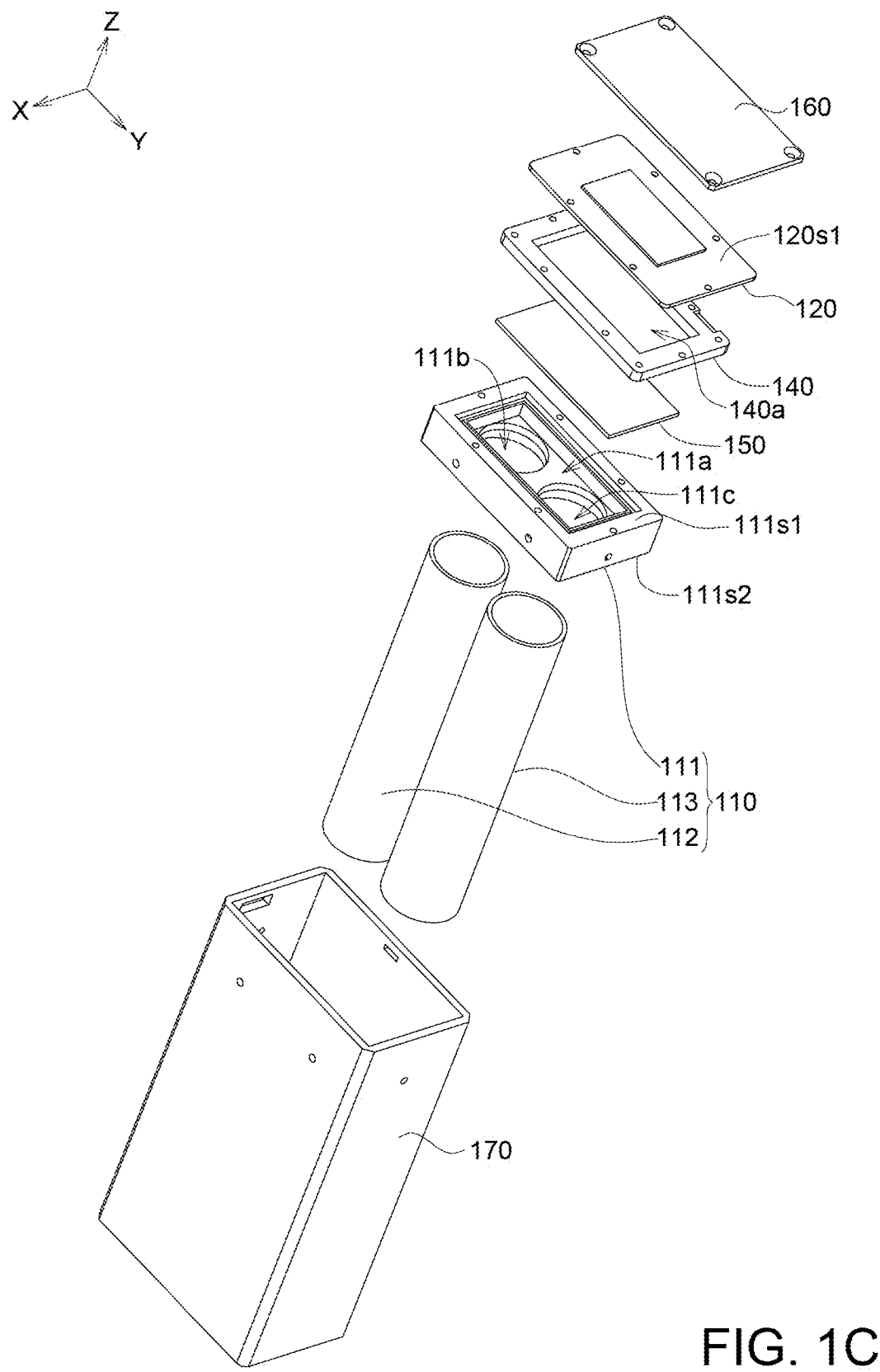
FIGS. 1C and 1D are diagrams showing the decomposition of the fluid sterilizing device of FIG. 1A.
Figure 1D:
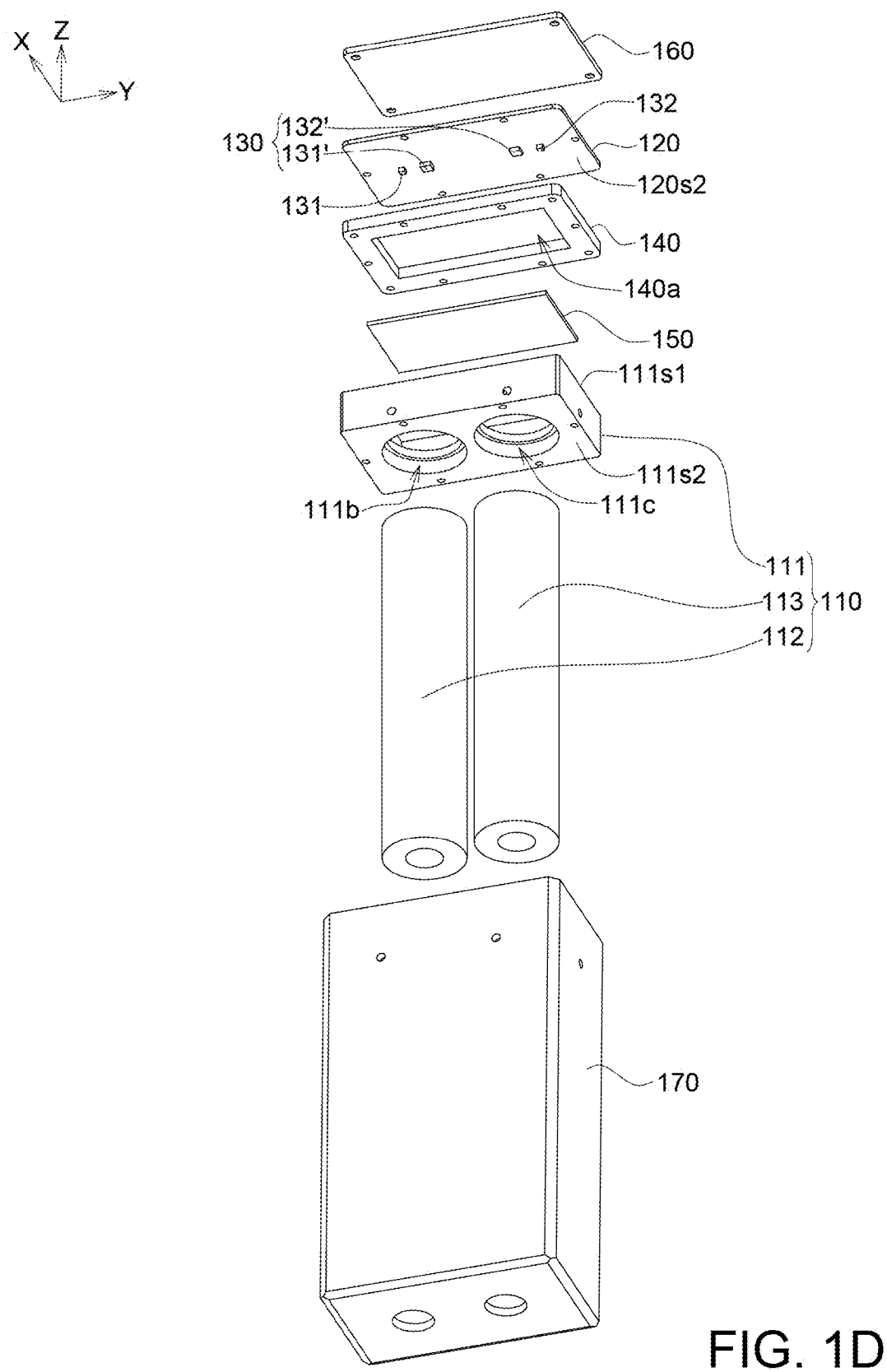
Figure 1E:
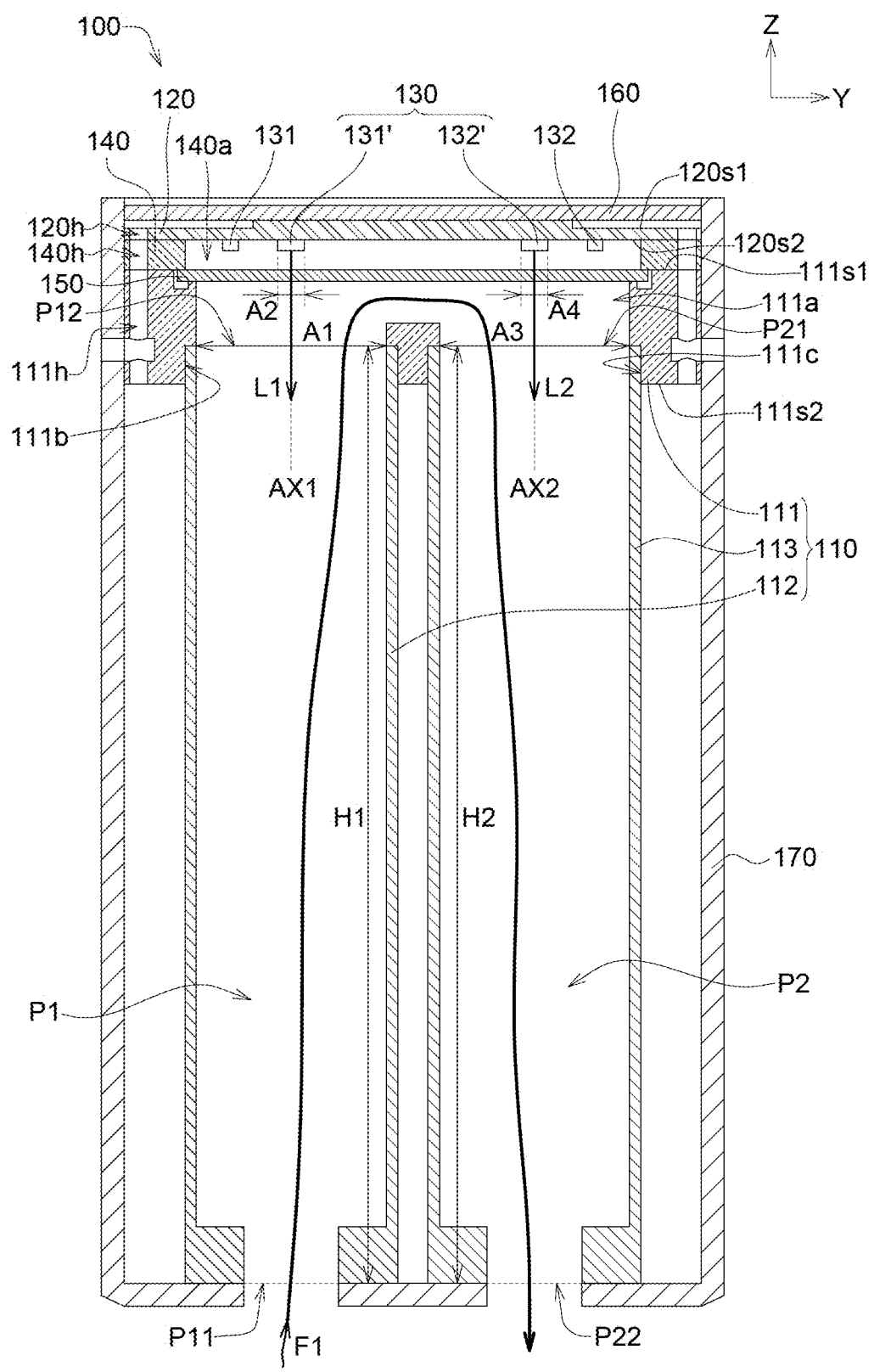
FIG. 1E is a cross-sectional view of the fluid sterilizing device 100 of FIG. 1B taken along direction 1E-1E'.

Referring to FIGS. 1A-1E, FIGS. 1A and 1B are diagrams showing the appearance of a fluid sterilizing device 100 according to an embodiment of the present disclosure, FIGS. 1C and 1D are diagrams showing the decomposition of the fluid sterilizing device 100 of FIG. 1A, and FIG. 1E is a cross-sectional view of the fluid sterilizing device 100 of FIG. 1B taken along direction 1E-1E'.

As shown in FIGS. 1A to 1D, the fluid sterilizing device 100 includes a casing 170, a main body 110, a transparent plate 150, a partition plate 140, a light source 130, a circuit board 120 and an outer cover 160 in order from bottom to top. The main body 110 includes a base 111, a first tube body 112, and a second tube body 113. As shown in FIGS. 1A to 1E, the base 111 has a communication chamber 111a, a first through hole 111b, and a second through hole 111c. The first tube body 112 has a first reaction chamber P1 therein. The second tube body 113 has a second reaction chamber P2 therein. The first reaction chamber P1 has a first opening P11 and a second opening P12, and the second reaction chamber P2 has a third opening P21 and a fourth opening P22. The second opening P12 of the first tube body 112 is connected to the first through hole 111b. The third opening P21 of the second tube body 113 is connected to the second through hole 111c. The first reaction chamber P1 and the second reaction chamber P2 are spaced apart from each other and parallel to each other. In other embodiment, there is an nonparallel-angle included between the first reaction chamber P1 and the second reaction chamber P2. In the present embodiment, the first reaction chamber P1 and the second reaction chamber P2 provide a vertical flow passage, and the communication chamber 111a provides a horizontal flow passage to extend the flow time of the fluid F1 inside the fluid sterilizing device 100 for further increasing sterilization rate of the light to the fluid F1.

The main body 110 allows the fluid F1 to sequentially pass through the first opening P11, the first reaction chamber P1, the second opening P12, the communication chamber 111a, the third opening P21, the second reaction chamber P2 and the fourth opening P22. As shown in FIG. 1E, the first opening P11 of the first reaction chamber P1 is, for example, a fluid inlet, and the fourth opening P22 of the second reaction chamber P2 is, for example, a fluid outlet. The fluid F1 flows in a first direction in the first reaction chamber P1 and flows in a second direction in the second reaction chamber P2, wherein the second direction is different from the first direction, for example, the second direction is opposite to the first direction. In addition, as shown in FIG. 1E, the first reaction chamber P1, the second reaction chamber P2 and the communication chamber 111a form a U-shaped flow path (the illustrated orientation is rotated by 180 to become the U-shaped flow path).

The fluid F1 could be a gas or a liquid, such as an external liquid, such as a liquid in a bottle (for example, water), liquid in a factory pipeline, tap-water, and the like. The circuit board 120 is disposed on the main body 110. The light source 130 is disposed on the circuit board 120 and configured to emit the first sterilizing light L1 and the second sterilizing light L2. The first sterilizing light L1 is incident to the first reaction chamber P1 through the second opening P12, and the second sterilization light L2 is incident to the second reaction chamber P2 through the third opening P21. As a result, the fluid F1 undergoes the first sterilization in the first reaction chamber P1 and the second sterilization in the second reaction chamber P2. Compared with one-shot sterilization, the secondary sterilization could increase the sterilization rate.

The number of the tube bodies of the main body 110 of the above embodiment is two, for example. However, in another embodiment, the number of the tube bodies of the main body 110 could be larger than two, such as k, where k is equal to or more than 3. As a result, the fluid F1 is subjected to k-times sterilizations after passing through the reaction chambers of the k tube bodies, and the sterilization rate of the fluid F1 could be further increased.

As shown in FIG. 1E, the base 111 has an upper surface 111s1 and a lower surface 111s2. The communication chamber 111a extends to the first through hole 111b and the second through hole 111c from the upper surface 111s1, and the first through hole 111b and the second through hole 111c extends to the lower surface 111s2 from the communication chamber 111a.

The base 111, the first tube body 112 and the second tube body 113 could be assembled to be a whole after these components are made separately. Although not shown, the second opening P12 of the first tube body 112 and the third opening P21 of the second tube body 113 could be screwed to the first through hole 111b and the second through hole 111c respectively. In another embodiment, the base 111, the first tube body 112 and the second tube body 113 could be integrally formed of the same material in the same process, for example, the plastic material in the injection molding technique. The material of the first tube body 112 and the second tube body 113 could be quartz or polytetrafluoroethylene (PTFE). Compared with quartz, the polytetrafluoroethylene has the advantages of high design flexibility, low cost and high rigidity. In other embodiment, each of the first tube body 112 and the second tube body 113 could have a two-layered structure, that is, each of the first tube body 112 and the second tube body 113 could be made by two materials. The inner layer or the inner surface of each of the first tube body 112 and the second tube body 113 is quartz, or the outer layer or the outer surface of each of the first tube body 112 and the second tube body 113 is polypropylene, that is, the inner layer or the inner surface of the first tube body 112 and the second tube body 113 is made of material different from material of the outer layer and the outer surfaces of each of the first tube body 112 and the second tube body 113.

The circuit board 120 has an upper surface 120s1 and a lower surface 120s2. The light source 130 is disposed on the lower surface 120s2 facing the communication chamber 111a. The light source 130 could include a number of the light-emitting elements, and the light-emitting elements could be light-emitting diodes. The first sterilizing light L1 and/or the second sterilizing light L2 generated by the light source 130 could be ultraviolet light having a sterilizing effect, and thus the light-emitting elements could be ultraviolet light-emitting diode. Compared to mercury lamps, light-emitting diodes have the properties of quick activation, small size and are power-saving.

As shown in FIG. 1E, the light source 130 includes at least one first light-emitting element 131' and at least one second light-emitting element 132'. The first light-emitting element 131' emits the first sterilizing light L1 to be incident to the first reaction chamber P1, and the second light-emitting element 132' emits the second sterilizing light L2 to be incident to the second reaction chamber P2. A light-emitting optical axis of the first light-emitting element 131' coincides with a central axis AX1 of the first reaction chamber P1, such that the first sterilizing light L1 of the first light-emitting element 131' is expanded in the two sides of the central axis AX1 of the first reaction chamber P1 for sterilizing the fluid F1. A light-emitting optical axis of the second light-emitting element 132' coincides with a central axis AX2 of the second reaction chamber P2, such that the second sterilizing light L2 of the second light-emitting element 132' is expanded in the two sides of the central axis AX2 of the second reaction chamber P2 for sterilizing the fluid F1. The positions of the first light-emitting element 131' and the second light-emitting element 132' right face the second opening P12 and the third opening P21 respectively. As a result, the first sterilizing light L1 and the second sterilizing light L2 emitted by the first light-emitting element 131' and the second light-emitting element 132' are incident to the first reaction chamber P1 and the second reaction chamber P2 through the second opening P12 and the third opening P21 respectively for sterilizing the fluid F1. In other embodiment, the light source 130 could include a number of the first light-emitting element 131' and a number of the second light-emitting element 132'. In other embodiment, a number of the first light-emitting elements 131' are disposed around the central axis AX1 of the first reaction chamber P1, and a number of the second light-emitting elements 132' are disposed around the central axis AX2 of the second reaction chamber P2 to achieve similar uniform sterilization effect. As shown in FIG. 1E, a first light intensity sensor 131 and the first light-emitting element 131' are disposed on the same plane for sensing the light-emitting intensity of the first light-emitting element 131', and a second light intensity sensor 132 and the second light-emitting element 132' are disposed on the same plane for sensing the light intensity of the second light-emitting element 132'.

In addition, an opening area A1 of the second opening P12 is about equal to n times a light-emitting area A2 of the first light-emitting element 131', wherein n is equal to or larger than 1, such that the fluid sterilizing device 100 provides an expected sterilization rate. Similarly, an opening area A3 of the third opening P21 is about equal to m times a light-emitting area A4 of the second light-emitting element 132', wherein m is equal to or larger than 1, such that the fluid sterilizing device 100 provides an expected sterilization rate. In an embodiment, the values of n and m could be equal or different. In addition, length H1 of the first reaction chamber P1 is at least about 15 times length of an edge of the light-emitting area A2 of the first light-emitting element 131' or more, and the length H2 of the second reaction chamber P2 is at least about 15 times length of an edge of the light-emitting area A4 of the second light-emitting element 132' or more, such that the fluid F1 flows in the fluid sterilizing device 100 for a desired period of time, thereby allowing the fluid sterilizing device 100 to provide unexpected sterilization rate. In an embodiment, the light-emitting area A2 of the first light-emitting element 131' and/or the light-emitting area A4 of the second light-emitting element 132' could range between 3.5×3.5 mm$^2$ and 25×25 mm$^2$, and the length of the edge of the light-emitting area A2 of the first light-emitting element 131' and/or the length of the edge of the light-emitting area A4 of the second light-emitting element 132' could range between 3.5 millimeters (mm) and 25 mm, while the length H1 of the first reaction chamber P1 and/or the length H1 of the second reaction chamber P2 could range between 15 mm and 100 mm.

Figure 3:
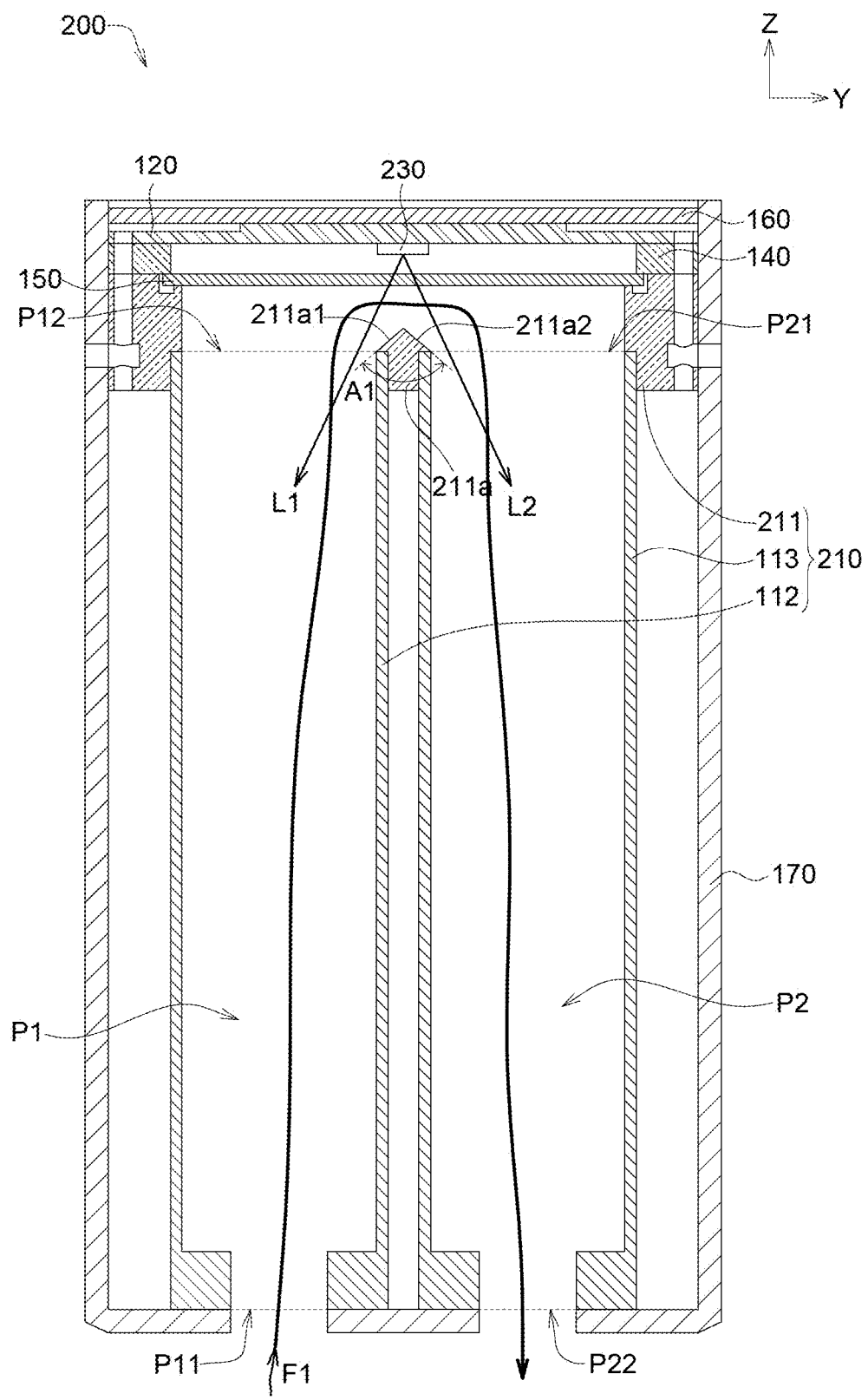
FIG. 3 is a cross-sectional view of a fluid sterilizing device according to another embodiment of the present disclosure.

The light source 130 includes a number of light-emitting elements, and the sum of the powers of the light-emitting elements could be approximately equal to the power of one light-emitting element (such as the light source 130 shown in FIG. 3). Furthermore, the light source of the fluid sterilizing device 100 of the embodiment of the present disclosure does not increase the total power of the light source regardless of the number of light-emitting elements. In other words, the disclosed embodiment could determine the number of light-emitting elements without increasing the total power of the light source, and accordingly the cost of the light source selected could be reduced.

In addition, in the case of the total power of the light source being constant, the power of the first light-emitting element 131' and the second light-emitting element 132' could be appropriately arranged to prevent the light-emitting element from overheating and reducing life. For example, if the total power of the light source required for sterilization is 100 mW, under the total power being equally distributed, the power of the first light-emitting element 131' and the second light-emitting element 132' are 50 mW respectively. As a result, it will not reduce the service life of the light-emitting element due to light decay due to the accumulation of heat on one light-emitting element.

A number of the light-emitting elements of the light source 130 could individually emit sterilizing light with different light intensity at different times, thereby adjusting the heat generation amount of the light-emitting element. In one embodiment, during the first 10-second of sterilization, the first light-emitting element 131' could emit the sterilizing light with 25% of the total power, that is, 25 mW, and the second light-emitting element 132' could emit the sterilizing light with 75% of the total power, that is, 75 mW. In the second 10-second sterilization process, the first light-emitting element 131' could emit the sterilizing light with 75% of the total power, that is, 75 mW, and the second light-emitting element 132' could emit the sterilizing light with 25% of the total power, that is, 25 mW, that is, the ratios of the load power of the first light-emitting element 131' and the second light-emitting element 132' are interchanged. In the third 10-second sterilization process, the first light-emitting element 131' could emit the sterilizing light with 25 mW, while the second light-emitting element 132' could emit the sterilizing light with 75 mW. In the fourth 10-second of sterilization, the first light-emitting element 131' could emit the sterilizing light with 75 mW, and the second light-emitting elements 132' could emit the sterilizing light with 25 mW, and so on. The total power of the aforementioned light source 130 is maintained at a constant value, such as 100 mW, but the disclosed embodiments are not limited thereto.

The partition plate 140 has an opening 140a to receive the light source 130. In other words, due to the design of the opening 140a, the light source 130 does not interfere with the physical material of the partition plate 140. In addition, due to the light source 130 being located within the opening 140a, the length of the fluid sterilizing device 100 (e.g., the dimension along the Z-axis) could be shortened. In an embodiment, the partition plate 140 is, for example, a metal plate.

As shown in FIG. 1E, the transparent plate 150 is pressed between the partition plate 140 and the main body 110. For example, the transparent plate 150 is pressed between the partition plate 140 and the upper surface 111s1 of the base 111 of the main body 110. Due to the transparent plate 150 being pressed between the partition plate 140 and the main body 110, the transparent plate 150 is tightly in contact with the main body 110, and the transparent plate 150 is tightly in contact with the partition plate 140. As a result, gap between the transparent plate 150 and the main body 110 and gap between the transparent plate 150 and the partition plate 140 could be closed to prevent the fluid F1 from flowing between the transparent plate 150 and the main body 110 and between the transparent plate 150 and the partition plate 140 to the circuit board 120 and/or the light source 130. Accordingly, it could avoid the fluid F1 causing circuit board 120 and/or light source 130 to fail.

As shown in FIG. 1E, the circuit board 120, the partition plate 140, and the base 111 have a first through hole 120h, a second through hole 140h and a third through hole 111h respectively. The first through hole 120h, the second through hole 140h and the third through hole 111h substantially coincide. Although not shown, the fluid sterilizing device 100 further includes at least one fixing member that penetrates the first through hole 120h, the second through hole 140h and the third through hole 111h to fix the relative position among the circuit board 120, the partition plate 140 and the base 111. In an embodiment, the fixing member is, for example, a screw, and the third through hole 111h is a screw hole. The fixing member fixes the relative position of the circuit board 120, the partition plate 140 and the base 111 by screwing.

In an embodiment, the transparent plate 150 is, for example, a quartz plate. As shown in FIG. 1E, the outer cover 160 covers the circuit board 120 to protect the circuit board 120. In an embodiment, the outer cover 160 is in contact with the circuit board 120, such that the heat of the circuit board 120 could be convected to the outside. In an embodiment, the outer cover 160 could be made of a material having excellent thermal conductivity, such as copper, aluminum, iron, or other suitable heat transfer material.

As shown in FIG. 1E, the casing 170 could receive the main body 110, the circuit board 120, the light source 130, the partition plate 140, the transparent plate 150 and the outer cover 160 to protect these components.

In addition, as shown in FIG. 1E, in actual use, the fluid sterilizing device 100 could be disposed in the orientation of "an edge of the fourth opening P22 of the second reaction chamber P2 being the highest point of the entire fluid sterilizing device 100". As a result, air (if any) inside the fluid sterilizing device 100 could be assisted to be discharged upwardly from the fourth opening P22 to prevent air from accumulating inside the fluid sterilizing device 100.

Figure 2:
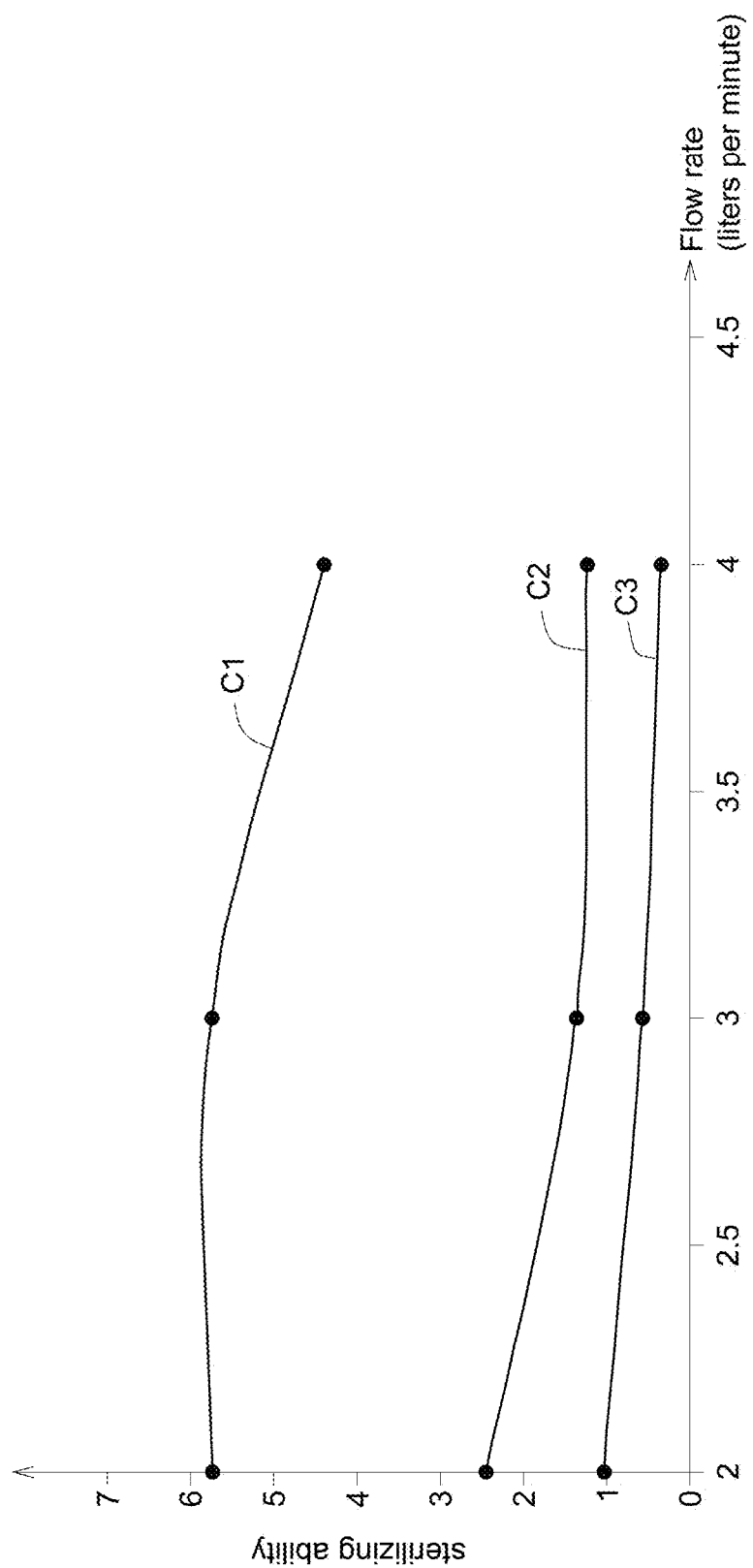
FIG. 2 is a diagram of a relationship between the flow rate and the sterilizing ability of the fluid sterilizing device of FIG. 1E.

Referring to FIG. 2, a diagram of relationship between the flow rate and the sterilizing ability of the fluid sterilizing device 100 of FIG. 1E is shown. In this figure, the horizontal axis represents the flow rate (liters per minute), and the vertical axis represents logarithm of the reduction rate ($E.\ coli$ log reduction) for bacteria. The curve C1 is a sterilization rate curve of the first tube body 112 and the second tube body 113 are made of polytetrafluoroethylene, the curve C2 is a sterilization rate curve of a single tube body (single tube body could only provide one-shot sterilization) made of quartz, and the curve C3 is a sterilization rate curve of a single tube body (single tube body could only provide one-shot sterilization) made of polytetrafluoroethylene. The curves C1, C2, and C3 are experimental results under the same conditions of a bacterial concentration of $5.2e^5$ (CFU/ml) and a power source of 60 mW.

It can be seen from the comparison curves C1 and C2 that due to the fluid sterilizing device 100 of the present disclosure provides secondary sterilizations, even if the material of the tube body uses polytetrafluoroethylene, the sterilization rate of the fluid sterilizing device 100 is much higher than that of single tube body made of quartz. It can be seen from the comparison curves C1 and C3 that compared to one-shot sterilization, the fluid sterilizing device 100 of the present disclosure could provide a higher sterilization rate by using multiple times sterilizations.

Referring to FIG. 3, a cross-sectional view of a fluid sterilizing device 200 according to another embodiment of the present disclosure is shown. The fluid sterilizing device 200 includes a main body 210, the circuit board 120, a light source 230, the partition plate 140, the transparent plate 150, the outer cover 160 and the casing 170. The fluid sterilizing device 200 of the present embodiment has features similar or identical to that of the fluid sterilizing device 100 described above, except that the light source 230 of the fluid sterilizing device 200 faces the region between the first reaction chamber P1 and the second reaction chamber P2, that is, the light source 230 does not right face the first reaction chamber P1 and the second reaction chamber P2.

As shown in FIG. 3, the light source 230 includes at least one light-emitting element, wherein the light-emitting element does not right face the first reaction chamber P1 and the second reaction chamber P2. The main body 210 includes a base 211, the first tube body 112 and the second tube body 113. The base 211 has feature similar to or identical to that of the base 111 described above, except that the base 211 includes a partition 211a between the first reaction chamber P1 and the second reaction chamber P2.

Due to the light-emitting of the light source 230 has a light-emitting angle, the light-emitting of the light source 230 could be divided into the first sterilizing light L1 and the second sterilizing light L2. The partition 211a has a first light guiding portion 211a1 and a second light guiding portion 211a2, wherein the first light guiding portion 211a1 could guide the first sterilizing light L1 to the first reaction chamber P1, and the second light guiding portion 211a2 could the second sterilizing light L2 to the second reaction chamber P2. As shown in this figure, the first light guiding portion 211a1 and the second light guiding portion 211a2 are, for example, two opposite inclined surfaces, and the angle A1 included between the first light guiding portion 211a1 and the second light guiding portion 211a2 could range about 30 degrees and about 120 degrees.

In another embodiment, the fluid sterilizing device 200 further includes a light guide plate (not shown) that could cover the light source 230. The light guide plate could provide a light guiding effect similar to or same as that of the first light guiding portion 211a1 and the second light guiding portion 211a2. In this case, the fluid sterilizing device 200 could omit the first light guiding portion 211a1 and the second light guiding portion 211a2, that is, the partition 211a of FIG. 3 could be changed to the corresponding structure of FIG. 1E.

Figure 4:
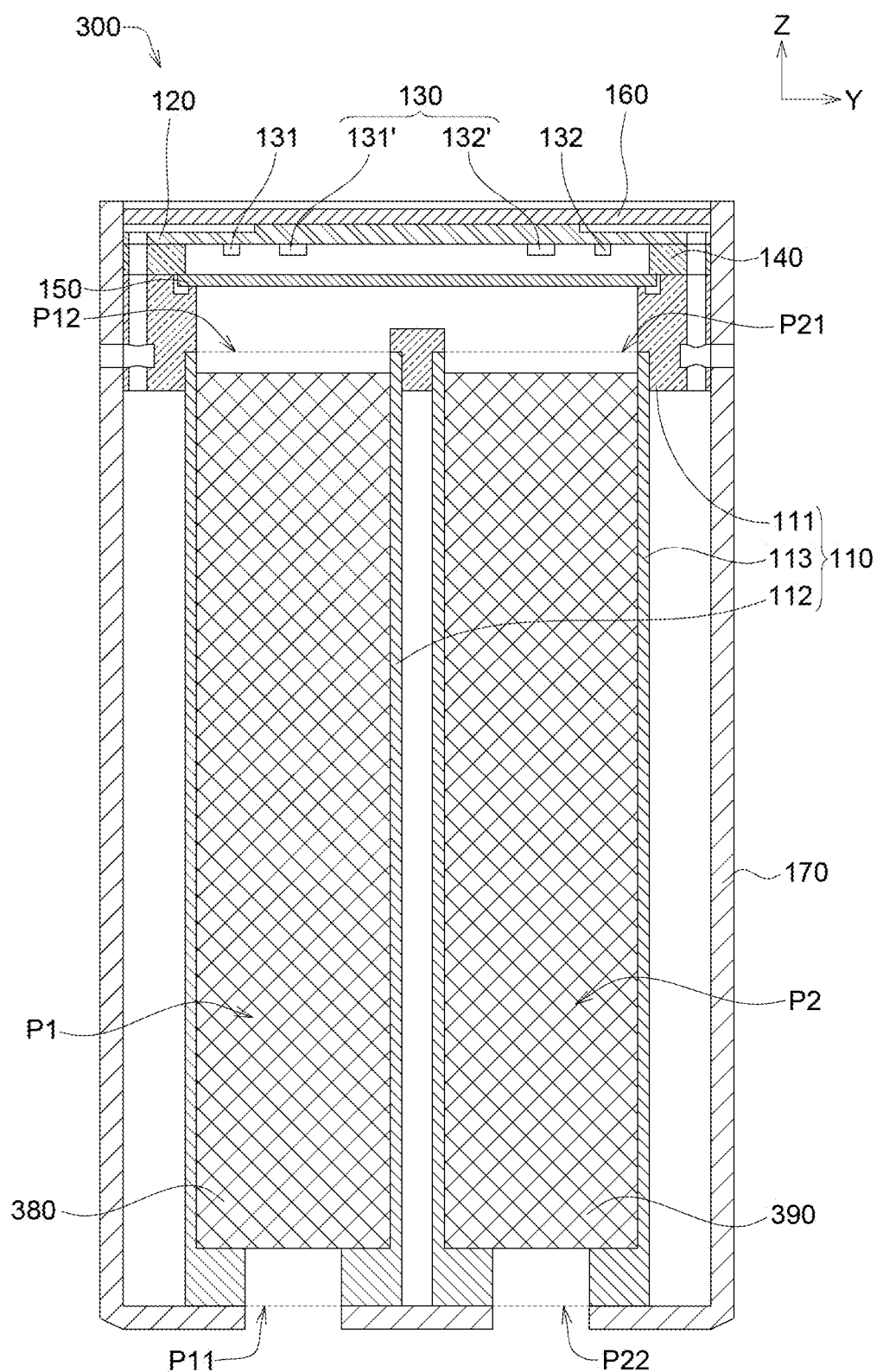
FIG. 4 is a cross-sectional view of a fluid sterilizing device according to another embodiment of the present disclosure.

Referring to FIG. 4, a cross-sectional view of a fluid sterilizing device 300 according to another embodiment of the present disclosure is shown. The fluid sterilizing device 300 includes the main body 110, the circuit board 120, the light source 130, the partition plate 140, the transparent plate 150, the outer cover 160, the casing 170, a first filter element 380 and a second filter element 390. The fluid sterilizing device 300 of the present embodiment has features similar to or identical to that of the fluid sterilizing device 100 described above, except that the fluid sterilizing device 300 further includes at least one filter element.

In detail, the first filter element 380 is disposed in the first reaction chamber P1, and the second filter element 390 is disposed in the second reaction chamber P2. The fluid F1 sequentially passes through the first opening P11, the first filter element 380, the second opening P12, the communication chamber 111a, the third opening P21, the second filter element 390 and the fourth opening P22. The impurities of the fluid F1 could be filtered through the filter core to purify the fluid F1. In another embodiment, the fluid sterilizing device 300 could omit one of the first filter element 380 and the second filter element 390. In addition, as shown in FIG. 4, the first filter element 380 could fill at least a portion of the first reaction chamber P1, and the second filter element 390 could also fill at least a portion of the second reaction chamber P2.

Figure 5A:
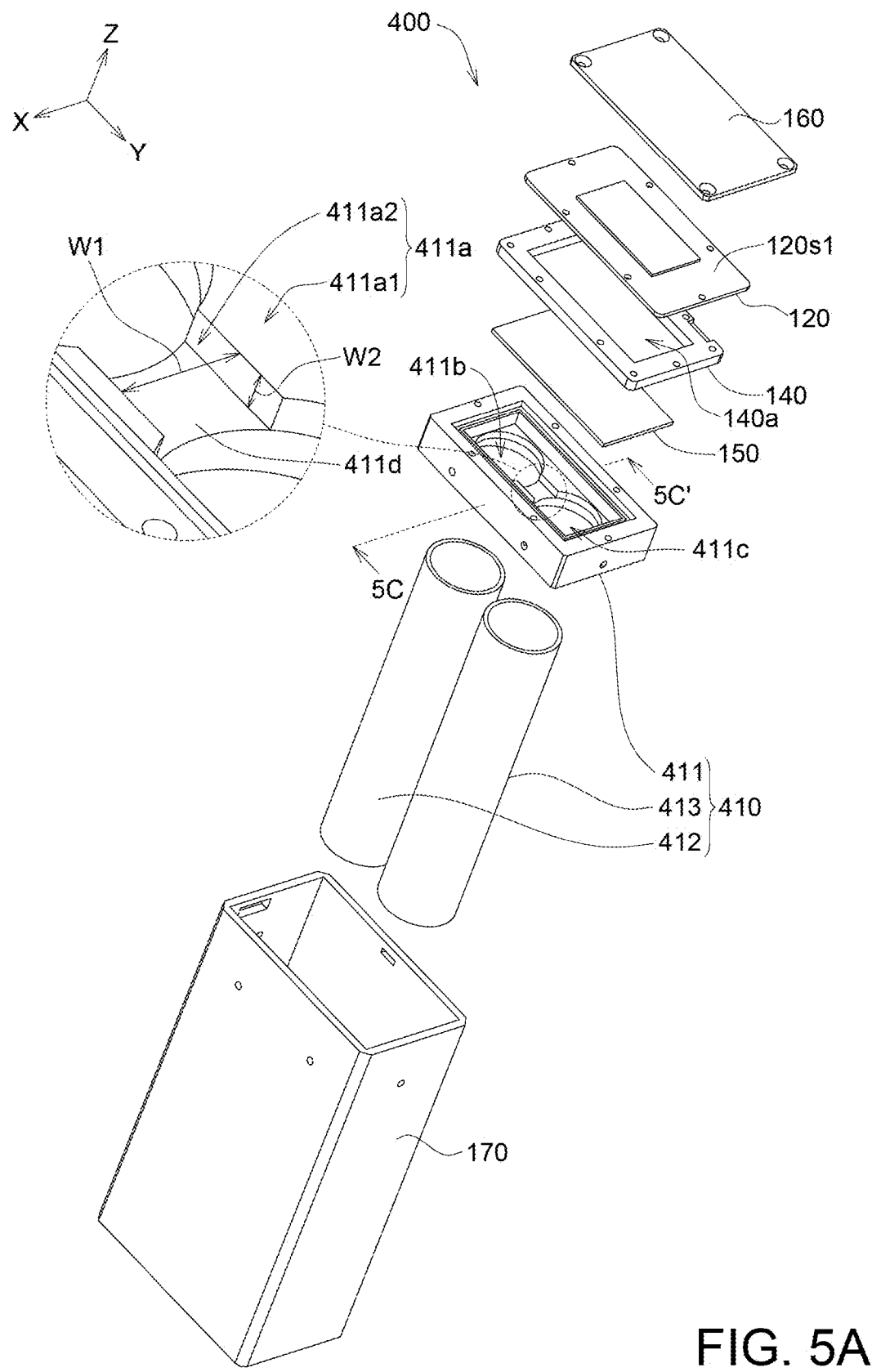
FIG. 5A is an exploded view of a fluid sterilizing device according to another embodiment of the present disclosure.
Figure 5B:
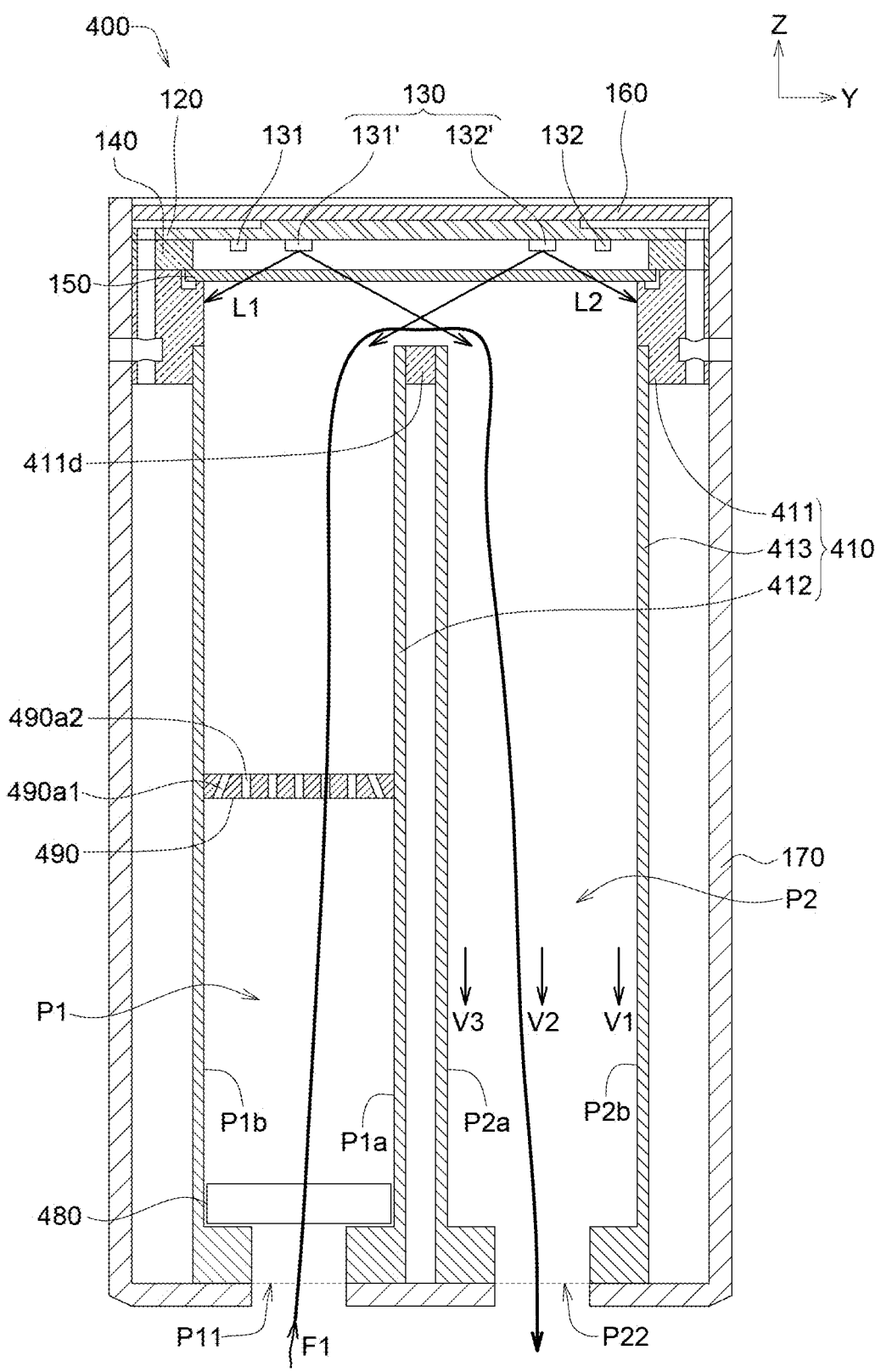
FIG. 5B is a cross-sectional view of the assembled fluid sterilizing device of FIG. 5A.
Figure 5C:
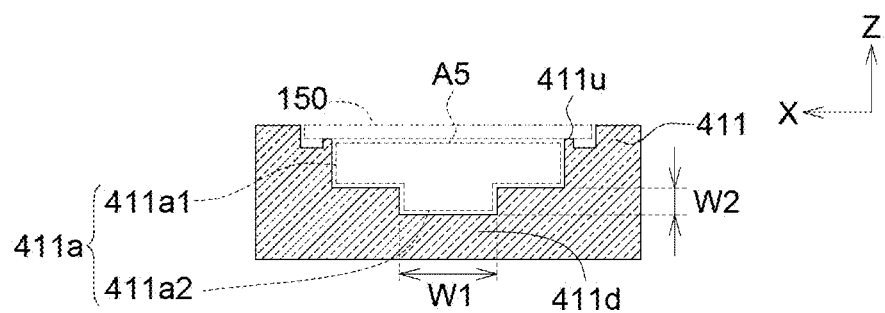
FIG. 5C is a cross-sectional view of the fluid sterilizing device of FIG. 5A along the direction 5C-5C'.
Figure 5D:
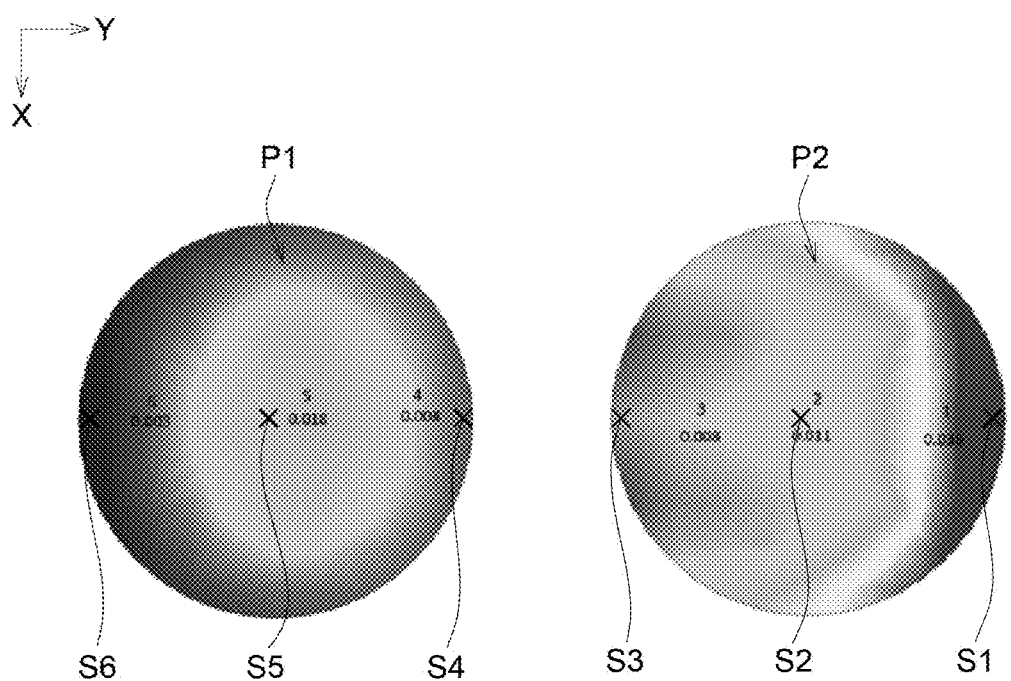
FIG. 5D is a flow chart of the first reaction chamber and the second reaction chamber of FIG. 5B.
Figure 5E:
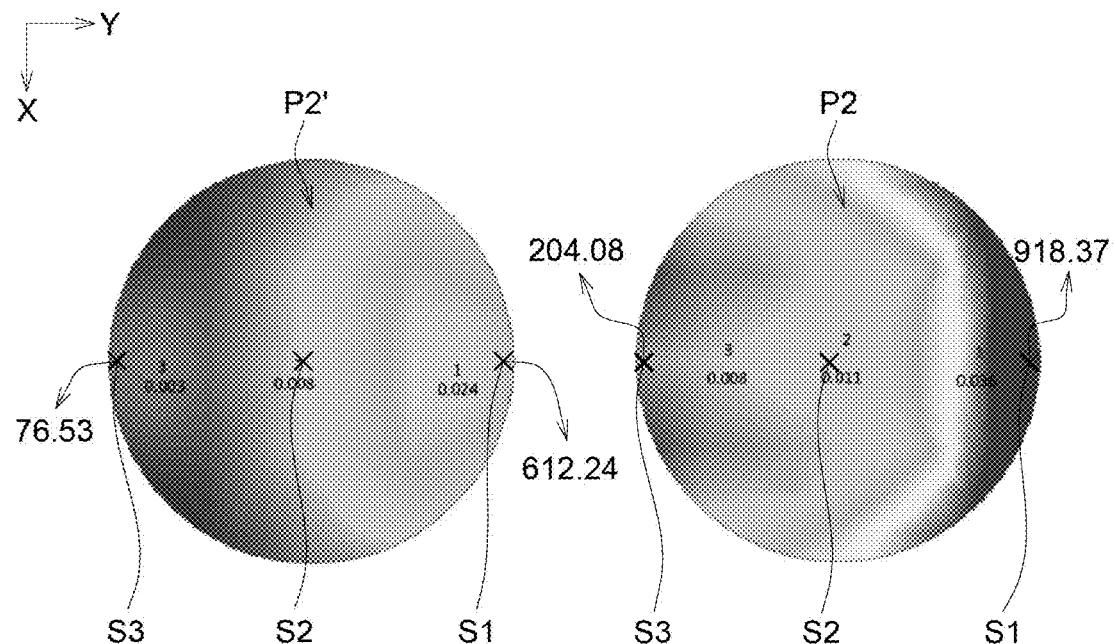
FIG. 5E is a simulation diagram of the flow velocity of the fluid in the second reaction chamber of FIG. 5B omitting a cavity.

Please refer to FIGS. 5A to 5E, FIG. 5A shows an exploded view of a fluid sterilizing device 400 according to another embodiment of the present disclosure, FIG. 5B is a cross-sectional view of the assembled fluid sterilizing device 400 of FIG. 5A, FIG. 5C shows a cross-sectional view of the fluid sterilizing device 400 of FIG. 5A along the direction 5C-5C', FIG. 5D shows a flow chart of the first reaction chamber P1 and the second reaction chamber P2 of FIG. 5B, and FIG. 5E shows a simulation diagram of the flow velocity of the fluid F1 in the second reaction chamber P2 of FIG. 5B omitting a cavity 411a2.

The fluid sterilizing device 400 includes the main body 410, the circuit board 120, the light source 130, the partition plate 140, the transparent plate 150, the outer cover 160, the casing 170, a fluid sensor 480 (optionally) and a spoiler 490 (optionally). The main body 410 includes a base 411, a first tube body 412, and a second tube body 413. The base 411 has a communication chamber 411a, a first through hole 411b, a second through hole 411c and a partition 411d. The partition 411d is located between the first reaction chamber P1 and the second reaction chamber P2. The communication chamber 411a extends to the partition 411d from a carrying surface 411u of the base 411, wherein the carrying surface 411u is used to carry the transparent plate 150. The communication chamber 411a includes a communication recess 411a1, wherein the communication recess 411a1 extends to the cavity 411a2 from the carrying surface 411u, and the cavity 411a2 extends to the partition 411d from the communication recess 411a1 in the light-emitting direction. The position of the cavity 411a2 substantially corresponds to a region between the first light-emitting element and the second light-emitting element. The arrangement of the cavity 411a2 could prevent the light from being blocked by the partitions 411d. For example, the first sterilizing light L1 of the first light-emitting element 131' of the light source 130 could be incident to the first tube body 412 and the second tube body 413, and the second sterilizing light L2 of the second light-emitting element may be incident to the first tube body 412 and the second tube body 413.

The arrangement of the cavity 411a2 could also change the flow velocity, flow direction and/or flow path of the fluid F1 for the purpose of turbulence. It also could enhance the efficiency of sterilization by disturbing the flow of the fluid F1. In detail, the turbulence could cause the fluid in the area where the sterilizing light is not incident (such as the area close to the sidewall) to flow to the area where the sterilizing light is incident (such as the middle area of the reaction chamber), so as to prevent some of the fluid from being concentrated in the area wherein the sterilizing light is not incident, so that the fluid in the flow field could be fully mixed, and thus the sterilization rate could be significantly improved.

As shown in FIG. 5B, the flow velocity of the fluid F1 at the inner sidewall P1a of the first reaction chamber P1 is different from the flow velocity of the fluid F1 at the outer sidewall P1b, for example, the flow velocity of the fluid F1 at the inner sidewall P1a of the first reaction chamber P1 and the flow velocity of the fluid F1 at the outer side wall P1b is lower than the flow velocity of the fluid F1 at a central region of the first reaction chamber P1. As shown in FIG. 5B, due to the design of the cavity 411a2, the flow velocity distribution of the fluid F1 in the second reaction chamber P2 is that the flow velocity V1 at the outer sidewall P2b is larger than the flow velocity V2 at the central region, and the flow velocity V2 at the central region is larger than the flow velocity V3 at the inner sidewall P2a for achieving disturbance effect. Thus, under the same illumination conditions (such as the same light intensity), the flow velocity of the fluid F1 in the turbulent state is higher than that in the non-turbulent state. As described above, by the design of the cavity 411a2, the flow velocity distribution of the fluid F1 from the first reaction chamber P1 into the second reaction chamber P2 could be changed for achieving the turbulent effect. In an embodiment, the fluid F1 is in a turbulent state in the second reaction chamber P2. In other words, Reynolds number of the fluid F1 in the second reaction chamber P2 is larger than Reynolds number of the fluid F1 in the first reaction chamber P1, wherein the larger Reynolds number of the fluid F1 is, the greater the degree of turbulence.

As shown in FIG. 5D, the point S1, the point S2 and the point S3 of the second reaction chamber P2 respectively represent measurement points on one sidewall of the tube body, the middle of the reaction chamber and another sidewall of the tube body. The point S4, the point S5 and the point S6 of the first reaction chamber P1 respectively represent measurement points on one sidewall of the tube body, the middle of the reaction chamber and another sidewall of the tube body. The flow velocities of the point S1, the point S2 and the point S3 of the second reaction chamber P2 are respectively 0.036, 0.011 and 0.008, that is, the flow velocity near one sidewall of the tube body is larger than the flow velocity at the middle of the reaction chamber and the flow velocity at another sidewall of the tube body, and the flow velocities of the point S4, the point S5 and the point S6 of the first reaction chamber P1 are respectively 0.008, 0.018 and 0.003, that is, the flow velocity near the middle of the reaction chamber is larger than the flow velocities at two sidewalls of the tube body, wherein the unit of the flow velocity is meter per second (m/s). As shown, due to the design of the cavity 411a2, the difference of the flow velocities of the points S1 and S3 of the second reaction chamber P2 is larger than the difference of the flow velocities of the points S4 and S6 of the first reaction chamber P1, and it can be seen that the design of the cavity 411a2 could improve the degree of turbulence of the second reaction chamber P2.

As shown in FIG. 5E, the right side is a simulation diagram of the flow velocity in the second reaction chamber P2 of FIG. 5B, and the left side is a simulation diagram of the flow velocity in the second reaction chamber P2' omitting the cavity 411a2. Due to the cavity design of the communication chamber 411a of the embodiment of the present disclosure, according to the computer simulation data, Reynolds numbers of the fluid F1 at the points S1 and S3 of the second reaction chamber P2 of FIG. 5B are 918.37 and 204.08 respectively (substantially ranges between 200 and 900). In the second reaction chamber P2' omitting the design of the cavity, Reynolds numbers of the fluid F1 at the points S1 and S3 are 612.24 and 76.53 respectively (substantially ranges 76 and 612). Comparing the second reaction chamber P2 with the second reaction chamber P2', it is apparent that the cavity of the communication chamber 411a of the disclosed embodiment could significantly increase the degree of disturbance of the flow field in the second reaction chamber P2 (due to Reynolds number is significantly increased). In fluid mechanics, Reynolds number is a measure of the ratio of the inertial force to the viscous force of the fluid. When Reynolds number is large, it means that the influence of inertial force on the flow field is greater than the viscous force. When the fluid flow is unstable, small change of the flow velocity is easy to develop and strengthen to form a turbulent, disorder and/or irregular flow field.

As shown in FIGS. 5A and 5C, the depth W2 of the cavity 411a2 is larger than 2 cm, and in another embodiment, the depth W2 of the cavity 411a2 ranges between about 5 cm and about 8 cm. The width W1 of the cavity 411a2 is smaller than the cross-sectional diameter of the first reaction chamber P1, and also smaller than the cross-sectional diameter of the second reaction chamber P2, that is, the width W1 of the cavity 411a2 is smaller than the inner diameter of the first tube body 412, and also smaller than the inner diameter of the second tube body 413. The shape of the cavity 411a2 could be a polygon (as shown in a cross-sectional view), such as a rectangle or a square. When the depth W2 of the cavity 411a2 is equal to the width W1, the degree of turbulence of the fluid F1 in the second reaction chamber P2 is the largest.

As shown in FIGS. 5A to 5C, the first opening P11 of the first reaction chamber P1 has a first cross-sectional area, the fourth opening P22 of the second reaction chamber P2 has a second cross-sectional area, and the communication chamber 411a has a third cross-sectional area A5 (as shown in FIG. 5C), wherein the first cross-sectional area is substantially equal to the second cross-sectional area, and the third cross-sectional area A5 is not less than half of the first cross-sectional area or the second cross-sectional area, and thus it could reduce the fluid energy loss of the fluid F1 during the flowing process.

As shown in FIG. 5B, the fluid sensor 480 is disposed in the first reaction chamber P1. The fluid sensor 480 is used to sense the passage of the fluid F1 and its flow velocity. The fluid F1 passes through fluid sensor 480 from first opening P11. The fluid sensor 480 could sense the flow rate of the fluid F1, and the fluid F1 could form a turbulent flow after flowing through the fluid sensor 480. Moreover, in another embodiment, the first tube body 412 could be replaced by a fluid sensor, in this design, the first tube body 412 is the outer casing of the fluid sensor, and the fluid sensor itself has the first reaction chamber P1. In an embodiment, the power of the sterilizing light could be adjusted based on the flow velocity sensed by the fluid sensor 480. For example, the higher the flow velocity of the fluid F1 is, the larger the power of the sterilizing light is. Conversely, the lower the flow velocity of the fluid F1 is, the less the power of the sterilizing light is.

As shown in FIG. 5B, the spoiler 490 is disposed in the first reaction chamber P1 to change the flow field of the fluid F1 passing through the spoiler 490, for example, to increase the degree of turbulence of the fluid F1 passing through the spoiler 490 for increasing the sterilization rate. The spoiler 490 has a number of through holes, such as the through holes 490a1 and 490a2, for changing the flow field of the fluid F1 passing through the spoiler 490. For example, the flow velocity of the fluid F1 will change after the fluid F1 passing through the through holes, for example, the flow velocity becomes faster, and thus it could increase the degree of turbulence. As shown, the through holes could be an oblique hole (e.g., the through hole 490a1) that could guide the fluid F1 to pass through the through hole in a particular direction (e.g., the medial direction of the first reaction chamber P1) for increasing the degree of turbulence. In addition, the through hole could also be a straight hole (such as the through hole 490a2). In an embodiment, a number of the through hole of the spoiler 490 all could be the oblique holes or the straight holes, or include the oblique holes and the straight holes. The disclosed embodiments do not limit the size (e.g., the inner diameter), number, and/or direction of extension of the through holes as long as the degree of the turbulence could be increased.

Figure 6:
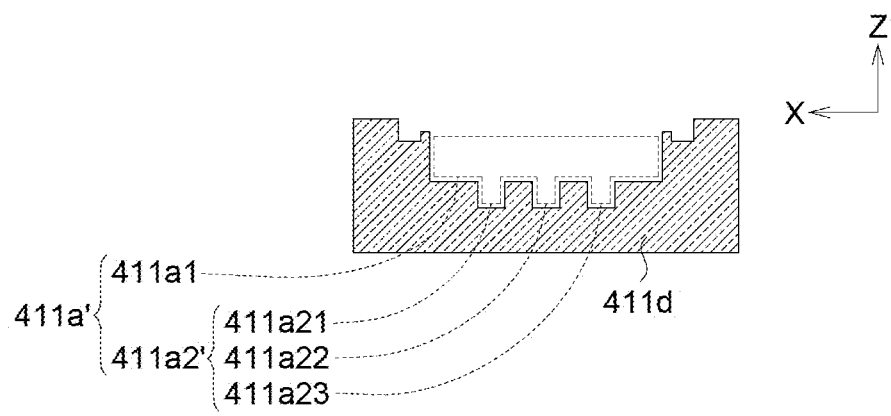
FIG. 6 is a cross-sectional view of a communication chamber according to another embodiment of the present disclosure.

Referring to FIG. 6, a cross-sectional view of a communication chamber 411a' according to another embodiment of the present disclosure is shown. The communication chamber 411a' includes a communication recess 411a1 and a cavity 411a2', wherein the cavity 411a2' extends toward the light-emitting direction to the partition 411d from the communication recess 411a1. The position of the cavity 411a2' substantially corresponds to the area between the first light-emitting element and the second light-emitting element. The arrangement of the cavity 411a2' could reduce the blocking of the light by the partitions 411d. As shown, the cavity 411a2' of the embodiment of the present disclosure includes a number of sub-cavities 411a21', 411a22' and 411a23' which are separated from each other, and the technical effect of the aforementioned spoiler could also be achieved. In another embodiment, the first cross-sectional area is substantially equal to the second cross-sectional area, and the third cross-sectional area A5 is not less than half of the first cross-sectional area or the second cross-sectional area. The disclosed embodiment does not limit geometric shape of the cavity of the communication chamber.

Figure 7:
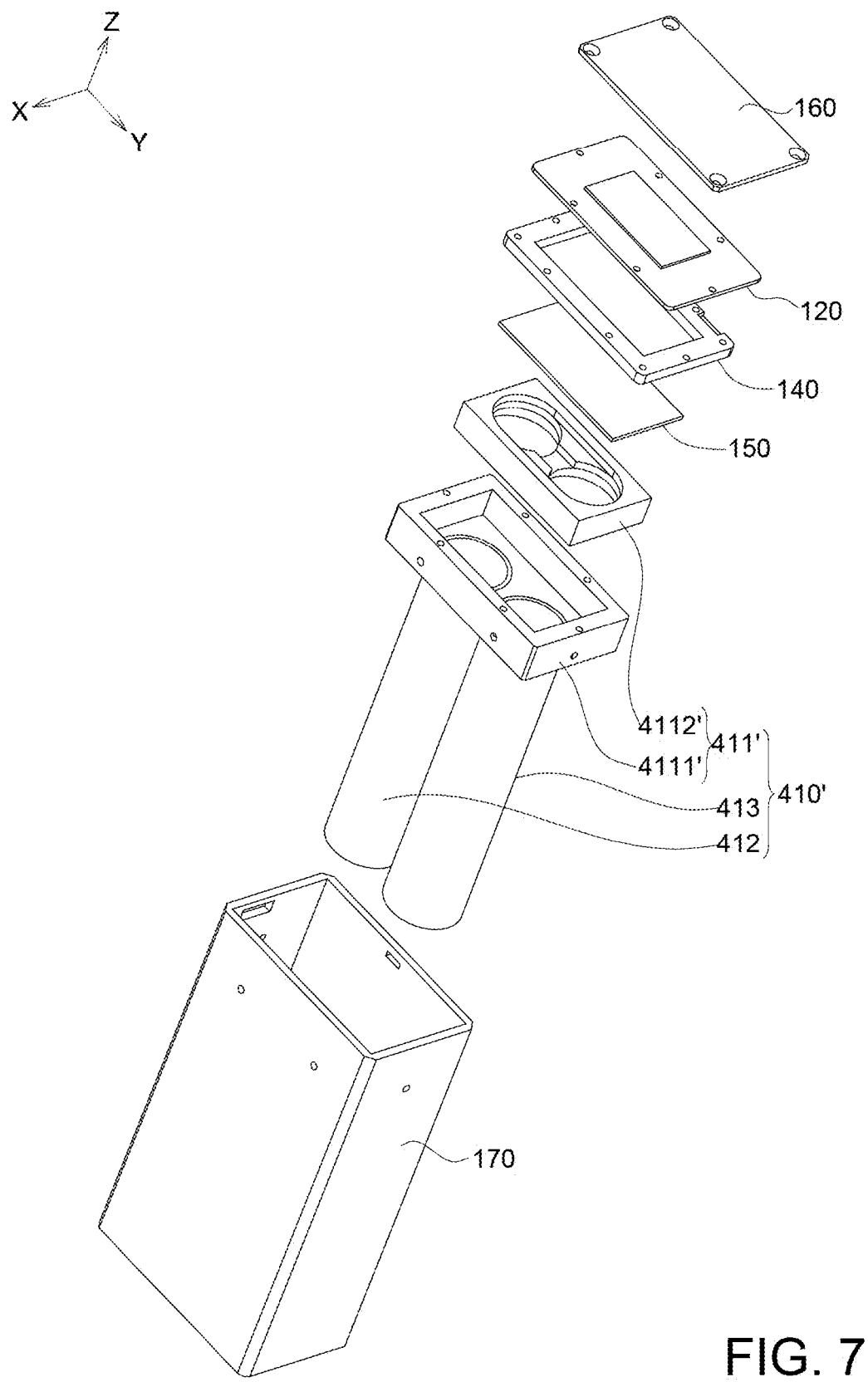
FIG. 7 is an exploded view of a fluid sterilizing device according to another embodiment of the present disclosure.

Referring to FIG. 7, an exploded view of a fluid sterilizing device according to another embodiment of the present disclosure is shown. In the present embodiment, the base 411' of the main body 410' includes a first base 4111' and a second base 4112'. The first base 4111' could be fitted over the second base 4112'. The second base 4112' could be made of material, for example, polytetrafluoroethylene, and the first tube body 412 and the second tube body 413 of the main body 411' are connected with the first base 4111'. The first tube body 412, the second tube body 413 and the first base 4111' could be simultaneously formed in an integrally formed manner.

Figure 8A:
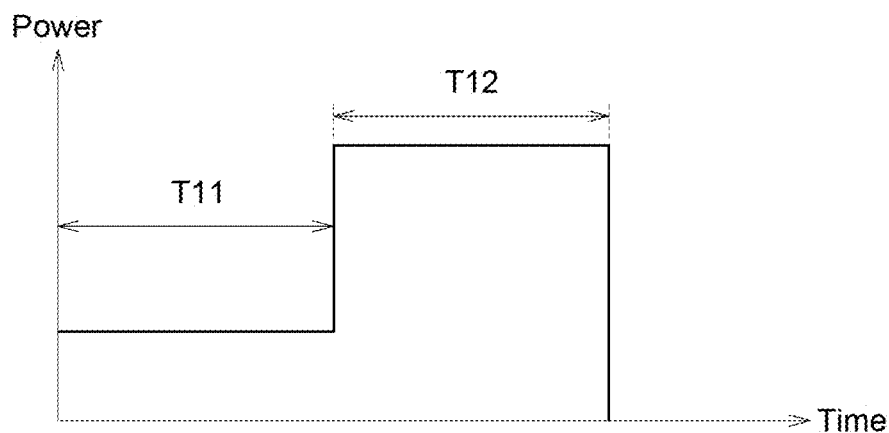
FIGS. 8A to 8C are diagrams showing the relationships between time and the luminous power of the light source according to several embodiments of the present disclosure.
Figure 8B:
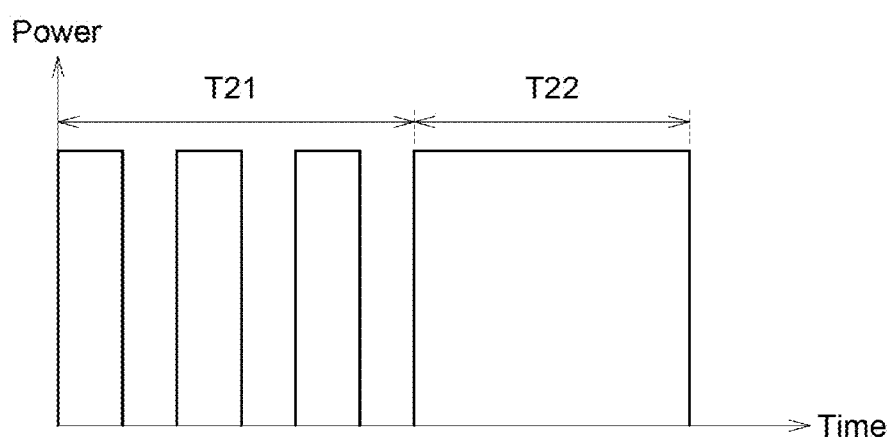
Figure 8C:
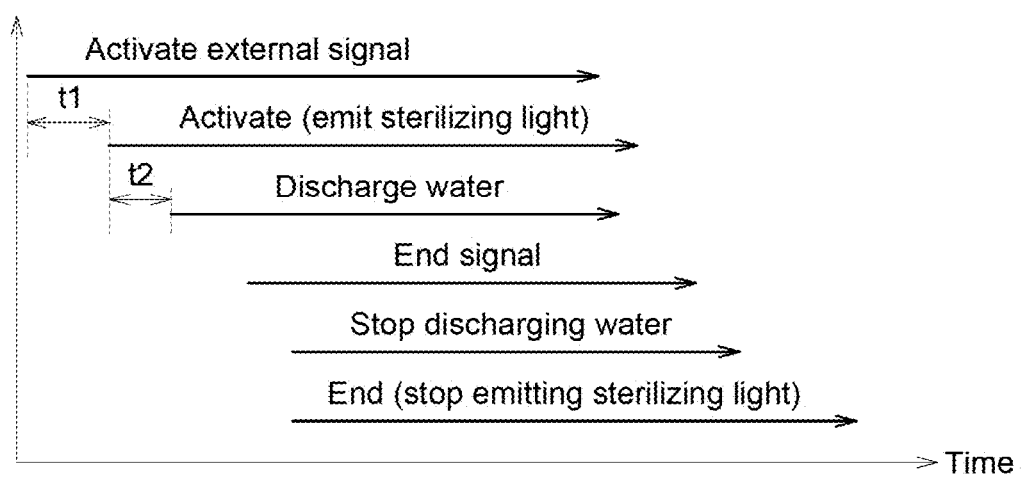

Referring to FIGS. 8A to 8C, diagrams showing the relationships between time and the luminous power of the light source according to several embodiments of the present disclosure are shown.

As shown in FIG. 8A, in the time interval T11, in a state where the fluid F1 does not flow, the light source 130 continues to emit light in a low current (low power) state. In the time interval T12, when the fluid F1 flows, the fluid sterilizing device activates the sterilizing function, and the light source 130 emits light in a high current (high power) state.

As shown in FIG. 8B, in the time interval T21, in a state where the fluid F1 does not flow, the light source 130 emits light in a pulse signal manner. In the time interval T22, when the fluid F1 flows, the fluid sterilizing device activates the sterilizing function, and the light source 130 continues to emit light.

As shown in FIG. 8C, when the external signal is activated, the fluid sterilizing device emits sterilizing light for at least a period of time t1, and the water is discharged after a delay for at least a period of time t2. When the fluid sterilizing device receives the external signal, the water is stopped discharging, and the sterilization light is stopped after a delay for at least a period of time.

In the light-emitting mode of FIGS. 8A to 8C, the light source 130 continues to maintain the sterilizing state for the fluid F1 in the fluid sterilizing device regardless of whether the fluid F1 flows in the fluid sterilizing device.

Figure 9A:
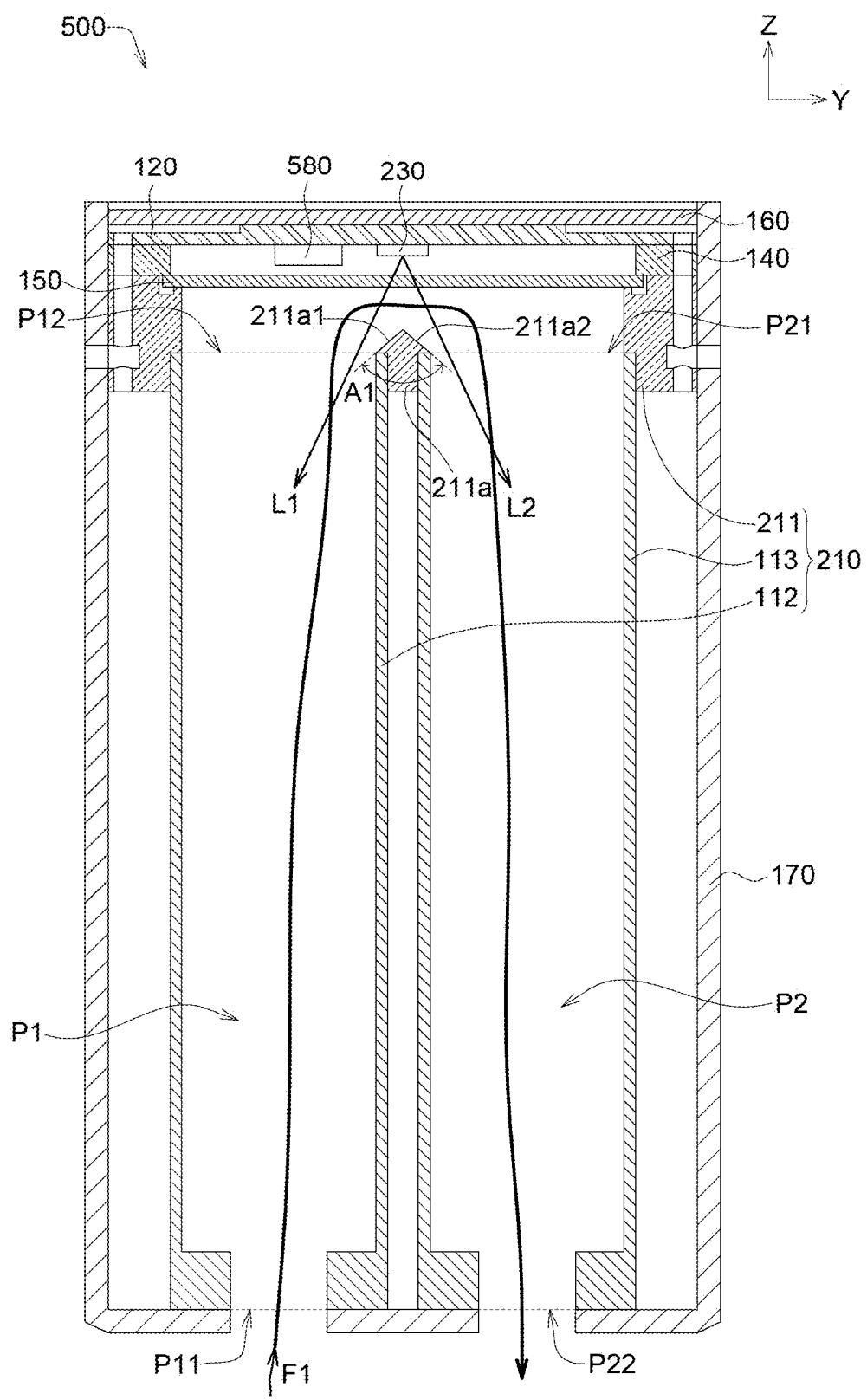
FIG. 9A is a cross-sectional view of a fluid sterilizing device according to another embodiment of the present disclosure.
Figure 9B:
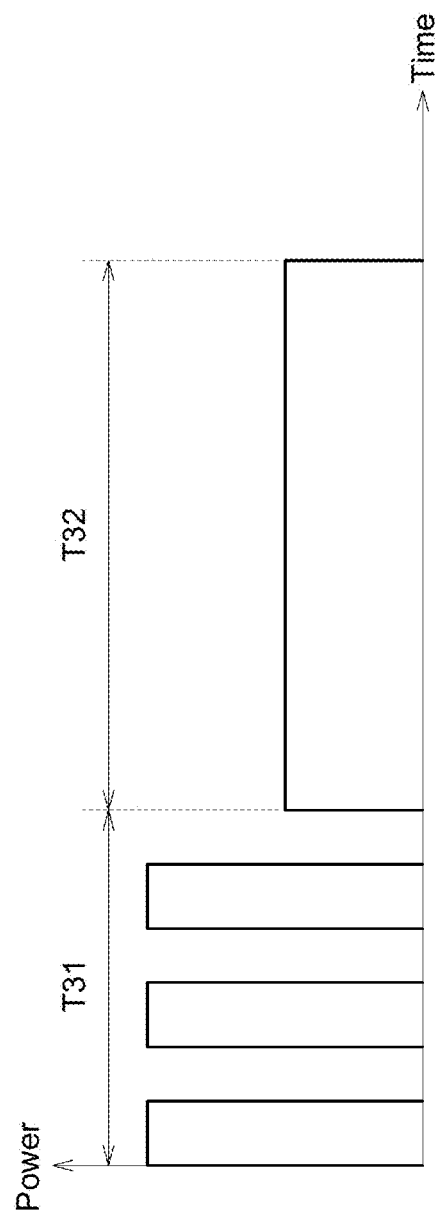
FIG. 9B is a view showing the relationships between time and the luminous power of the light source according to the fluid sterilizing device of FIG. 9A.

Referring to FIGS. 9A to 9B, FIG. 9A is a cross-sectional view of a fluid sterilizing device 500 according to another embodiment of the present disclosure, and FIG. 9B is a view showing the relationships between time and the luminous power of the light source according to the fluid sterilizing device 500 of FIG. 9A. The fluid sterilizing device 500 includes a main body 210, the circuit board 120, a light source 230, the partition plate 140, the transparent plate 150, the outer cover 160, the casing 170 and a light intensity sensor 580. The light intensity sensor 580 is disposed on the circuit board 120 and is used to sense the light intensity. The light intensity sensor 580 could be also disposed on the position in accordance with that of the light intensity sensors 131 and 132 of FIG. 1E, but is not limited thereto. In addition, the light intensity sensor of the fluid sterilizing device in other embodiments could be also disposed on the position in accordance with that of the light intensity sensor 580 of the fluid sterilizing device 500.

In initial time interval T31, the light intensity sensor 580 detects the light intensity of the light source 230, and turns on about 50% of the unit pulse time, in a unit time, to achieve a sterilization effect. With time goes by, for example, in the time interval T32, the light intensity sensor 580 continuously detects the light intensity of the light source 230. When the light intensity is reduced to 50% due to the light decay, 100% unit pulse time is turned on, such that the sterilization effect does not deteriorate due to the light decay. During the sterilization process, in the time interval T31, the sterilization dose is about equal to 50% of the pulse time multiplied by the light intensity, and in the time interval T32, the sterilization dose is about equal to 100% of the pulse time multiplied by 50% of the light intensity. Thus, the sterilization dose of the time interval T31 is equal to the sterilization dose of the time interval T32. As a result, by adjusting the unit pulse time of the light source 230, the sterilization dose could be maintained.

In addition to sensing the light intensity of the light source 230, the light intensity sensor 580 could also determine the amount of bacteria passing through the fluid according to the intensity of the reflected light received in the chamber. When the reaction chamber is filled with air, the light intensity of the light received by the light intensity sensor 580 is about equal to the intensity of the light provided (emitted) by the light source 230. When the fluid F1 passing through the reaction chamber is pure water, the intensity of the light received by the light intensity sensor 580 is about 80% to 85% of the light intensity of the light source 230. In one embodiment, when the amount of colon *bacillus*, included in the fluid F1 (for example, water) passing through the reaction chamber, is 30 cfu/ml to 1000 cfu/ml, the light intensity received by the light intensity sensor 580 is about 60% to 35% of the light intensity of the light source 230. The fluid sterilizing device 500 could further include a controller (not shown) that controls the light intensity of the light source 230 according to the intensity of the reflected light sensed by the light intensity sensor 580. In another embodiment, the fluid sterilizing device 500 could further include an calculation unit (not shown), and the calculation unit determines the amount of bacteria contained in the fluid F1 according to the intensity of the reflected light sensed by the light intensity sensor 580. In another embodiment, the amount of impurities and particle size in the fluid also affect the intensity of the reflected light sensed by the light intensity sensor 580, and the calculation unit could determine the water quality of the fluid based on the intensity of the received reflected light.

Figure 10A:
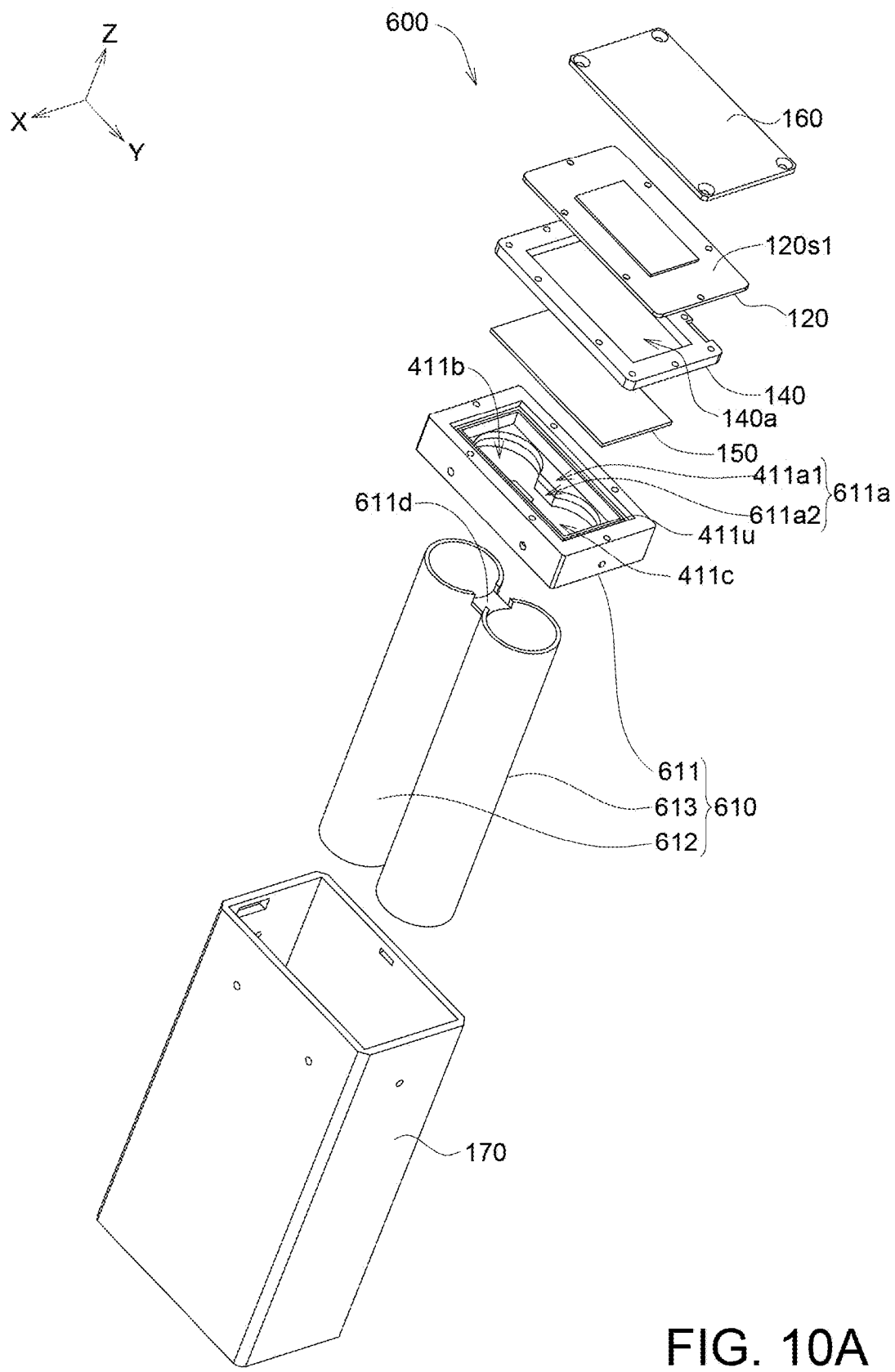
FIG. 10 A is an exploded view of a fluid sterilizing device according to another embodiment of the present disclosure.
FIG. 10B is a cross-sectional view of the assembled fluid sterilizing device of FIG. 10A.
Figure 10B:
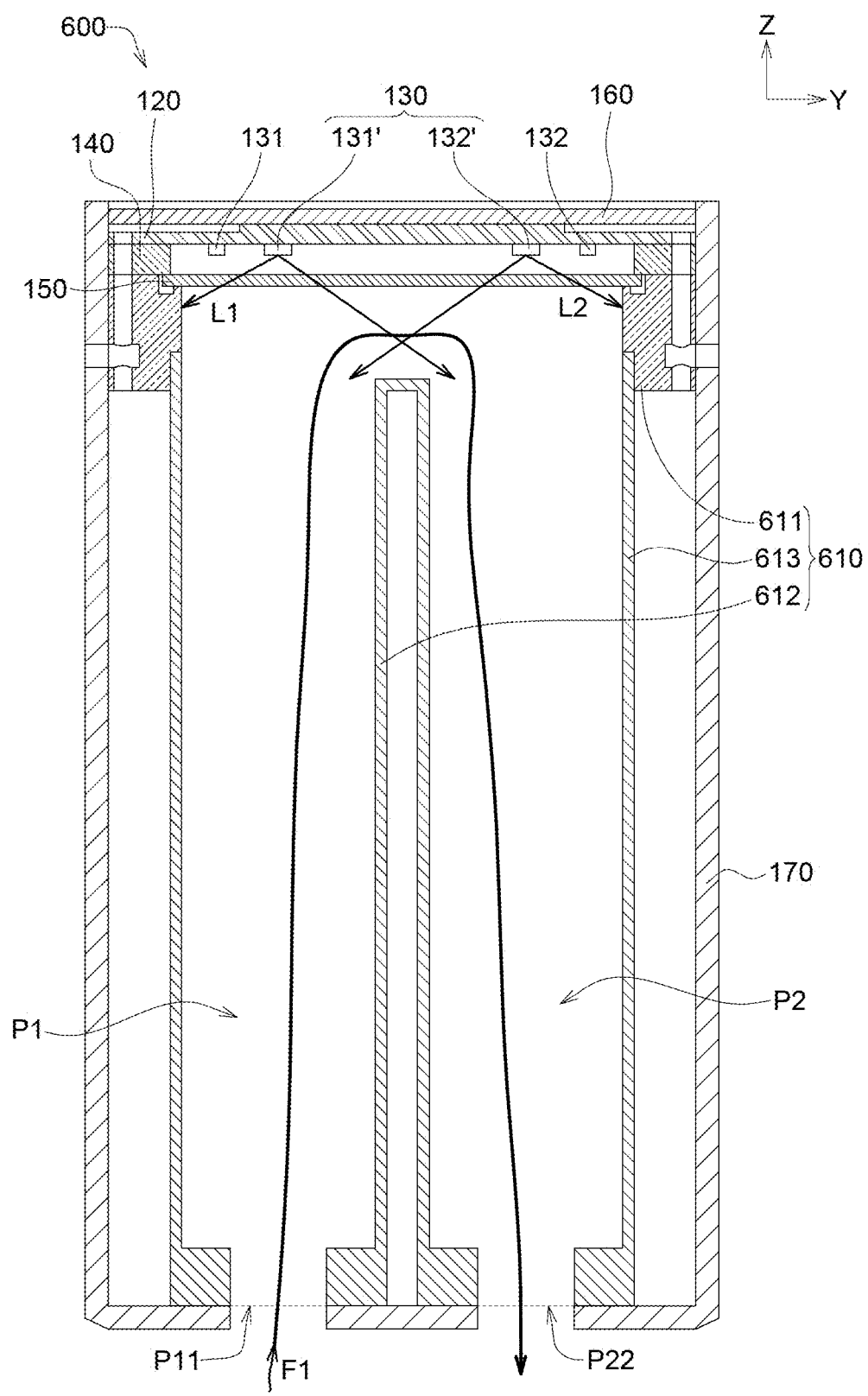

Referring to FIGS. 10A to 10B, FIG. 10 A is an exploded view of a fluid sterilizing device 600 according to another embodiment of the present disclosure, and FIG. 10B is a cross-sectional view of the assembled fluid sterilizing device 600 of FIG. 10A. The fluid sterilizing device 600 includes a main body 610, the circuit board 120, the light source 130, the partition plate 140, the transparent plate 150, the outer cover 160 and the casing 170.

The main body 610 includes a base 611, a first tube body 612 and a second tube body 613. The main body 610 has features similar to or identical to that of the main body 410, except that the base 611 could omit the partition. In detail, the base 611 has a communication chamber 611a, a first through hole 411b, and a second through hole 411c, wherein the communication chamber 611a includes a communication recess 411a1 and a cavity 611a2. The communication recess 411a1 extends to the cavity 611a2 from the carrying surface 411u, and the cavity 611a2 penetrates the base 611 from the communication recess 411a1 in the light-emitting direction. Due to the base 611 omitting the partition, the first sterilizing light L1 of the first light-emitting element 131' and the second sterilizing light L2 of the second light-emitting element 132' are not blocked by the partition, and the first sterilizing light L1 is added to the second reaction, and accordingly the amount of the first sterilizing light L1 entering the first reaction chamber P1 and the amount of the second sterilizing light L2 entering the second reaction chamber P2 for increasing the sterilization rate.

As shown in FIG. 10B, the first tube body 612 and the second tube body 613 are connected to each other. For example, the first tube body 612 and the second tube body 613 are connected by a connecting portion 611d. When the first tube body 612 and the second tube body 613 are respectively assembled to the first through hole 411b and the second through hole 411c, the cavity 611a2 is filled with the connecting portion 611d to prevent the fluid F1 from leaking from the cavity 611a2 outside the base 611. In addition, the first tube body 612, the second tube body 613 and the connecting portion 611d could be assembled to be a whole after these components are made separately.

Figure 11A:
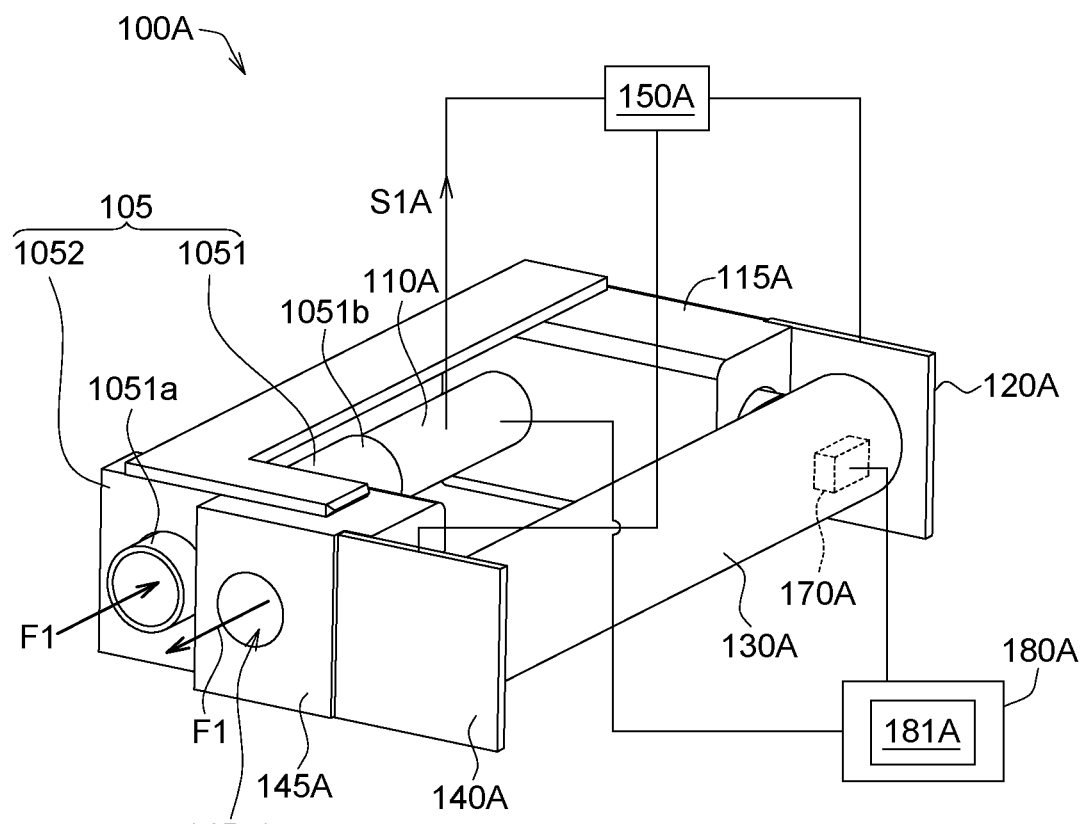
Figure 11B:
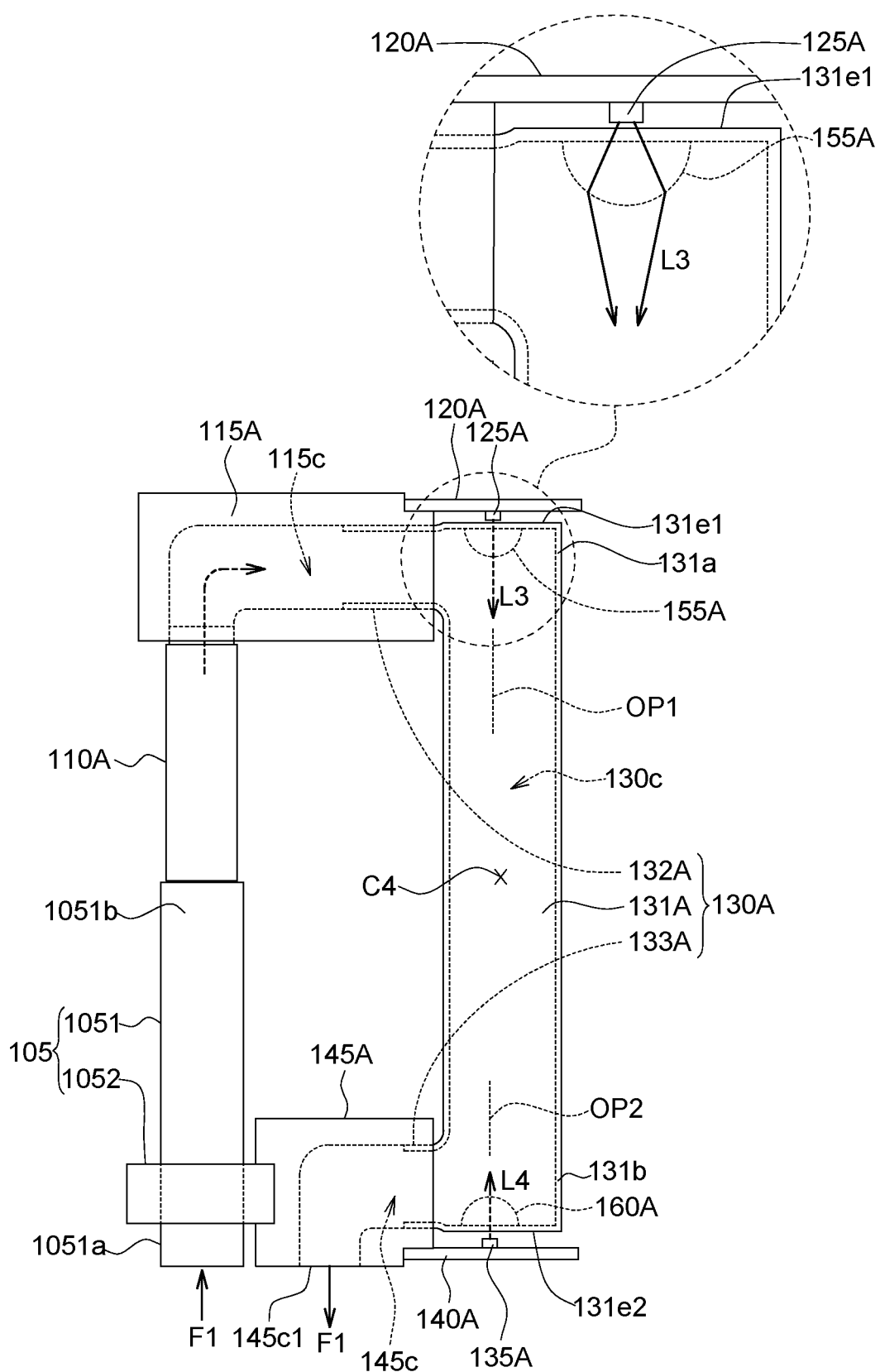

Refer to FIGS. 11A and 1B. FIG. 11A shows a schematic diagram of a fluid processing device 100A according to an embodiment of the present disclosure. FIG. 11B shows a top view of the fluid processing device 100A of FIG. 11A.

The fluid processing device 100A includes a transmission tubular piece 105, a fluid sensor 110A, a first heat conduction component 115A, a first circuit board 120A, a first light source 125A, a reaction chamber body 130A, a second light source 135A, a second circuit board 140A, a second heat conduction component 146A, a controller 150A, a first lens 155A and a second lens 160A.

The reaction chamber body 130A has a reaction chamber 130c through which a fluid F1 passes. The first light source 125A is used to emit a first light L3 to the reaction chamber 130c. The fluid sensor 110A is used to detect the passage and flow rate of the fluid F1 and accordingly output a signal S1A. The controller 150A controls the first light source 125A to emit the first light L3 and/or controls the second light source 135A to emit a second light L4 in response to the signal S1A. For example, when the fluid sensor 110A detects that the flow rate of the fluid F1 is over a limit, the fluid sensor 110A outputs a signal S1A. The signal S1A can be an activation signal which informs the controller 150A to activate the first light source 125A to emit the first light L3 and/or activate the second light source 135A to emit the second light L4. In another embodiment, the fluid sensor 110A detects the flow rate of the fluid F1, and outputs a signal S1A which can be a flow rate signal. The controller 150A receives the signal S1A, and determines whether the flow rate of the fluid is over a limit. If the flow rate of the fluid is over the limit, the controller 150A activates the first light source 125A to emit the first light L3 and/or activate the second light source 135A emit the second light L4. In another embodiment, the fluid sensor 110A detects the flow rate of the fluid F1, and accordingly outputs a signal S1A, which can be a flow rate signal. The controller 150A receives the signal S1A, and determines the intensity of the first light L3 emitted from the first light source 125A and/or the intensity of the second light L4 emitted from the second light source 135A according to the flow rate of the fluid F1. For example, when the flow rate of the fluid F1 is high, the controller 150A increases the intensity of the first light L3 emitted from the first light source 125A and/or the intensity of the second light L4 emitted from the second light source 135A. When the flow rate of the fluid F1 is low, the controller 150A decreases the intensity of the first light L3 emitted from the first light source 125A and/or the intensity of the second light L4 emitted form the second light source 135A.

In an embodiment, the first light source 125A and the second light source 135A can be UV light sources, and the first light L3 and the second light L4 emitted from the first light source 125A and the second light source 135A have sterilization (or disinfection) function. To summarize, the fluid processing device 100A of the embodiments of the present disclosure can automatically detect the passage of the fluid F1 and automatically activate the sterilization function. Thus, the sterilization light does not need to continuously irradiate 24 hours a day, and electric power consumption can be reduced. Moreover, the fluid F1 can be a gas or a liquid, wherein the fluid refers to the flowing water or the tap water, and the gas refers to air, oxygen, and so on.

In other embodiments, the light emitted from the first light source 125A and/or the second light source 135A is not limited to the sterilization light. For example, the fluid F1 within the reaction chamber 130c can be ozone, and the light emitted from the first light source 125A and/or the second light source 135A can let the gas to generate chemical reaction such as cracking ozone to generate oxygen. In other embodiments, the chamber wall of the reaction chamber 130c can be coated with photo catalyst, and the fluid F1 within the reaction chamber 130c can be an organic gas.

It can be understood from the above disclosure that the fluid processing device of the embodiments of the present disclosure can be a fluid sterilization device or a fluid reaction device.

In another embodiment, the first light source 125A and/or the second light source 135A can be light-emitting diodes or other suitable light-emitting elements, and the first light L3 and/or the second light L4 emitted from the first light source 125A and/or the second light source 135A can be UV light having bactericidal effect. In comparison to the mercury lamp, the light-emitting diode has the advantages of quicker startup, smaller volume and lower electric power consumption. The chamber wall of the reaction chamber 130c can be coated with a material having high reflectivity towards the first light L3 and/or the second light L4. For example, the chamber wall is coated with a metal material having high reflectivity towards the UV light.

Detailed descriptions of the structure of the fluid processing device 100A are disclosed below.

As indicated in FIG. 11A and 11B, the transmission tubular piece 105 connects the first heat conduction component 115A and the second heat conduction component 145A. The transmission tubular piece 105 includes a transmission tube 1051 and a flange 1052, wherein the transmission tube 1051 passes through the flange 1052. The flange 1052 and the second heat conduction component 145A can be fixed together by way of engaging, welding or bonding, so that relative position between the transmission tube 1051 and the second heat conduction component 145A can also be fixed. The wherein the first end 1051a can receive the input of the fluid F1, and the second end 1051b is connected to the fluid sensor 110A. In another embodiment, depending on the position of the second heat conduction component 145A, the flange 1052 does not have to be connected to the second heat conduction component 145A. The shape of the transmission tube 1051 is dependent on the flow path and is not subjected to specific restriction in the embodiments of the present disclosure.

As indicated in FIG. 11A, in the present embodiment, the opening of the first end 1051a of the transmission tube 1051 can be used as a fluid inlet, and the opening 145c1 of the second heat conduction component 145A can be used as a fluid outlet. In another embodiment, the opening of the first end 1051a of the transmission tube 1051 can be used as a fluid outlet, and the opening 145c1 of the second heat conduction component 145A can be used as a fluid inlet.

The fluid sensor 110A connects the transmission tube 1051 of the transmission tubular piece 105 and the reaction chamber body 130A. Thus, when the fluid F1 enters the fluid processing device 1100A via the first end 1051a of the transmission tube 1051, the fluid sensor 110A detects the passage of the fluid F1 and accordingly outputs a signal S1. The controller 150A controls the first light source 125A to emit a first light L3 and/or the second light source 135A to emit a second light L4 to the reaction chamber 130c to activate the sterilization function in response to the signal.

The first heat conduction component 115A has a first channel 115c through which the fluid F1 passes. The first circuit board 120A is connected to the first heat conduction component 115A. The first light source 125A is electrically connected to the first circuit board 120A. Thus, the heat generated from the irradiation of the first light source 125A can firstly be transferred to the first heat conduction component 115A through the first circuit board 120A. Then, the heat is transferred to the fluid F1 within the first channel 115c. Lastly, the heat is dissipating to the exterior with the fluid F1. Thus, the fluid processing device 100A of the present embodiment can transfer the heat through the fluid F1. Since the fluid F1 circulates and forms a cycle with the exterior, the fluid processing device 100A can provide a high efficiency of heat dissipation. Also, after the fluid F1 enters the fluid processing device 100A and the fluid sensor 110A detects the passage of the fluid F1, the first light source 125A emits the first light L3 and the fluid immediately provide a heat-dissipating function as it passes by. The first light source 125A does not emit the first light L3 unless the fluid F1 enters the fluid processing device 100A, so the electric power consumption of the fluid processing device 100A can be saved.

In the present embodiment, the fluid F1 within the first channel 115c of the first heat conduction component 115A can directly contact the inner wall of the first channel 115c to increase the efficiency of heat transfer. In another embodiment, the fluid sensor 110A and/or the reaction chamber body 130A can extend to the first channel 115c. Thus, the fluid F1 does not need to contact the inner wall of the first channel 115c, but the heat carried by the fluid F1 still can be ventilated and transferred to the first heat conduction component 115A. Moreover, the first heat conduction component 115A can be formed of metal, such as copper or other materials with high conductivity.

As indicated in FIG. 11A and 11B, the first circuit board 120A of the present embodiment is directly connected to the first heat conduction component 115A, so that the heat resistance between the first circuit board 120A and the first heat conduction component 115A can be reduced, the path of heat transfer can be shortened, and the efficiency of heat dissipation can be increased.

As indicated in FIG. 11B, the reaction chamber body 130A includes a first tube 131A, a second tube 132A and a third tube 133A. The reaction chamber 130c is defined as an interior space of the first tube 131A. The first tube 131A has a first end 131a and a second end 131b opposite to the first end 131a. The reaction chamber body 130A is a translucent chamber body. The first light source 125A faces the first end wall 131e1 of the first end 131a, so that the first light L3 emitted form the first light source 125A can enter the first tube 131A of the reaction chamber body 130A through the first end wall 131e1 to sterilize the fluid F1 within the reaction chamber body 130A. Since the first tube 131A is a straight tube (that is, the first tube 131A is not bent or curved), the optical axis OP1 of the first light L3 has a direction substantially parallel to the extending direction of the first tube 131A of the reaction chamber body 130A, and the fluid F1 flowing between the first end 131a and the second end 131b can all be irradiated by the first light L3.

Similarly, the second end 131b of the first tube 131A of the reaction chamber body 130A has a second end wall 131e2. The second light source 135A faces the second end wall 131e2 of the second end 131b, so that the second light L4 emitted from the second light source 135A can enter the first tube 131A of the reaction chamber body 130A through the second end wall 131e2 to sterilize the fluid F1 within the reaction chamber body 130A. Since the first tube 131A is a straight tube, the optical axis OP2 of the second light L4 has a direction substantially parallel to the extending direction of the first tube 131A of the reaction chamber body 130A, and the fluid F1 flowing between the second end 131b and the first end 131a can all be irradiated by the second light L4.

Since both the first end 131a and the second end 131b of the first tube 131A can be irradiated by the light, the central position C4 between the first end 131a and the second end 131b has a larger intensity of the light (in comparison to the situation when only one end is irradiated by the light). In other words, the sterilization performance of the sterilization light at the central position C4 between the first end 131a and the second end 131b isn't decreased despite that the central position C4 is farther away from the light source than the two ends. Furthermore, the fluid processing device 100A of the embodiments of the present disclosure adopts the design of double-ended irradiation. In comparison to the design of single-ended irradiation, the double-ended irradiation irradiates a larger area of the fluid F1 and produces a higher sterilization rate for the fluid F1 having high concentration of bacterium.

As indicated in FIG. 11, the second tube 132A is non-parallelly connected to the first end 131a of the first tube 131A to connect the first heat conduction component 115A, so that the fluid F1 within the first heat conduction component 115A can be interconnected with the reaction chamber body 130A through the second tube 132A. In an embodiment, the second tube 132A and the first tube 131A can be connected to form an L-shape. That is, the angle between the second tube 132A and the first tube 131A is substantially 90°. However, the angle can have other angular values. In another embodiment, the second tube 132A can pass through the first channel 115c and extend to connect the fluid sensor 110A. Under such design, the second tube 132A can directly contact the inner wall surface of the first channel 115c to reduce the heat resistance between the second tube 132A and the inner wall surface of the first channel 115c of the first heat conduction component 115A.

Furthermore, the third tube 133A is non-parallelly connected to the second end 131b of the first tube 131A to connect the second heat conduction component 145A, so that the fluid F1 within the first tube 131A can be interconnected with the second heat conduction component 145A through the third tube 133A. In an embodiment, the third tube 133A and the first tube 131A can be connected to form an L-shape. That is, the angle between the third tube 133A and the first tube 131A is substantially 90°. However, the angle can have other angular values. In another embodiment, the third tube 133A can pass through the second channel 145c of the second heat conduction component 145A. Under such design, the third tube 133A can directly contact the inner wall surface of the second channel 145c to reduce the heat resistance between the third tube 133A and the inner wall surface of the first channel 115c of the second heat conduction component 145A.

As indicated in FIG. 11B, the first tube 131A, the second tube 132A and the third tube 133A can be arranged as a U-shape. In another embodiment, depending on the positions of the first heat conduction component 115A and the second heat conduction component 145A, the reaction chamber body 130A can have other shape such as an S-shape. In an embodiment, the first tube 131A, the second tube 132A and/or the third tube 133A can be straight tubes, bent tubes or a combination thereof to match the positions of the first heat conduction component 115A and the second heat conduction component 145A and to form different geometric shapes. Besides, the first tube 131A, the second tube 132A and the third tube 133A can be integrally formed in one piece.

As indicated in FIG. 11B, the first lens 155A is disposed within the first tube 131A of the reaction chamber body 130A and opposite to the first light source 125A, so that the first light L3 emitted from the first light source 125A can pass through the first lens 155A. For example, the first lens 155A is disposed on an opposite side of the first end wall 131e1, and the first light L3 can be focused by the first lens 155A to increase the directivity of the first light L3.

Similarly, as indicated in FIG. 11B, the second lens 160A is disposed within the first tube 131A of the reaction chamber body 130A and opposite to the second light source 135A, so that the second light L4 is emitted from the second light source 135A can pass through the second lens 160A. For example, the second lens 160A is disposed on an opposite side of the second end wall 131e2, and the second light L4 can be focused by the second lens 160A to increase the directivity of the second light L4.

In an embodiment, the first lens 155A, the second lens 160A and the first tube 131A can be integrally formed in one piece. For example, the first lens 155A or/and the second lens 160A can constitute a portion of the tube wall of the first tube 131A. That is, the first lens 155A constitutes the first end wall 131e1 of the first end 131a of the reaction chamber body 130A, and the second lens 160A constitutes the second end wall 131e2 of the second end 131b of the reaction chamber body 130A. The light emitted from the first light source 125A and the light emitted from the second light source 135A can pass through the lens-like first end wall 131e1 and second end wall 131e2 respectively to reduce the optical loss which occurs when the passes through an interface. In other embodiments, the first lens 155A and/or the second lens 160A can be formed separately and then are engaged or adhered on the first tube 131A by using a bonding technology. Furthermore, the first lens 155A has an incident surface, which can be a convex surface, a concave surface, a planar surface, or a combination thereof. Similarly, the second lens 160A has an incident surface is similar or identical to the incident surface of the first lens 155A, and the similarities are not repeated here.

As indicated in FIG. 11B, the second heat conduction component 145A has a second channel 145c through which the fluid F1 passes. The second circuit board 140A is connected to the second heat conduction component 145A. The second light source 135A is electrically connected to the second circuit board 140A. Thus, the heat generated from the irradiation of the second light source 135A can firstly be transferred to the second heat conduction component 145A through the second circuit board 140A. Then, the heat is transferred to the fluid F1 within the second channel 145c. Lastly, the heat is dissipating to the exterior with the fluid F1. Thus, the fluid processing device 100A of the present embodiment can transfer the heat through the fluid F1. Since the fluid F1 circulates and forms a cycle with the exterior, the fluid processing device 100A can provide a high efficiency of heat dissipation. Also, when the second light source 135A emits the second light L4 (the second light source 135A starts to generate heat), this implies that the fluid F1 already enters the fluid processing device 100A and can immediately provide a heat-dissipating function. The second light source 135A does not emit the second light L4 unless the fluid F1 enters the fluid processing device 100A, so the electric power consumption of the fluid processing device 100A can be save.

In the present embodiment, the fluid F1 within the second channel 145c of the second heat conduction component 145A can directly contact the inner wall of the second channel 145c to increase the efficiency of heat transfer. In another embodiment, the third tube 133A of the reaction chamber body 130A can extend to the second channel 145c. Thus, the fluid F1 does not contact the inner wall of the second channel 145c, but the heat carried by the fluid F1 still can be ventilated and transferred to the second heat conduction component 145A.

As indicated in FIGS. 11A and 11B, the second heat conduction component 145A has an opening 145c1 from which the sterilized fluid F1 can flow out. In another embodiment, the third tube 133A can extend to the outside of the opening 145c1 or near the opening 145c1, but the embodiments of the present disclosure are not limited thereto. Moreover, the second heat conduction component 145A can be formed of a metal, such as copper or other material with high conductivity.

The fluid processing device 100A can be electric powered by an external electric power supply or an internal electric power storage device (not illustrated) such as battery. The electric power storage device can be a solar cell, which receives the light of solar energy and then converts the light into electric power and stores it in the electric power storage device. In other embodiments, the electric power storage device can store the electric power generated from the work performed on the electric power generator by a fluid, such as water flow or gas flow.

As indicated in FIG. 11A, the fluid processing device 100A further includes a light intensity sensor 170A and a wireless output device 180A. The light intensity sensor 170A is disposed within the reaction chamber body 130A to detect the intensities of the first light L3 and the second light L4. The wireless output device 180A has a display panel 181A on which the flow rates detected by the fluid sensor 110A and the light intensities detected by the light intensity sensor 170A are displayed.

Figure 12A:
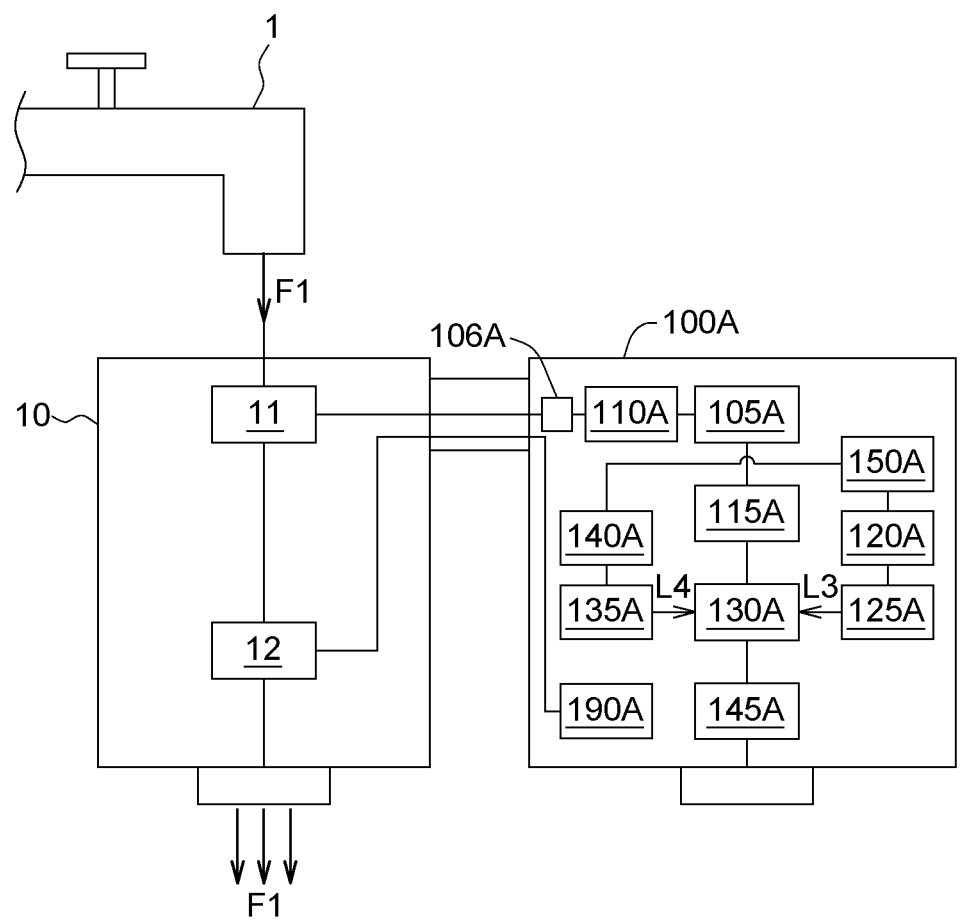
Figure 12B:
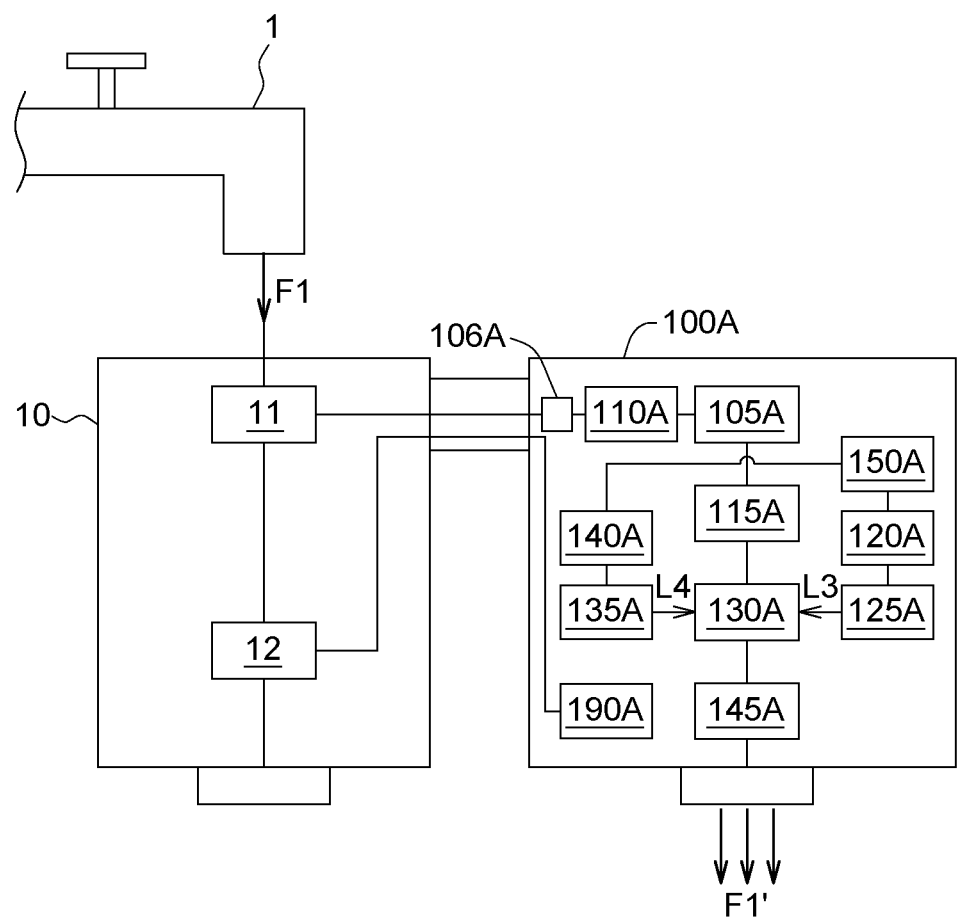
Figure 12C:
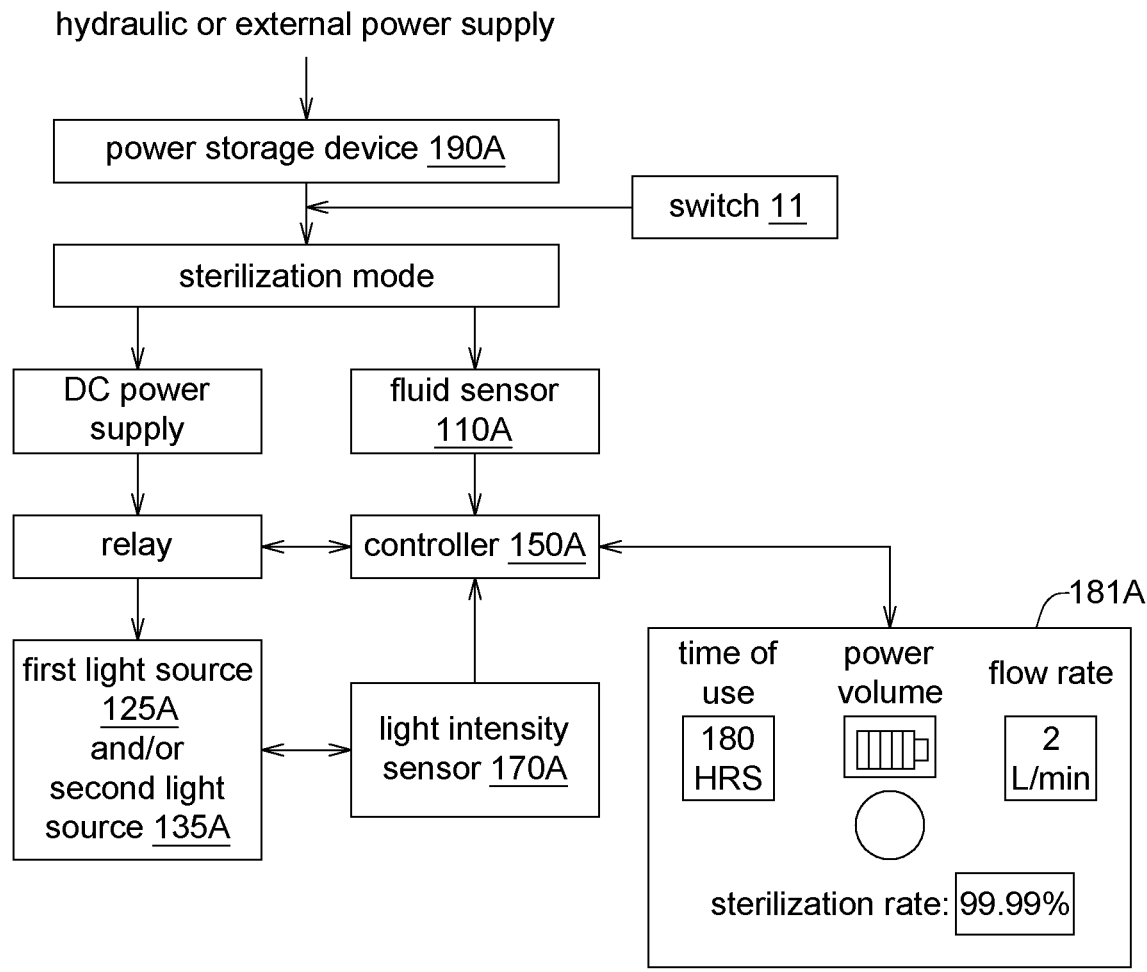

Refer to FIGS. 12A~12C, schematic diagrams of an application example of a fluid processing device 100A according to an embodiment of the present disclosure are shown. The fluid processing device 100A is disposed on the chamber 10. The chamber 10 can be installed in a water source 1, such as a faucet. The chamber 10 at least includes a switch 11 and an electrical power generator 12. The fluid processing device 100A further includes an electric power storage device 190A. The switch 11 can selectively switch the fluid F1 of the water source 1 to the electric power generator 12 or the fluid processing device 100A.

As indicated in FIG. 12A, when the switch 11 switches the fluid F1 to the electric power generator 12, the fluid F1 performs work on the electric power generator 12 to generate electric power. The electric power can be stored in the electric power storage device 190A of the fluid processing device 100A to provide necessary electric power to the first light source 125A, the second light source 135A and/or any other elements of the fluid processing device 100A. The fluid F1 exited from the electric power generator 12 can be used in general purpose such as hand wash or fruit and vegetable wash.

As indicated in FIG. 12B, when the switch 11 switches the fluid F1 to the fluid processing device 100A, the fluid F1 sequentially passes through the fluid sensor 110A, the transmission tubular piece 105, the first heat conduction component 115A, the reaction chamber body 130A and the second heat conduction component 145A. The fluid F1 within the reaction chamber body 130A is irradiated by the first light source 125A and the second light source 135A and become a sterilized Fluid F1' which can be used in purposes different from that of the unsterilized fluid F1. For example, the sterilized fluid F1' can be used to clean burned or wounded part of human body or can be used in other treatments that require bacteria-free or bacteria less water. As indicated in FIG. 12B, the fluid F1 is filtered by a filter cartridge 106A before passing through the fluid sensor 110A. In another embodiment, the filter cartridge 106A can be disposed in the downstream of the fluid sensor 110A, so that the fluid F1 is filtered by the fluid sensor 110A before passing through the filter cartridge 106A.

As indicated in FIG. 12C, when the switch 11 switches the fluid F1 to the fluid processing device 100A, the fluid sensor 110A detects the passage of the fluid F1, and the controller 150A activates a sterilization mode accordingly. Meanwhile, the electric power stored in the electric power storage device 190A is provided to the first light source 125A and/or the second light source 135A through the electrical relay, so that the first light source 125A and/or the second light source 135A can emit the light. The relay can be disposed between the electric power storage device 190A and the light source. The fluid sensor 110A and the light intensity sensor 170A are electrically connected to the controller 150A to transmit a signal to the controller 150A, which performs relevant processing according to the receive signal.

It can be understood from the above disclosure that the switch 11 can switch the fluid F1 of the water source 1 to the electric power generator 12 or the fluid processing device 100A. Thus, when the sterilized fluid F1' is required, the switch 11 can immediately switch the fluid F1 to the fluid processing device 100A to quickly obtain the sterilized fluid F1' for emergent use (such as the treatment of burn injury in the hospital).

As indicated in FIG. 12C, the display panel 181A is electrically connected to the controller 150A. The controller 150A can display the detection results, such as the flow rate detected by the fluid sensor 110A and the intensity of the light detected by the light intensity sensor 170A, on the display panel 181A. The time of use, the electric power volume and/or the sterilization rate can also be displayed on the display panel 181A. Data, such as the flow rate of the fluid, the intensity of the light, the time, the electric power volume and/or the sterilization rate, can also be stored in the controller 150A. The controller 150A can calculate according to the above data to determine exemplary parameters for the fluid processing device 100A. For example, to achieve a sterilization rate of 90%, the controller 150A can calculate the required intensity of the light for the fluid with a particular flow rate or the required flow rate of the fluid for a particular light intensity. Based on the concept of the Internet of Things (IoT), the flow rate of the fluid, the intensity of the light, the time of use, the electric power volume and/or the sterilization rate of multiple fluid processing devices 100A can be collected and stored in a remote cloud processor. The cloud processor can compare the data received from individual fluid processing device 100A with the big data of other fluid processing devices and calculate exemplary parameters for individual fluid processing device 100A. For example, to achieve a sterilization rate of 90%, the cloud processor can calculate the required intensity of the light for the fluid with a particular flow rate or the required flow rate of the fluid for a particular intensity of the light. For example, the fluid processing device 100A at a particular region transmits the GPS coordinates of its location to the cloud processor, and the cloud processor can compare the data received from the fluid processing devices 100A near the location and calculate exemplary parameters for the fluid processing device 100A at the particular region.

To summarize, the controller 150A can calculate the flow rate of the fluid and the intensity of the light that are required to achieve a fixed sterilization rate according to at least one of the above data. Or, the fluid processing device 100A can store at least one of the above data in a cloud processor which can compare the stored big data and calculate the flow rate of the fluid and the intensity of the light that are required to achieve a fixed sterilization rate.

When the electric power of the fluid processing device 100A is insufficient, the controller 150A can transmit the message "Insufficient Electric power" to the display panel 181A to remind the user to replace or charge the electric power storage device.

In another embodiment, the display panel 181A is disposed in an external electronic device. The controller 150A can transmit the message of the fluid processing device 100A to the display panel 181A of an external electronic device through wireless communication such as WiFi or Bluetooth. The external electronic device is such as a computer or a mobile phone. Thus, the fluid processing device can be monitored through an application program (App) of the mobile phone.

Figure 13A:
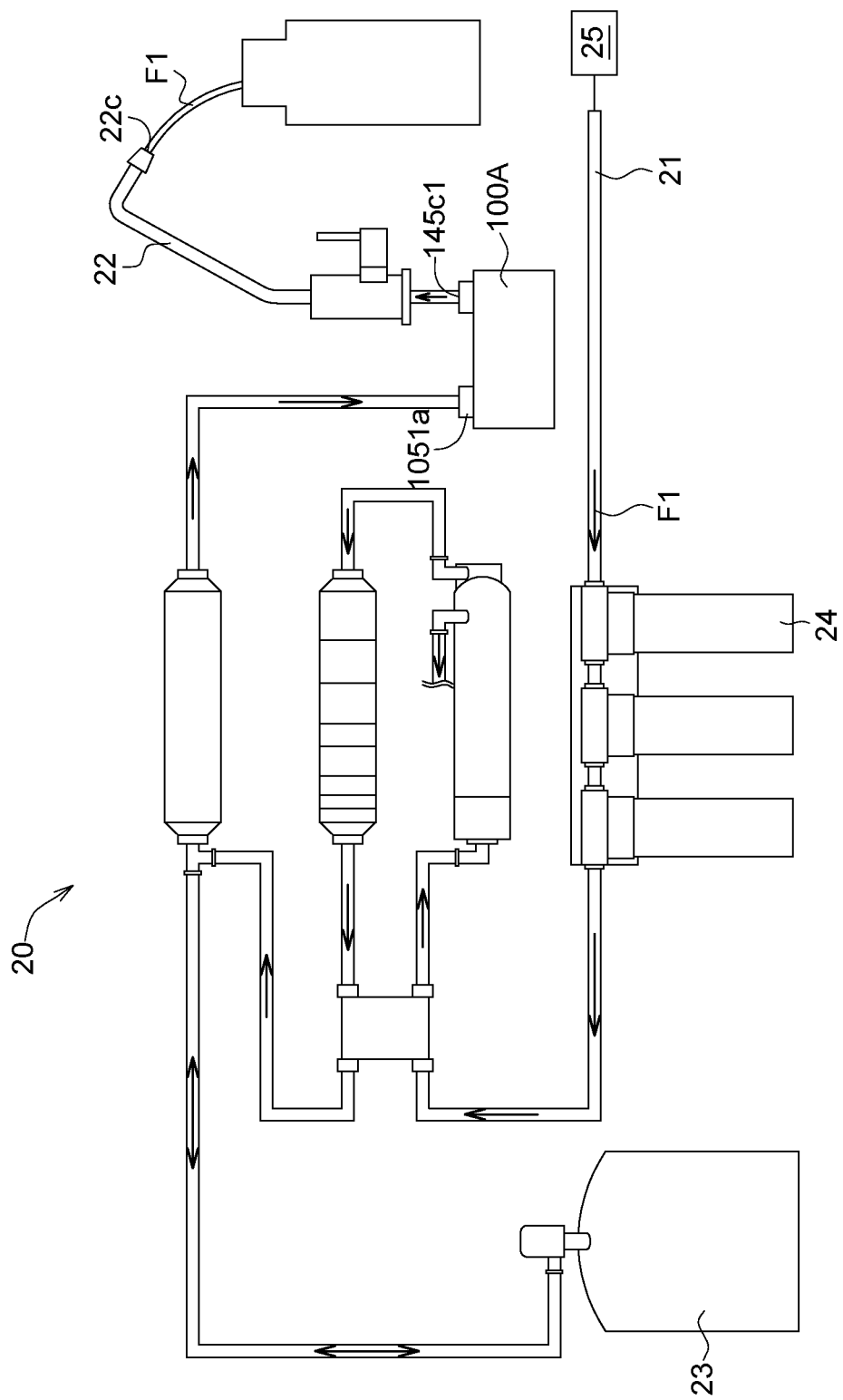
Figure 13B:
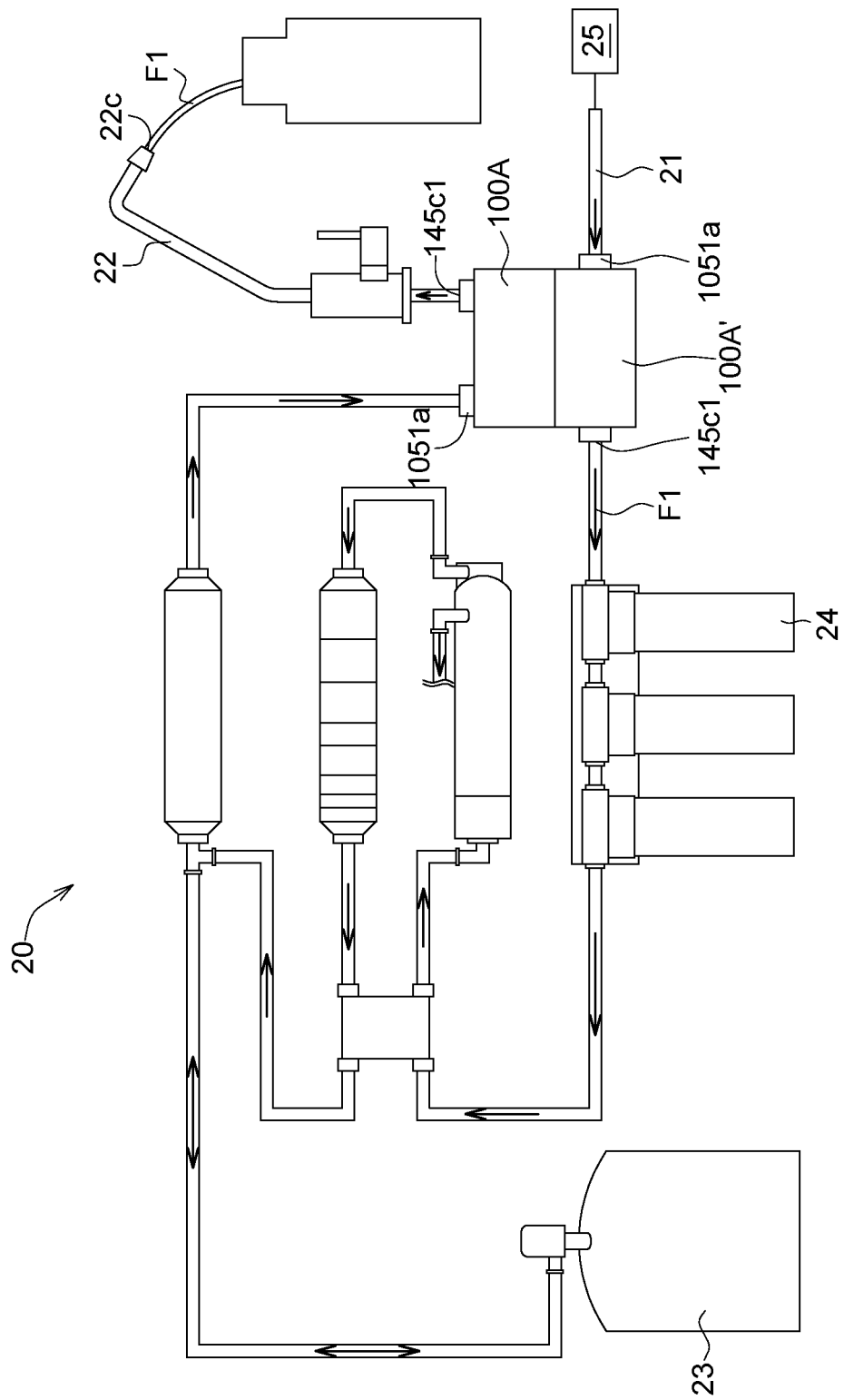

Refer to FIGS. 13A~13B, schematic diagrams of other application examples of a fluid processing device 100A according to an embodiment of the present disclosure are shown.

As indicated in FIG. 13A, the fluid processing device 100A can be disposed in the flow path of the water purifier 20. The water purifier 20 at least includes a water inlet tube 21, a water outlet tube 22, a water tank 23 and a filter cartridge 24. The fluid F1 of the water source 25 enters the water purifier 20 via the water inlet tube 21 to be filtered by the filter cartridge 24. Then, the filtered fluid F1 is stored in the water tank 23 via relevant tubes. As indicated in the diagram, the fluid processing device 100A can be disposed near the water outlet tube 22. In detail, the opening (fluid inlet) of the first end 1051a of the fluid processing device 100A is connected to the water tank 23, and the opening 145c1 (fluid outlet) is connected to the water outlet tube 22. Thus, after the fluid F1 within the water tank 23 is sterilized by the fluid processing device 100A, the sterilized fluid F becomes safe drinking water available for use when the fluid F exits from the outlet of the water outlet tube 22. Also, since the outlet 22c of the water outlet tube 22 is exposed in the air, bacterium may easily enter the water outlet tube 22 via the outlet 22 c. The fluid processing device 100A can sterilize the bacterium entering the water outlet tube 22 via the outlet 22c and reduce the bacterium breeding in the pipe.

As indicated in FIG. 13B, the fluid processing device 100A and another fluid processing device 100A' can be connected to form a set of fluid processing devices, wherein the fluid processing device 100A is adjacent to the water outlet tube 22, and the fluid processing device 100A' is adjacent to the water inlet tube 21. The structure of the fluid processing device 100A' is similar or identical to that of the fluid processing device 100A, and the similarities are not repeated here. As indicated in the diagram, the opening (fluid inlet) of the first end 1051a of the fluid processing device 100A' is connected to the water source 25, such as an unsterilized water source (such as tap water) or a polluted water source, and the opening 145c1 (fluid outlet) is connected to the filter cartridge 24. Thus, the fluid F1 coming from the water source 25 is firstly sterilized by the fluid processing device 100A', then the sterilized fluid F1 is filtered by the filter cartridge 24, and lastly the filtered fluid F1 is stored in the water tank 23 via a tube.

As indicated in FIG. 13B, the water purifier 20 can be realized by a reverse osmosis system. After the fluid F1 is processed with a first sterilization process by the fluid processing device 100A', the fluid F1 is processed with a reverse osmosis treatment. Before the fluid F1 is used for drinking purpose, the fluid F1 is further processed with a second sterilization process by the fluid processing device 100A. Thus, the fluid F1 can achieve a bactericidal effect of 99.9 above.

Figure 14A:
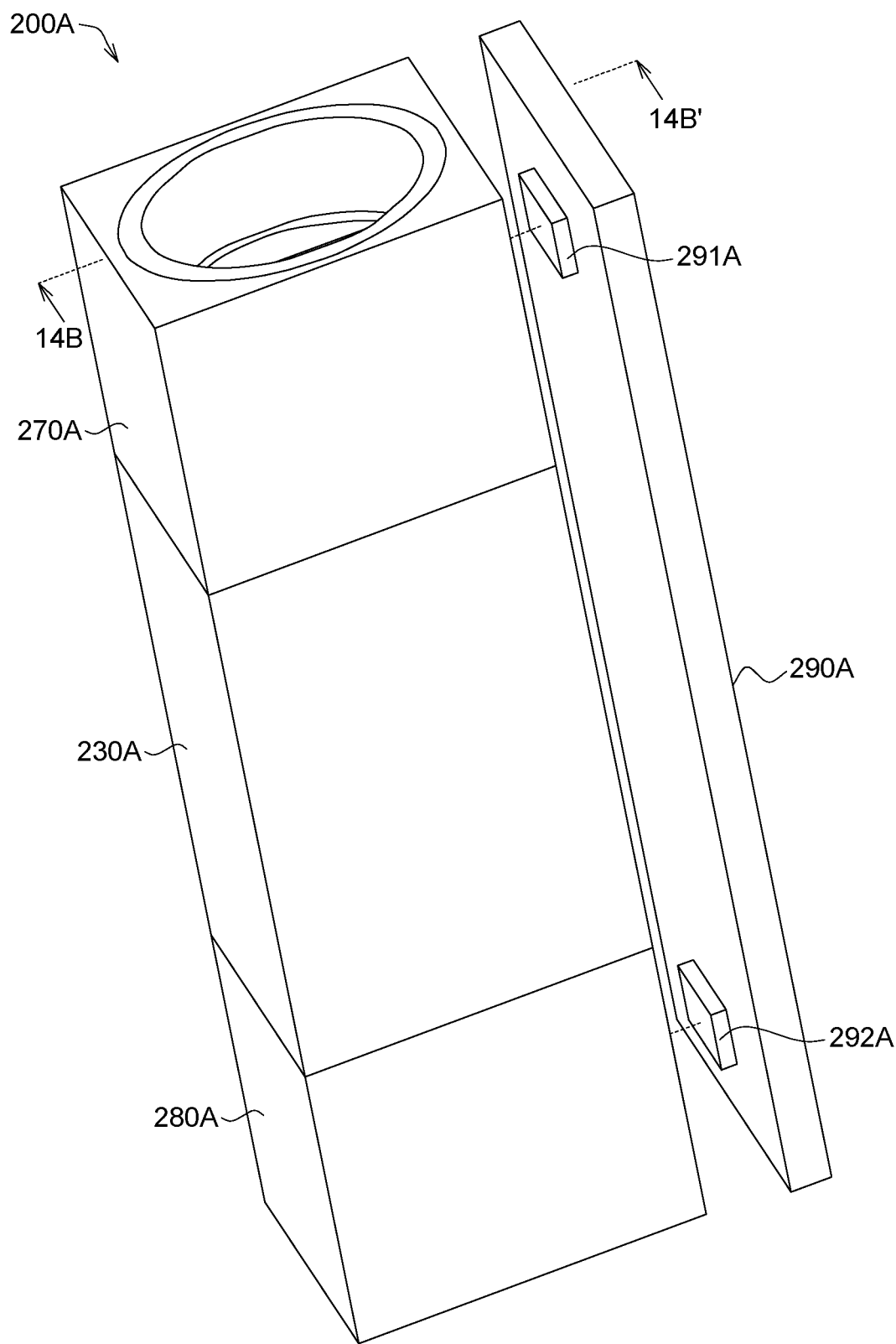
Figure 14B:
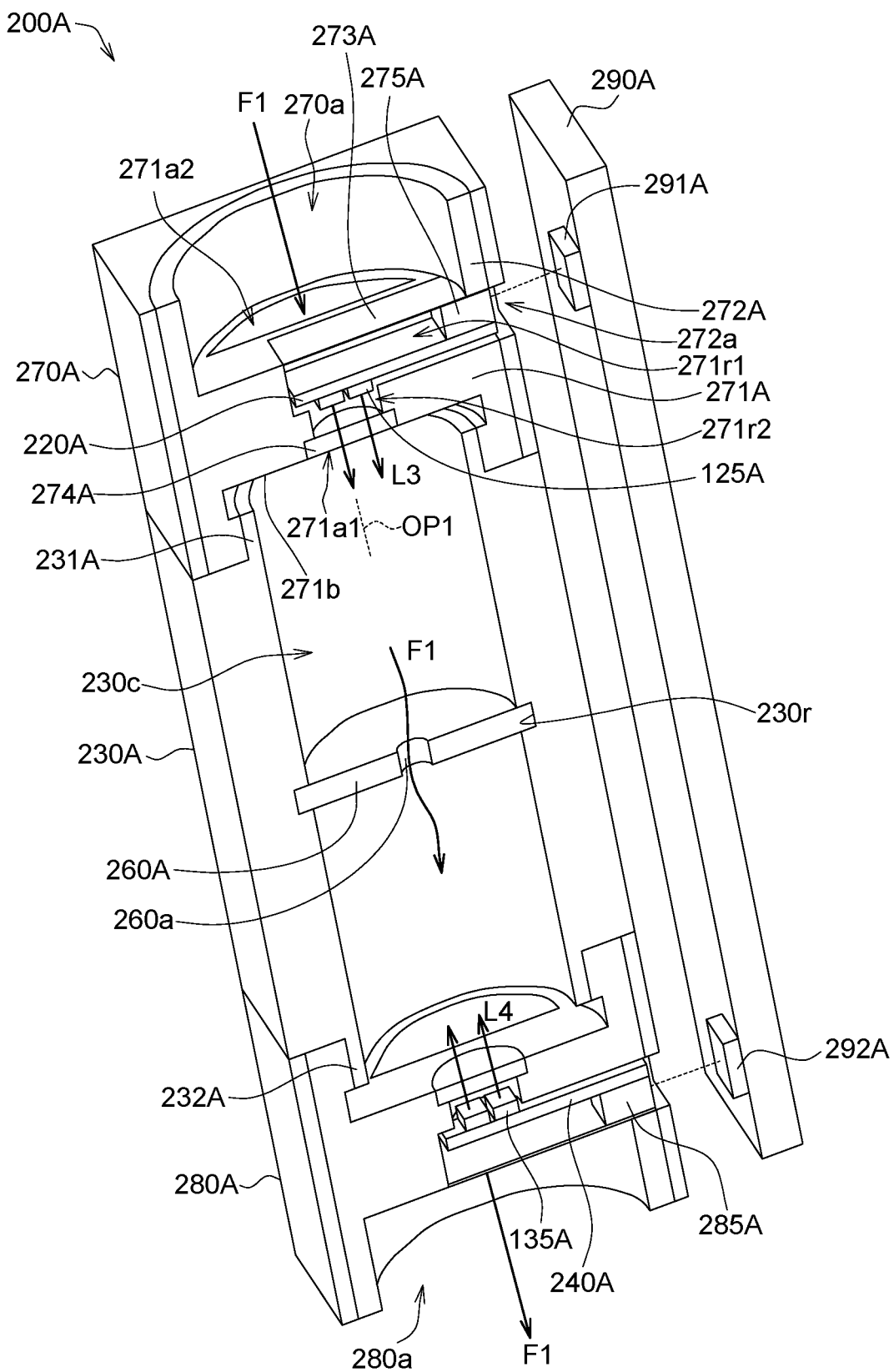
Figure 14C:
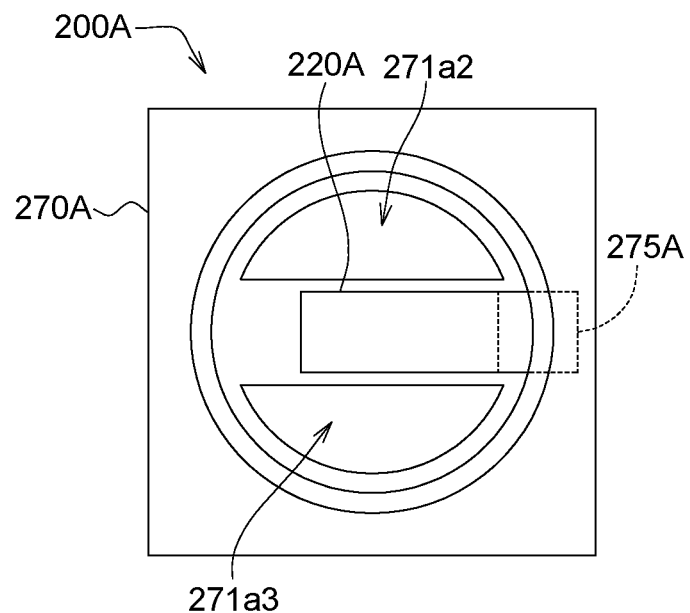
Figure 14D:
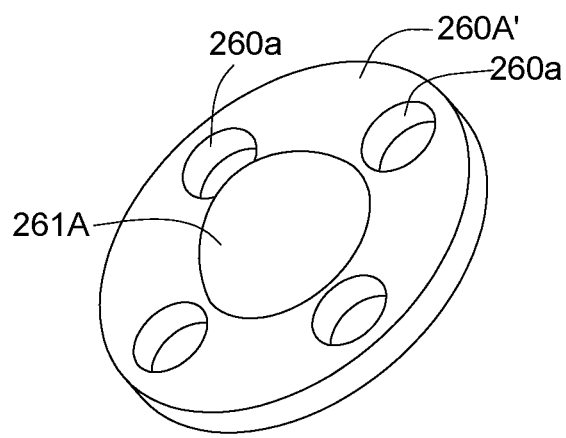

Refer to FIGS. 14A~14D. FIG. 14A shows a schematic diagram of a fluid processing device 200A according to another embodiment of the present disclosure. FIG. 14B shows a cross-sectional view of the fluid processing device 200A of FIG. 14A along a cross-sectional line 14B-14B'. FIG. 14C shows a top view of the fluid processing device 200A of FIG. 14A. FIG. 14D shows a 3D diagram of a flow disturbing component 260A' according to another embodiment of the present disclosure.

The fluid processing device 200A of the present embodiment can be realized by a portable device equipped with an independent electric power supply for the convenience of use.

The fluid processing device 200A includes a fluid sensor 110A (not illustrated), a first circuit board 220A, a first light source 125A, a reaction chamber body 230A, a second light source 135A, a second circuit board 240A, a controller 150A, a flow disturbing component 260A, a first adaptor 270A, a first connection port 275A, a second adaptor 280A, a second connection port 285A and a control module 290A.

The first adaptor 270A is connected to the reaction chamber body 230A and has a first adaptor opening 270a. The first adaptor 270A can be connected to the first end 231A of the reaction chamber body 230A by way of engaging or bonding, and is interconnected with the reaction chamber 230c of the reaction chamber body 230A. The first light source 125A is disposed within the first adaptor 270A.

As indicated in FIG. 14B, the first adaptor 270A includes a first bearing wall 271A and a first peripheral wall 272A. The first bearing wall 271A connects the inner wall surface of the first peripheral wall 272A, and has a first receiving portion 271r1. The first circuit board 220A is disposed within the first receiving portion 271r1. As indicated in the diagram, the fluid processing device 200A further includes a first cover 273A capable of sealing the opening on the first receiving portion 271r1 to avoid the fluid F1 entering through the first adaptor opening 270a to contact the first circuit board 220A within the first receiving portion 271r1 and thus to make the first circuit board 220A short-circuited.

As indicated in FIG. 14B, the first opening 272a is exposed on the first peripheral wall 272A from the first receiving portion 271r1. The first connection port 275A is disposed on the first circuit board 220A and exposed from the first opening 272a. Thus, the first connector 291A of the control module 290A is connected to the first connection port 275A through the first opening 272a and is therefore electrically connected to the first circuit board 220A.

As indicated in FIG. 14B, the first bearing wall 271A further has a second receiving portion 271r2 interconnected with the first receiving portion 271r1. The second receiving portion 271r2 is disposed on the bottom surface 271b of the first bearing wall 271A to expose the second opening 271a1. The bottom surface 271b faces a reaction chamber 230c. The first light source 125A, disposed on the first circuit board 220A and located at the second receiving portion 271r2, is exposed from the second opening 271a1. Thus, the first light source 125A can emit the first light L3 towards the reaction chamber 230c to sterilize the fluid F1. As indicated in the diagram, the fluid processing device 200A further includes a second cover 274 capable of sealing the second opening 271a1 of the second receiving portion 271r2 to avoid the fluid F1 entering the reaction chamber 230c contacting the first light source 125A of the second receiving portion 271r2 and making the first light source 125A short-circuited. Besides, the second cover 274 can be realized by a translucent cover allowing the first light L3 to pass through.

As indicated in FIGS. 14B and 14C, the first bearing wall 271A of the first adaptor 270A further has a first via 271a2 and a second via 271a3. The first via 271a2 and the second via 271a3 are interconnected with the reaction chamber 230c of the reaction chamber body 230A. The fluid F1 of the water source enters the reaction chamber 230c through the first via 271a2 and the second via 271a3 to be sterilized by the first light L3.

As indicated in FIGS. 14B and 14C, the first via 271a2 and the second via 271a3 are respectively disposed on two opposite sides of the first light source 125A. The first via 271a2 and the second via 271a3 provide a channel through which the fluid F1 of an external water source enters the reaction chamber 230c. Moreover, after the fluid F1 passes through the first via 271a2 and the second via 271a3, the fluid F1 converges into a single stream fluid F1 and enters the reaction chamber 230c. The single stream fluid F1 is fully sterilized by the first light L3 within the reaction chamber 230c.

As indicated in FIG. 14B, the optical axis OP1 of the first light L3 emitted form the first light source 125A is substantially identical to the extending direction of the reaction chamber body 230A (the same as the flow direction of the fluid F1), therefore the first light L3 can fully sterilize the fluid F1 along its flow direction.

As indicated in FIG. 14B, the second adaptor 280A is connected to the reaction chamber body 130A and has a second adaptor opening 280a. The second adaptor 280A can be connected to the second end 232 of the reaction chamber body 230A by way of engaging or bonding, and is interconnected with the reaction chamber 230c of the reaction chamber body 230A. The second light source 135A, the second circuit board 240A and the second connection port 285A are disposed within the second adaptor 280A, wherein the second light source 135A and the second connection port 285A both are disposed on the second circuit board 240A. The second connection port 285A can be connected to the second connector 292A of the control module 290A. The structure of the second adaptor 280A is similar or identical to that of the first adaptor 270A, and the similarities are not repeated here.

As indicated in FIG. 14B, the optical axis OP2 of the second light L4 emitted from the second light source 135A has a direction substantially inverse to the flow direction of the fluid within the reaction chamber body 230A. Therefore, before the fluid F1 exits via the second adaptor 280A, the fluid F1 is again sterilized by the second light L4.

The farther away from the light source the optical path of the sterilization light is, the weaker the intensity of irradiation will be. As indicated in FIG. 14B, since two ends of the reaction chamber body 230A of the present disclosure respectively have the first light source 125A and the second light source 135A disposed thereon, the intensity of irradiation is more uniform in the reaction chamber 230c of the reaction chamber body 230A (in comparison to the design in which only one end has the light source). In another embodiment, unless necessary, the fluid processing device 200A can keep only one of the first adaptor 270A and the second adaptor 280A or keep both the first adaptor 270A and the second adaptor 280A but omit the first light source 125A (together with the first circuit board 220A) or the second light source 135A (together with the second circuit board 240A). Besides, the position of the first light source 125A and the position of the second light source 135A are interchangeable in the fluid processing device 200A.

In another embodiment, the first adaptor opening 270a is the fluid inlet. In another embodiment, the fluid processing device 200A can be inverted, that is, the first adaptor opening 270a becomes the fluid outlet. Or, the position of the first adaptor 270A and the position of the second adaptor 280A can be swapped, such that the first adaptor opening 270a becomes the fluid outlet.

As indicated in FIG. 14B, the flow disturbing component 260A can be disposed within the reaction chamber 230c by way of engaging or bonding. For example, the reaction chamber body 230A has an annular engaging groove 230r. The flow disturbing component 260A can be embedded into the engaging groove 230r to be fixed on the reaction chamber body 230A. In other embodiment, the reaction chamber 230c can have multiple flow disturbing components 260A. Each flow disturbing component 260A has at least one flow disturbing hole 260a. The flow disturbing hole 260a can be located at the central position of the flow disturbing component 260A, but the embodiments of the present disclosure are not limited thereto.

As indicated in FIG. 14D, the flow disturbing component 260A' of another embodiment has multiple flow disturbing holes 260a surrounding the central position of the flow disturbing component 260A'. Furthermore, the flow disturbing component 260A' further includes a lens portion 261A having a protruded surface, such that when a light passes through the lens portion 261A, the light can be focused to increase its directivity.

In other embodiments, the center of the flow disturbing hole 260a can be located at the optical axis of the first light source 125A and/or the second light source 135A. Exemplarily but not restrictively, the flow disturbing hole can have a circular shape. The area and position of the flow disturbing hole are designed to allow at least 60% of the light energy of the first light source 125A and/or the second light source 135A to pass through. In an exemplary embodiment, the area and the position of the flow disturbing hole are designed to allow at least 80% of the light energy of the first light source 125A and/or the second light source 135A to pass through. For the fluid F1 to be fully sterilized, the area of the flow disturbing hole is not larger than the irradiation area of the first light source 125A and/or the second light source 135A. The flow disturbing hole 260a will disturb the fluid F1 and reduce the flow rate of the fluid F1, so that the fluid F1 can be fully sterilized.

Furthermore, the flow disturbing component 260A can be realized by a translucent plate or an opaque plate. In an embodiment, the flow disturbing component 260A can be formed of quartz.

The fluid sensor 110A can be disposed on the first adaptor 270A or adjacent to the first end 231A (not illustrated) of the reaction chamber body 230A. The fluid sensor 110A can detect the passage and flow rate of the fluid F1, so that the first light source 125A can automatically irradiate according to the detected passage and flow rate.

Figure 15:
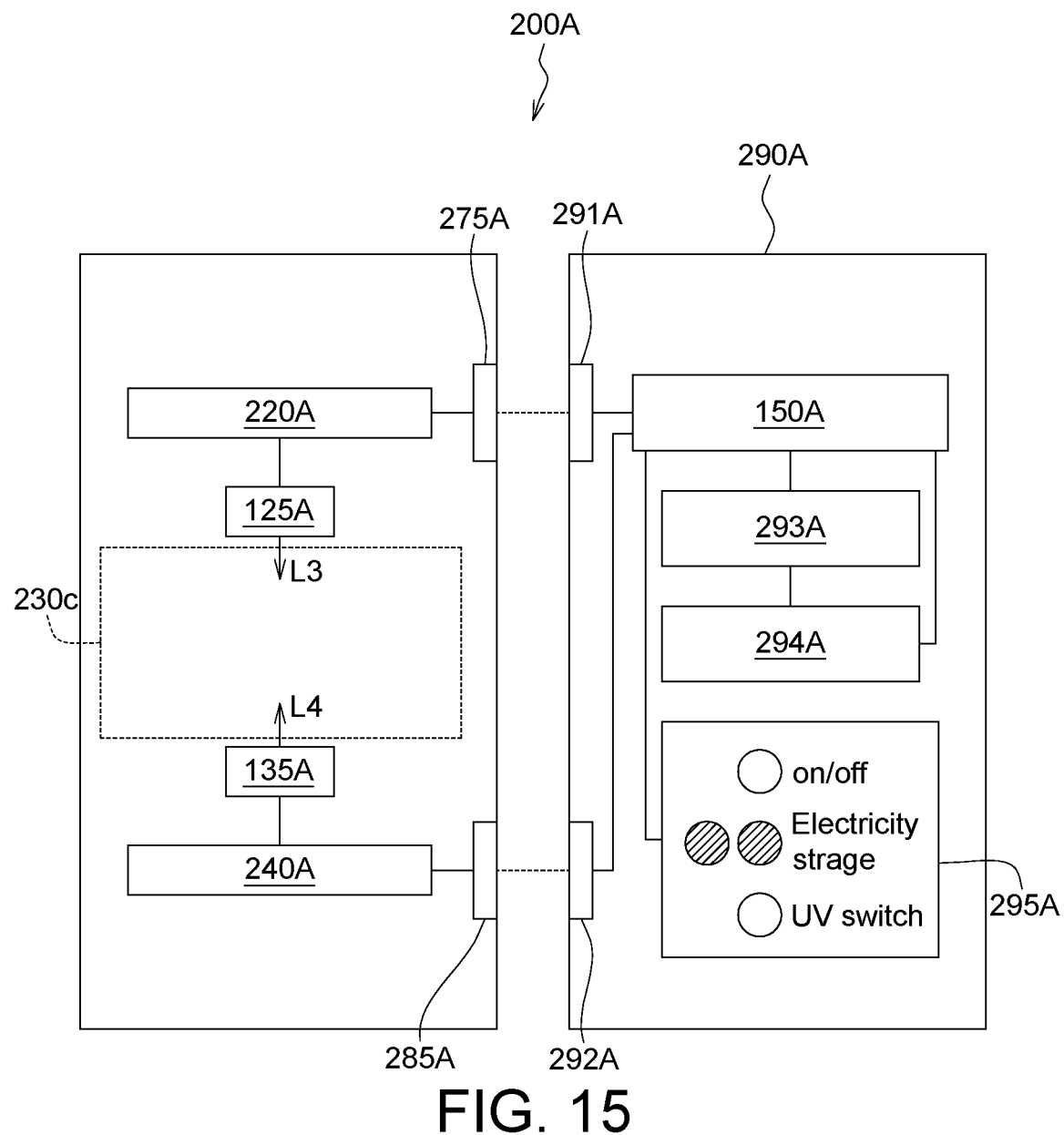

Referring to FIG. 15, a functional block diagram of a fluid processing device 200A according to an embodiment of the present disclosure is shown. The control module 290A of the fluid processing device 200A includes a first connector 291A, a second connector 292A, a controller 150A, an electric power storage device 293A, an electric power sensor 294A and a display panel 295A. The first connector 291A, the second connector 292A, the electric power storage device 293A, the electric power sensor 294A and the display panel 295A are electrically connected to the controller 150A.

When the first connector 291A and the second connector 292A are respectively connected to the first connection port 275A and the second connection port 285A, the controller 150A can control the first light source 125A and the second light source 135A to emit the first light L3 and the second light L4 to the reaction chamber 230c, wherein the connection can be an electrical connection adopting pins. Furthermore, the electric power volume necessary for the operation of the controller 150A is provided by the electric power storage device 293A. The electric power storage device 293A can either be a detachable type or a non-detachable type. Let the non-detachable type be taken for example, the electric power storage device 293A can be charged through an external electric power such as AC-grid). The electric power sensor 294A can detect the electric power storage of the electric power storage device 293A. The display panel 295A includes at least one indicator, such as an electric power indicator, an electric power storage indicator or a sterilization indicator. The electric power indicator indicates the ON/OFF state of the fluid processing device 200A. The electric power storage indicator indicates the electric power storage of the electric power storage device 293A, The sterilization indicator indicates whether the fluid processing device 200A is in a sterilization state or a non-sterilization state.

In another embodiment, the fluid processing device 200A can sterilize the fluid F1 without the control module 290A.

Figure 16:
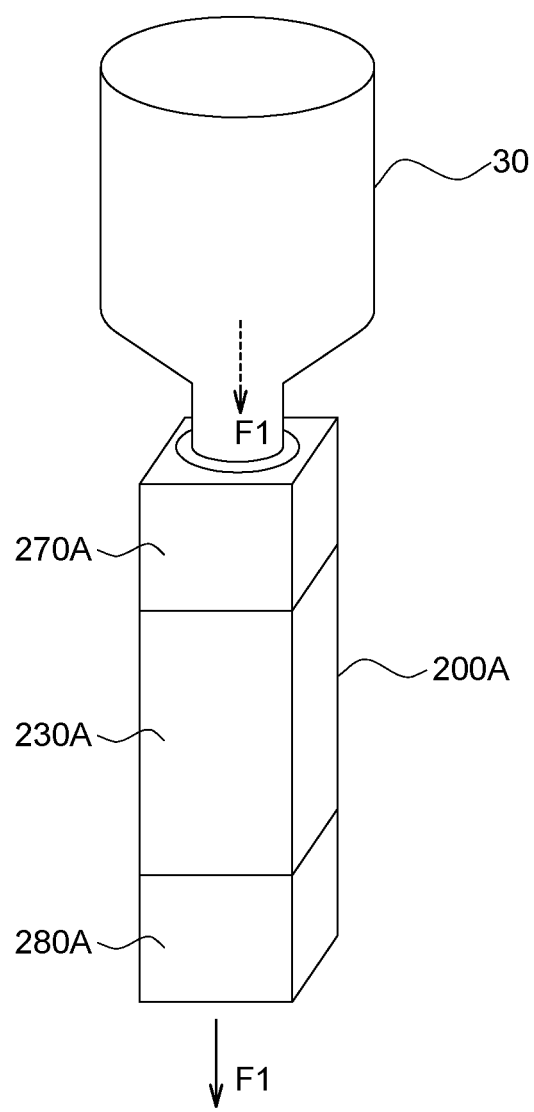

Referring to FIG. 16, a schematic diagram of an application example of a fluid processing device 200A according to an embodiment of the present disclosure is shown. The fluid processing device 200A can be connected to an external water source 30, such as the water within a PET bottle. The first adaptor 270A of the fluid processing device 200A can have a thread structure matching the bottle mouth (not illustrated) of the PET bottle, such that the PET bottle can be easily connected to the fluid processing device 200A.

According to the experiment results, after the fluid F1 of the external water source 30 containing an original bacteria count of 1.36×106 flows through the fluid processing device 200A at a flow rate of 1.5 liters per minute (l/min), the residual bacteria count drops to 71,000 and the sterilization rate reaches 94.78%. When the fluid F1 of the external water source 30 containing an original bacteria count of 1.36×106 flows through the fluid processing device 200A at a flow rate of 0.8 l/min, the residual bacteria count drops to 180 and the sterilization rate reaches 99.87%. The experimental results show that the sterilization rate of the fluid processing device 200A is above 90% or even close to 100%.

According to the experiment results, after the fluid F1 of the external water source 30 having an original bacteria count of 1.5×106 passes through the fluid processing device 200A having the flow disturbing component 260A at a flow rate of 2 l/min, the residual bacteria count drops to 16,000 and the sterilization rate reaches 89%. After the fluid F1 of the external water source 30 having an original bacteria count of 1.5×106 passes through the fluid processing device 200A having the flow disturbing component 260A at a flow rate of 2 l/min, the bacteria count drops to 91000 and the sterilization rate reaches 94%. The experimental results show that the fluid processing device 200A having the flow disturbing component 260A has a sterilization rate larger than 90% and can improve the bactericidal effect.

Figure 17:
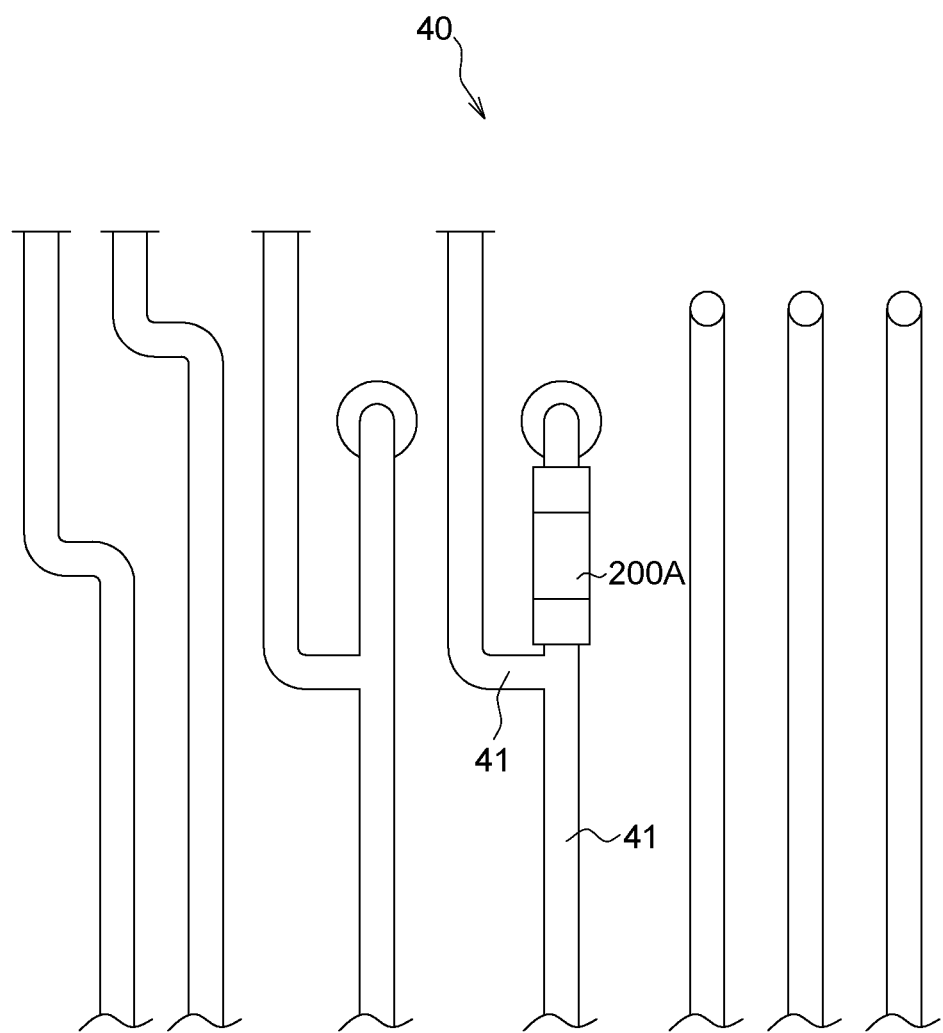

Referring to FIG. 17, a schematic diagram of another application example of a fluid processing device 200A according to another embodiment of the present disclosure is shown. The fluid processing device 200A can be connected to a piping system 40 of a chemical plant. The piping system 40 includes multiple tubular pieces 41 through which the fluid F1 passes. In the present embodiment, the fluid F1 is a working fluid, such as a chemical liquid or a chemical gas. In general, the interior of the tubular pieces 41 needs to be regularly flushed with a bactericidal solution or gas to clean, sterilize and maintain the interior of the tubular pieces 41. In an embodiment of the present disclosure, the fluid processing device 200A can be installed in the tubular pieces 41 of the piping system 40, such that the fluid F1 can be sterilized at any time. Thus, the frequency of bactericidal operation of the tubular pieces 41 can be reduced or saved. In another embodiment, multiple fluid processing devices 200A can be installed in one or more than one tubular piece 41. The present disclosure does not restrict the quantity of the fluid processing devices 200A installed in a tubular piece 41 or the quantity of the tubular pieces 41 equipped with the fluid processing devices 200A.

Figure 18:
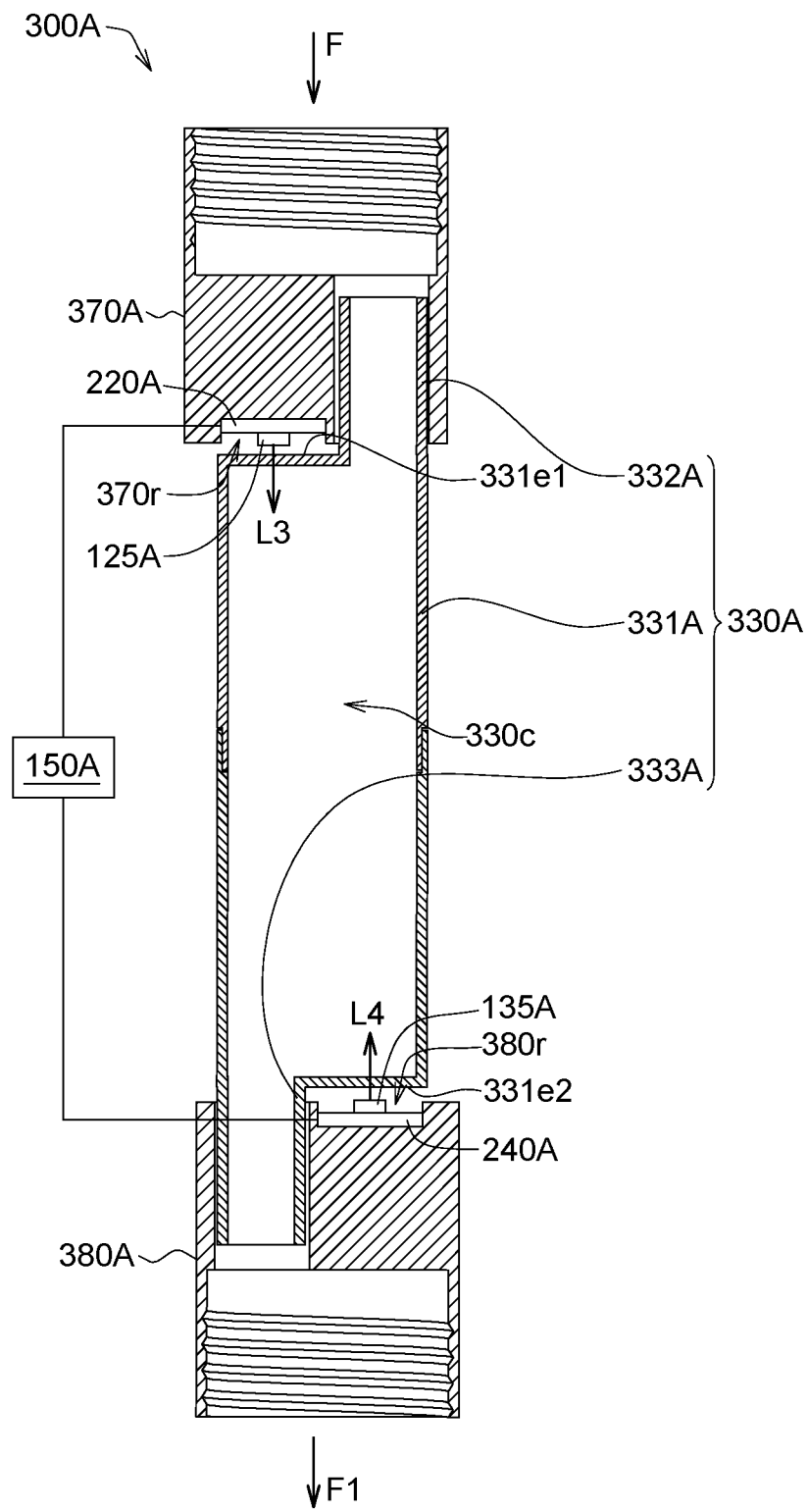

Referring to FIG. 18, a cross-sectional view of a fluid processing device 300A according to another embodiment of the present disclosure is shown. The fluid processing device 300A includes a fluid sensor 110A (not illustrated), a first circuit board 220A, a first light source 125A, a reaction chamber body 330A, a second light source 135A, a second circuit board 240A, a controller 150A, a flow disturbing component 260A (not illustrated), a first adaptor 370A and a second adaptor 380A.

The first adaptor 370A is connected to the reaction chamber body 330A. The first adaptor 370A has a first receiving portion 370r, a first circuit board 220A and a first light source 125A disposed within the first receiving portion 370r. The first light source 125A is disposed on the first circuit board 220A and is used to emit the first light L3 to the reaction chamber 330c of the reaction chamber body 330A.

The second adaptor 380A is connected to the reaction chamber body 330A. The second adaptor 380A has a second receiving portion 380r, a second circuit board 240A and a second light source 135A disposed within the second receiving portion 380r. The second light source 135A is disposed on the second circuit board 240A and is used to emit a second light L4 to the reaction chamber 330c of the reaction chamber body 330A.

As indicated in FIG. 18, the reaction chamber body 330A includes a main chamber body 331A, a first connection chamber body 332A and a second connection chamber body 333A interconnected with each other. The main chamber body 331A has a first end wall 331e1 and a second end wall 331e2 opposite to the first end wall 331e1. The first connection chamber body 332A is protruded outwards from the first end wall 331e1 of the main chamber body 331A. The first connection chamber body 332A can be inserted into the first adaptor 370A. The first end wall 331e1 of the main chamber body 331A is opposite to the first light source 125A, such that the first light L3 can enter the reaction chamber 330c through the first end wall 331e1. Since the first circuit board 220A and the first light source 125A are separated from the reaction chamber 330c, the fluid F1 will not contact the first circuit board 220A and the first light source 125A and make the first circuit board 220A and the first light source 125A short-circuited.

As indicated in FIG. 18, the second connection chamber body 333A is protruded outward from the second end wall 331e2 of the main chamber body 331A. The second connection chamber body 333A can be inserted in the second adaptor 380A. The second end wall 331e2 of the main chamber body 331A is opposite to the second light source 135A, such that the second light L4 can enter the reaction chamber 330c through the second end wall 331e2. Since the second circuit board 240A and the second light source 135A are separated from the reaction chamber 330c, the fluid F1 will not contact the second circuit board 240A and the second light source 135A and make the second circuit board 240A and the second light source 135A short-circuited.

Figure 19A:
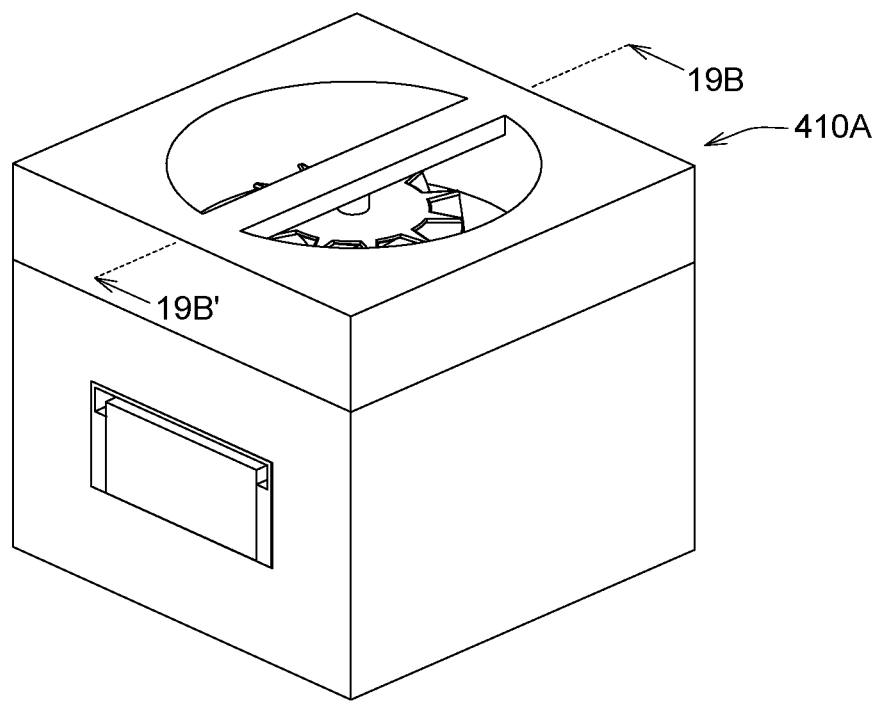
Figure 19B:
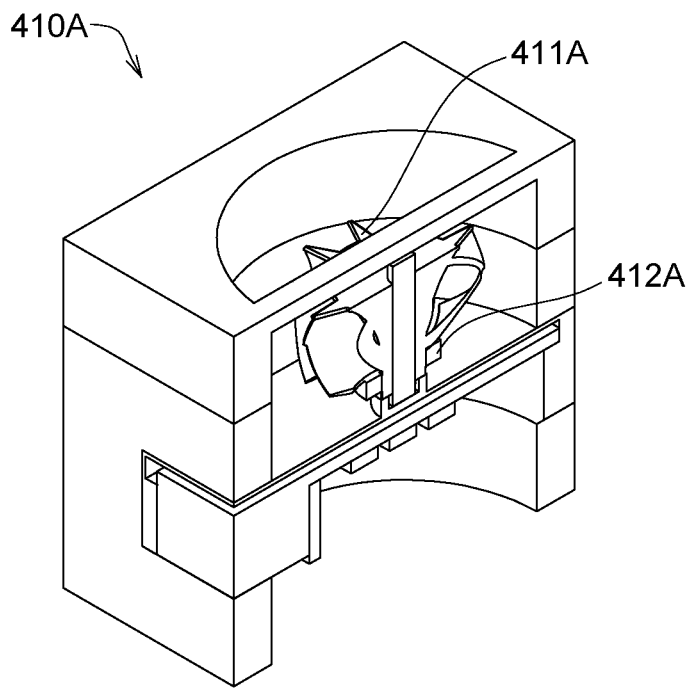
Figure 19C:
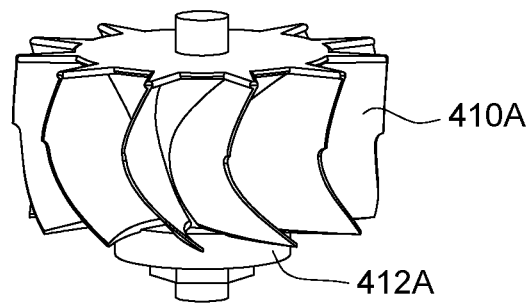

FIG. 19A shows a schematic diagram of a fluid sensor 410A according to another embodiment of the present disclosure. FIG. 19B shows a cross-sectional view of the fluid sensor 410A of FIG. 19A along a direction 19B-19B', FIG. 19C shows a schematic diagram of the blades 411A of FIG. 19A, FIG. 19D shows a top view of the blades 411A of FIG. 19C, and FIG. 19E shows a top view of the magnet component 412A of FIG. 19C.

The fluid sensor 410A includes blades 411A, a magnet component 412A including at least two magnetic poles. The fluid sensor 410A is electrically connected to an electric power generator on a driving circuit. The blades 411A and the magnet component 412 are coaxial. When the fluid flows through the blades 411A, the blades 411A and the magnet component 412A rotates and the electric power generator senses the change of magnetic field to generate electric power. The electric power generated by the electric power generator can be provided to drive the at least one light source of the fluid sterilization device. The electric power generator can be a hall effect sensor.

Figure 19D:
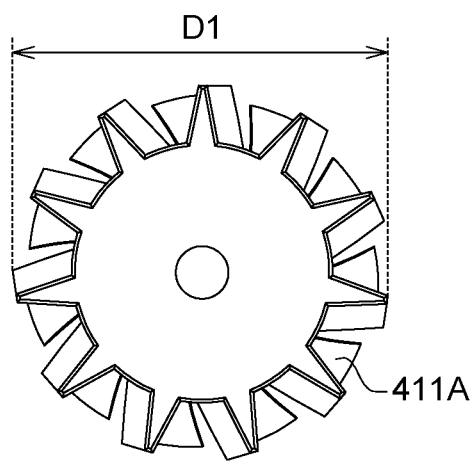
Figure 19E:
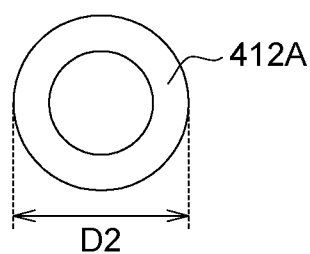

As shown in FIGS. 19D and 19E, a diameter D1 of the blades 411A is not larger than 3 centimeter (cm), and a diameter D2 of the magnet component 412A is not larger than 2 cm.

Figure 20A:
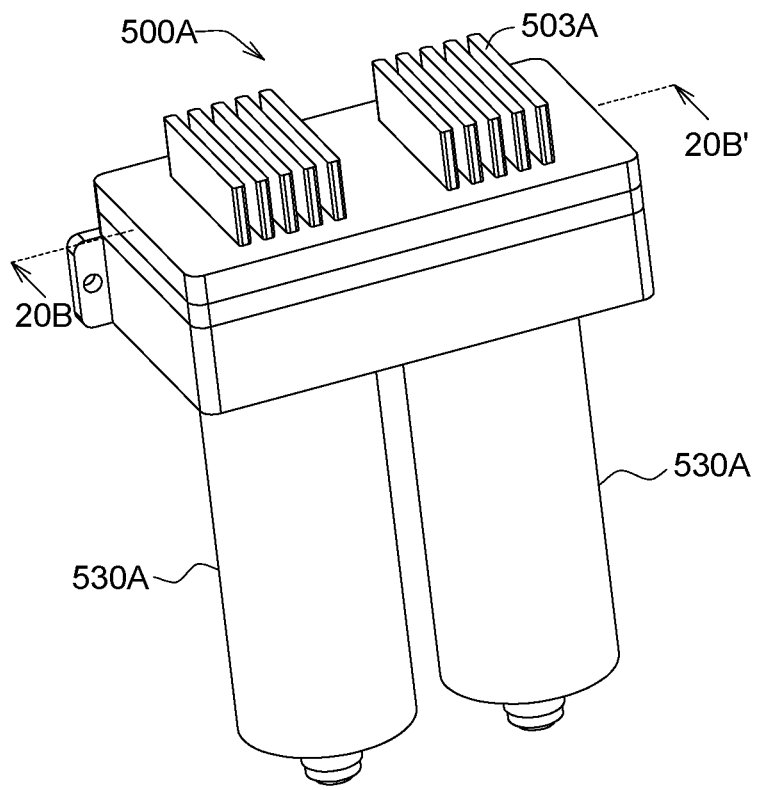
Figure 20B:
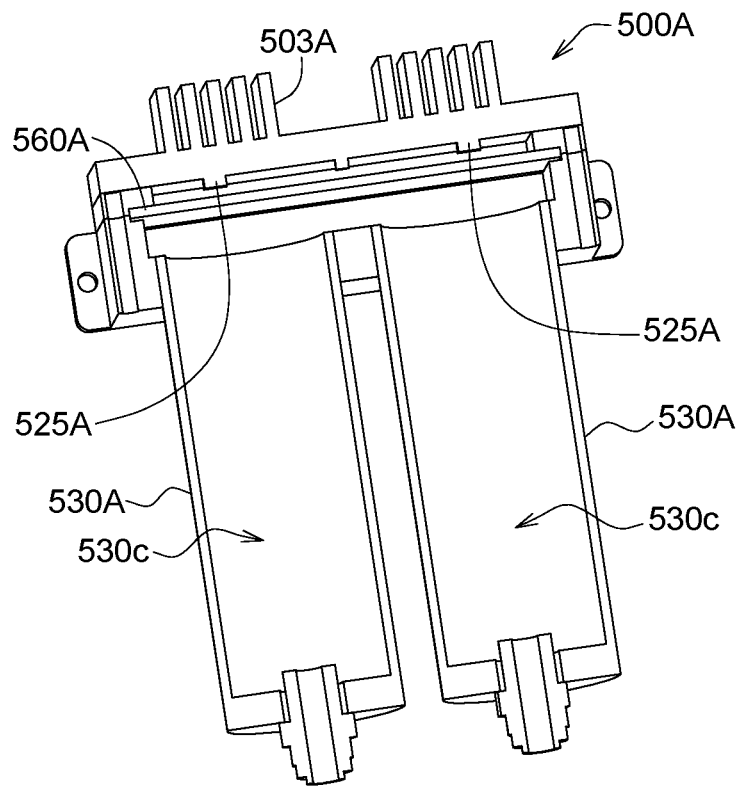

FIG. 20A shows a schematic diagram of a fluid sterilization device 500A according to another embodiment of the present disclosure, and FIG. 20B shows a cross-sectional view of the fluid sterilization device 500A of FIG. 20A along a direction 20B-20B'.

The fluid sterilization device 500A includes at least two light sources 525A on a circuit board, a quartz plate 560A, a heat sink 503 and two reaction chamber bodies 530A. Each of the two reaction chamber body 530A has a reaction chamber 530c therein to allow fluid to flow. The reaction chamber bodies 530A may be made of a material including, for example, PTFE. The top ends of the reaction chamber bodies 530A can be screwed to connect with the quartz plate 560A and the light sources 525A in fix distances. The light sources 525A are covered by the quartz plate 560A to prevent short-circuit resulted from fluid directly contacting the circuit board and the light source thereon. The light sources 525A can emit sterilization light to the reaction chamber 530c through the quartz plate 560A. The fluid enters from the inlet on the bottom end of one of the two reaction chamber body 530A and leaves from the outlet on the bottom end of the other one of the two reaction chamber body 530A.

Compared to the fluid sterilization device with single reaction chamber, the fluid sterilization device 500A with two reaction chamber 530c can have higher sterilization rate. For example, when the light dosage is 100 mJ, the sterilization rate is 85% for fluid sterilization device with single reaction chamber. The sterilization rate of the fluid sterilization device 500A with two reaction chamber 530c can reach 99.999% in the same light dosage.

Figure 21A:
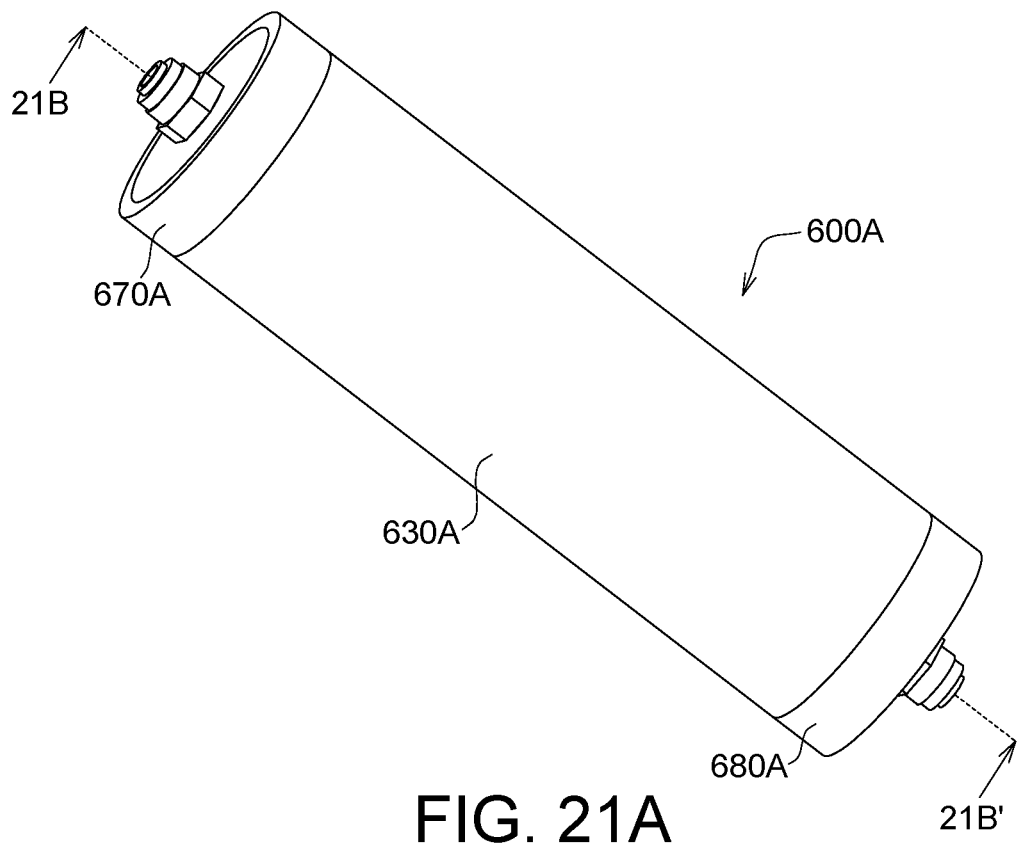
Figure 21B:
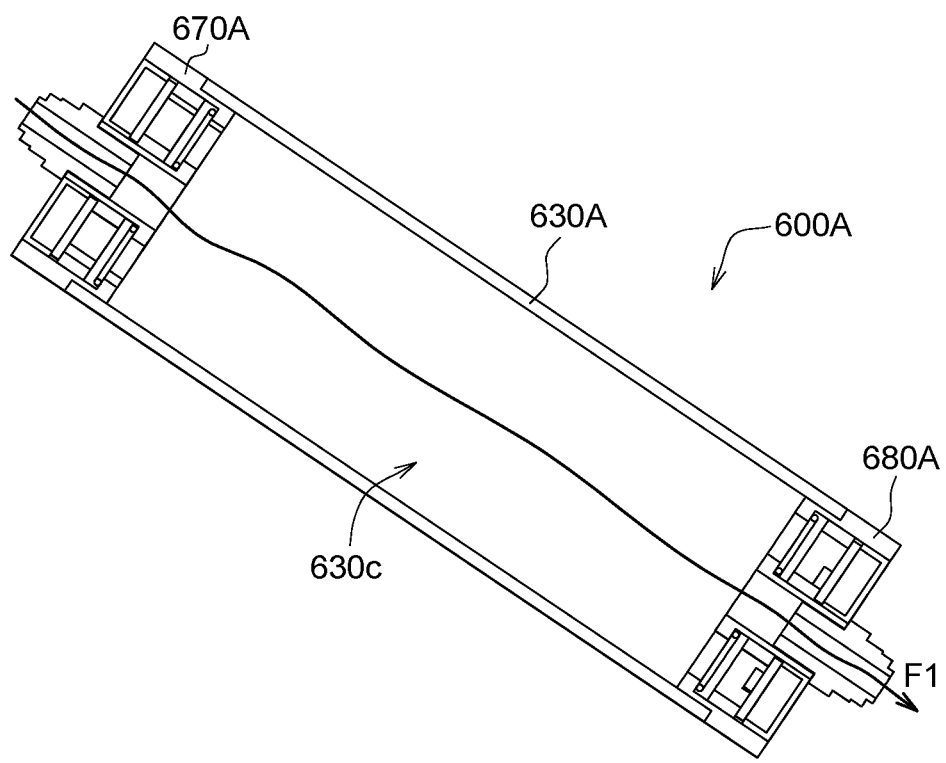
Figure 21C:
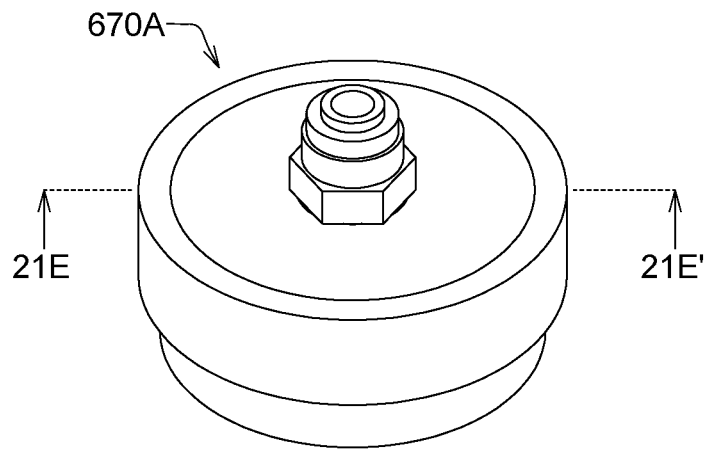

FIG. 21A shows a schematic diagrams of a fluid sterilization device 600A according to another embodiment of the present disclosure. FIG. 21B shows a cross-sectional view of the fluid sterilization device 600A of FIG. 21A along a direction 21B-21B', FIGS. 21C and 21D show schematic diagrams of the first light-emitting cap 670A of FIG. 21A, and FIG. 21E shows a cross-sectional view of the first light-emitting cap 670A of FIG. 21C along a direction 21E-21E'.

The fluid sterilization device 600A at least includes a reaction chamber body 630A, a first light-emitting cap 670A and a second light-emitting cap 680A. The first light-emitting cap 670A and the second light-emitting cap 680A are disposed on two ends of the reaction chamber body 630A. The fluid F1 may flow through the fluid sterilization device 600A from the first light-emitting cap 670A to the second light-emitting cap 680A, or from the second light-emitting cap 680A to the first light-emitting cap 670A. The first light sources 625A on the first light-emitting cap 670A can emit first sterilization light toward the reaction chamber 630c. The second light sources on the second light-emitting cap 690 can emit second sterilization light toward the reaction chamber 630c. Therefore, the fluid passing through the reaction chamber 630c can be sterilized twice by the light coming from both the first light-emitting cap 670A and the second light-emitting cap 680A. In addition, the first light emitting cap 670A and the second light-emitting cap 680A can be quickly screw on the reaction chamber body 630A or be quick release therefrom.

Figure 21D:
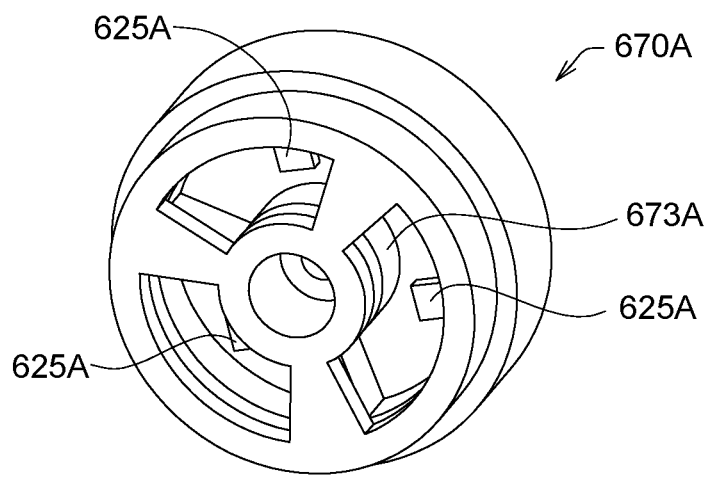
Figure 21E:
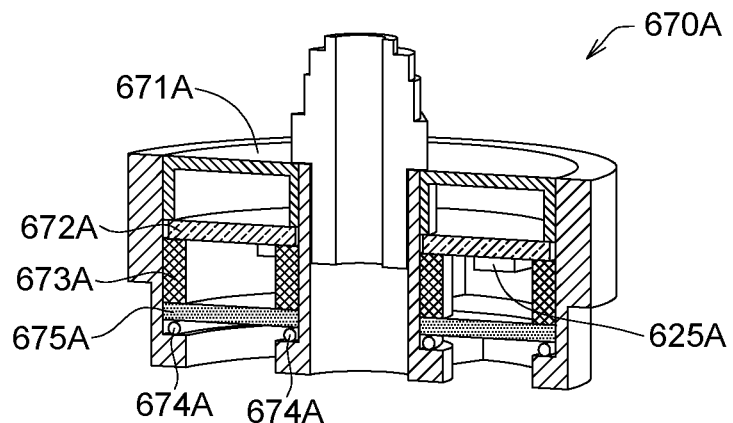

As shown in FIGS. 21D and 21E, the first light-emitting cap 670A includes a top cover 671A, at least one light source 625A, a circuit board 672A, a gasket 673A, at least one O-ring 674A and a quartz plate 675A.

A plurality of light sources 625A disposed on the circuit board 672A emit light passing through the quartz plate 675A. The light sources 625 are arranged in at least one concentric circle around the edge of the first light-emitting cap 670A. The light sources 625A emit sterilization light through the quartz plate 675A. When the first light-emitting cap 670A is screw on the reaction chamber body 630A, the gasket 673A is used to apply pressure to cause the O-ring 674A below the quartz plate 675A to be deformed therefore the quartz plate 675A can tightly seal the reaction chamber 630c to prevent fluid F1 to contact the light sources 625A on the circuit board 672A.

In addition, the second light-emitting cap 680A has features similar to or the same as the first light-emitting cap 670A, and the similarities are repeated here.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A fluid sterilizing device, comprising:
   a first reaction chamber connected to a fluid inlet;
   a second reaction chamber connected to a fluid outlet;
   a communication chamber connecting the first reaction chamber with the second reaction chamber; and
   a light source configured to emit sterilization light to enter the first reaction chamber and the second reaction chamber;
   wherein the fluid inlet allows a fluid to enter the first reaction chamber, the communication chamber allows the fluid to pass through and enter the second reaction chamber, and a flow velocity distribution of the fluid in the second reaction chamber is different from a flow velocity distribution of the fluid in the first reaction chamber,
   wherein the sterilization light has a light-emitting optical axis parallel to an extension of the first reaction chamber and an extension of the second reaction chamber, and
   wherein the fluid flows in a first direction in the first reaction chamber, the fluid flows in a second direction in the second reaction chamber, and the second direction is different from the first direction.

2. The fluid sterilizing device according to claim 1, wherein the second direction is opposite to the first direction.

3. The fluid sterilizing device according to claim 1, wherein the flow velocity distribution of the fluid in the second reaction chamber comprises a flow velocity in an outer sidewall of the second reaction chamber, a flow velocity in a central region of the second reaction chamber, and a flow velocity in an inner sidewall of the second reaction chamber, wherein the flow velocity in the outer sidewall of the second reaction chamber is larger than the flow velocity in the central region of the second reaction chamber, and the flow velocity in the central region of the second reaction chamber is larger than the flow velocity in the inner sidewall of the second reaction chamber.

4. The fluid sterilizing device according to claim 1, wherein the Reynolds number of the fluid in a region of the second reaction chamber is larger than the Reynolds number in the first reaction chamber.

5. The fluid sterilizing device according to claim 4, wherein the fluid is in a turbulent state in the second reaction chamber.

6. The fluid sterilizing device according to claim 1, wherein a cross-sectional area of the fluid inlet is substantially equal to a cross-sectional area of the fluid outlet, and a cross-sectional area of the communication chamber is not less than half of the cross-sectional area of the fluid inlet or the cross-sectional area of the fluid outlet.

7. The fluid sterilizing device according to claim 1, wherein the communication chamber has a cavity.

8. The fluid sterilizing device according to claim 7, wherein a section of the cavity is square.

9. The fluid sterilizing device according to claim 1, wherein the first reaction chamber, the second reaction chamber and the communication chamber form a U-shaped flow path.

10. The fluid sterilizing device according to claim 1, further comprising:
    a fluid sensor disposed in the first reaction chamber, wherein the fluid forms a turbulent flow after passing through the fluid sensor.

11. The fluid sterilizing device according to claim 1, further comprising:
    a fluid sensor configured to sense passage of the fluid and a flow velocity of the fluid.

12. The fluid sterilizing device according to claim 1, wherein the power of the sterilization light is adjusted according to the flow velocity of the fluid.

13. The fluid sterilizing device according to claim 1, further comprising:
    a fluid sensor having the first reaction chamber.

14. The fluid sterilizing device according to claim 12, wherein when the fluid sensor senses that the fluid is in a non-flow state, the light source continuously emits the sterilization light in a low power state.

15. The fluid sterilizing device according to claim 14, wherein when the fluid sensor senses that the fluid is in a flow state, the light source continuously emits the sterilization light in a high power state.

16. The fluid sterilizing device according to claim 11, wherein when the fluid sensor senses that the fluid is in a non-flow state, the light source emits the sterilization light in a pulse signal manner.

17. The fluid sterilizing device according to claim 16, wherein when the fluid sensor senses that the fluid is in a flow state, the light source emits the sterilization light in a continuous light-emitting manner.

18. The fluid sterilizing device according to claim 11, wherein when an external signal is activated, the light source is delayed to emit the sterilization light.

19. The fluid sterilizing device according to claim 18, wherein when an external signal ends, the light source stops emitting the sterilization light after being delayed for a period of time.

20. The fluid sterilizing device according to claim 1, further comprises:
    a spoiler disposed in the first reaction chamber, wherein the spoiler has a plurality of through holes for changing a flow field of the fluid passing through the through holes.

21. A fluid sterilizing device, comprising:
    a light source configured to emit sterilization light;
    a reaction chamber configured to allow fluid to pass through, wherein the sterilization light is emitted to the reaction chamber;
    a fluid sensor configured to sense passage of the fluid and a flow velocity of the fluid;
    a light sensor configured to receive and sense a reflection light of the sterilization light that is emitted to enter the reaction chamber; and
    a controller configured to control a light intensity of the sterilizing light according to an intensity of the reflection light.

22. The fluid sterilizing device according to claim 21, further comprises:
    a calculation unit configured to determine bacteria content and water quality of the fluid according to the light intensity of the reflection light.

23. The fluid sterilizing device according to claim 21, wherein when the fluid sensor senses that the fluid is in a non-flow state, the light source continuously emits the sterilization light in a low power state.

24. The fluid sterilizing device according to claim 23, wherein when the fluid sensor senses that the fluid is in a flow state, the light source continuously emits the sterilization light in a high power state.

25. The fluid sterilizing device according to claim 21, wherein when the fluid sensor senses that the fluid is in a non-flow state, the light source emits the sterilization light in a pulse signal manner.

26. The fluid sterilizing device according to claim 25, wherein when the fluid sensor senses that the fluid is in a flow state, the light source emits the sterilization light in a continuous light-emitting manner.

27. A fluid sterilizing device, comprising:
a first reaction chamber connected to a fluid inlet;
a second reaction chamber connected to a fluid outlet;
a communication chamber connecting the first reaction chamber with the second reaction chamber; and
a light source configured to emit sterilization light to enter the first reaction chamber and the second reaction chamber;
wherein the fluid inlet allows a fluid to enter the first reaction chamber, the communication chamber allows the fluid to pass through and enter the second reaction chamber, and a flow velocity distribution of the fluid in the second reaction chamber is different from a flow velocity distribution of the fluid in the first reaction chamber;
wherein the communication chamber has a cavity, and the Reynolds number of the fluid in a region of the second reaction chamber is larger than the Reynolds number in the first reaction chamber through the cavity.

\* \* \* \* \*